(12) United States Patent
Peavey et al.

(10) Patent No.: US 9,744,707 B2
(45) Date of Patent: Aug. 29, 2017

(54) EXTRUSION-COATED STRUCTURAL MEMBERS HAVING EXTRUDED PROFILE MEMBERS

(71) Applicant: Eastman Chemical Company, Kingsport, TN (US)

(72) Inventors: Jennifer Lynne Peavey, Raleigh, NC (US); Mohan Sasthav, Hamilton, OH (US); James Wilson Mercer, Jr., Kingsport, TN (US); Scott Allen Clear, Escondido, CA (US); Chanandh Cheowanich, Solana Beach, CA (US)

(73) Assignee: Eastman Chemical Company, Kingsport, TN (US)

( * ) Notice: Subject to any disclaimer, the term of this patent is extended or adjusted under 35 U.S.C. 154(b) by 78 days.

(21) Appl. No.: 14/496,529

(22) Filed: Sep. 25, 2014

(65) Prior Publication Data
US 2015/0110988 A1    Apr. 23, 2015

Related U.S. Application Data

(60) Provisional application No. 61/892,599, filed on Oct. 18, 2013.

(51) Int. Cl.
*B29C 47/06* (2006.01)
*B32B 3/06* (2006.01)
(Continued)

(52) U.S. Cl.
CPC .......... *B29C 47/065* (2013.01); *B29C 47/025* (2013.01); *B32B 1/00* (2013.01);
(Continued)

(58) Field of Classification Search
CPC .... B32B 1/04; B32B 3/02; B32B 3/04; B32B 3/06; B32B 1/00; B32B 2479/00;
(Continued)

(56) References Cited

U.S. PATENT DOCUMENTS 2,216,519 A    10/1940    Quarnstrom
2,926,729 A *  3/1960    Zanini ...................... B05D 7/06
                                                       160/231.2
(Continued)

FOREIGN PATENT DOCUMENTS

CA        2133696 A1    5/1995
CN       201626102 U    11/2010
(Continued)

OTHER PUBLICATIONS

Translated abstract for KR20110073672; published Jun. 30, 2011.*
(Continued)

*Primary Examiner* — Catherine A Simone
(74) *Attorney, Agent, or Firm* — Tammye L. Taylor

(57) ABSTRACT

The present disclosure relates to extrusion-coated structural systems including at least one extruded profile member coupled to and extending outwardly from an extrusion-coated structural member, as well as methods of making and using the same. Structural systems of the present invention that include at least one extruded profile member may exhibit enhanced flexibility, functionality, and/or durability. Structural systems according to embodiments of the present invention can be suitable for use in a variety of applications, including in ready-to-assemble furniture or cabinetry applications or as building and construction materials such as wall board, flooring, trim, and the like.

13 Claims, 36 Drawing Sheets

(51) Int. Cl.
| | |
|---|---|
| *B32B 3/30* | (2006.01) |
| *B29C 47/02* | (2006.01) |
| *B32B 21/02* | (2006.01) |
| *B32B 21/08* | (2006.01) |
| *B32B 9/00* | (2006.01) |
| *B32B 15/00* | (2006.01) |
| *B32B 15/04* | (2006.01) |
| *B32B 19/00* | (2006.01) |
| *B32B 19/04* | (2006.01) |
| *B32B 21/00* | (2006.01) |
| *B32B 21/04* | (2006.01) |
| *B32B 23/00* | (2006.01) |
| *B32B 23/04* | (2006.01) |
| *B32B 27/00* | (2006.01) |
| *B32B 27/06* | (2006.01) |
| *B32B 27/08* | (2006.01) |
| *B32B 27/10* | (2006.01) |
| *B32B 27/30* | (2006.01) |
| *B32B 27/36* | (2006.01) |
| *B32B 1/00* | (2006.01) |
| *B32B 3/00* | (2006.01) |
| *B32B 3/02* | (2006.01) |
| *B32B 3/04* | (2006.01) |
| *B32B 3/12* | (2006.01) |
| *B32B 3/14* | (2006.01) |
| *B32B 3/18* | (2006.01) |
| *E04B 1/61* | (2006.01) |
| *E04C 2/36* | (2006.01) |
| *E05D 5/10* | (2006.01) |
| *E05D 5/14* | (2006.01) |
| *E05D 7/10* | (2006.01) |
| *F16B 7/18* | (2006.01) |
| *B29K 101/12* | (2006.01) |
| *B29L 9/00* | (2006.01) |
| *B29L 31/44* | (2006.01) |
| *F16B 5/00* | (2006.01) |
| *F16B 7/04* | (2006.01) |

(52) U.S. Cl.
CPC ............... *B32B 3/00* (2013.01); *B32B 3/02* (2013.01); *B32B 3/04* (2013.01); *B32B 3/06* (2013.01); *B32B 3/12* (2013.01); *B32B 3/14* (2013.01); *B32B 3/18* (2013.01); *B32B 3/30* (2013.01); *B32B 9/00* (2013.01); *B32B 15/00* (2013.01); *B32B 15/04* (2013.01); *B32B 19/00* (2013.01); *B32B 19/04* (2013.01); *B32B 21/00* (2013.01); *B32B 21/02* (2013.01); *B32B 21/04* (2013.01); *B32B 21/08* (2013.01); *B32B 23/00* (2013.01); *B32B 23/04* (2013.01); *B32B 27/00* (2013.01); *B32B 27/06* (2013.01); *B32B 27/08* (2013.01); *B32B 27/10* (2013.01); *B32B 27/30* (2013.01); *B32B 27/302* (2013.01); *B32B 27/308* (2013.01); *B32B 27/36* (2013.01); *E04B 1/6129* (2013.01); *E04B 1/6179* (2013.01); *E04C 2/36* (2013.01); *E05D 5/10* (2013.01); *E05D 5/14* (2013.01); *E05D 7/105* (2013.01); *F16B 7/187* (2013.01); *B29K 2101/12* (2013.01); *B29L 2009/00* (2013.01); *B29L 2031/44* (2013.01); *B29L 2031/446* (2013.01); *B32B 2250/02* (2013.01); *B32B 2255/00* (2013.01); *B32B 2255/02* (2013.01); *B32B 2255/04* (2013.01); *B32B 2255/06* (2013.01); *B32B 2255/08* (2013.01); *B32B 2255/10* (2013.01); *B32B 2255/102* (2013.01); *B32B 2262/10* (2013.01); *B32B 2262/101* (2013.01); *B32B 2307/00* (2013.01); *B32B 2307/51* (2013.01); *B32B 2307/546* (2013.01); *B32B 2307/554* (2013.01); *B32B 2317/16* (2013.01); *B32B 2333/00* (2013.01); *B32B 2419/00* (2013.01); *B32B 2419/04* (2013.01); *B32B 2479/00* (2013.01); *E04B 2001/6191* (2013.01); *E05D 2005/102* (2013.01); *E05Y 2800/29* (2013.01); *E05Y 2900/00* (2013.01); *E05Y 2900/20* (2013.01); *F16B 5/0012* (2013.01); *F16B 5/0016* (2013.01); *F16B 7/0473* (2013.01); *Y10T 29/49616* (2015.01); *Y10T 428/23* (2015.01); *Y10T 428/24521* (2015.01)

(58) Field of Classification Search
CPC ....... B32B 3/14; B32B 3/18; Y10T 428/2419; Y10T 428/24198; Y10T 428/24777; Y10T 428/24752; Y10T 428/24008; Y10T 428/17; Y10T 428/239; Y10T 428/23; B05D 1/265; B05C 3/005; B05C 3/12; B05C 3/00; E04F 13/076; B29C 47/02; B29C 47/021; B29C 47/025; B29C 47/065; E04B 1/6125; E04B 1/612; E04B 1/6129; E04B 1/6133; E04B 1/6137; E04B 1/6141; E04B 1/6166; E04B 1/6179; E04B 1/6145; F16B 5/0012; F16B 5/0016; B29L 2031/44; B29L 2031/446; E05Y 2900/20; E05Y 2900/00
USPC ............................................. 428/99, 76, 56
See application file for complete search history.

(56) References Cited

U.S. PATENT DOCUMENTS

| | | |
|---|---|---|
| 2,991,273 A | 7/1961 | Hechelhammer et al. |
| 2,999,835 A | 9/1961 | Goldberg |
| 2,999,846 A | 9/1961 | Schnell et al. |
| 3,028,365 A | 4/1962 | Schnell et al. |
| 3,084,662 A | 4/1963 | Badger et al. |
| 3,148,172 A | 9/1964 | Fox |
| 3,153,008 A | 10/1964 | Fox |
| 3,169,121 A | 2/1965 | Goldberg |
| 3,207,814 A | 9/1965 | Goldberg |
| 3,271,367 A | 9/1966 | Schnell et al. |
| 3,368,740 A | 2/1968 | Rohde |
| 3,402,682 A | 9/1968 | Penden et al. |
| 3,410,938 A | 11/1968 | Heinz |
| 3,544,669 A | 12/1970 | Schock |
| 3,599,286 A | 8/1971 | Karet |
| 3,694,538 A | 9/1972 | Okamoto et al. |
| 3,720,027 A | 3/1973 | Christensen |
| 3,741,843 A | 6/1973 | Louis |
| 3,772,405 A | 11/1973 | Hamb |
| 3,793,128 A | 2/1974 | Chancellor, Jr. et al. |
| 3,852,933 A | 12/1974 | Guzzo |
| 3,853,462 A | 12/1974 | Smith |
| 3,941,904 A | 3/1976 | Hoh et al. |
| 3,961,118 A | 6/1976 | Michaelis et al. |
| 3,980,005 A | 9/1976 | Buonaiuto |
| 4,000,219 A | 12/1976 | Smejkal |
| 4,123,436 A | 10/1978 | Holub et al. |
| 4,124,574 A | 11/1978 | Preston et al. |
| 4,143,187 A | 3/1979 | Pilgrim et al. |
| 4,156,069 A | 5/1979 | Prevorsek et al. |
| 4,181,764 A | 1/1980 | Totten |
| 4,190,686 A | 2/1980 | Muis |
| 4,197,038 A | 4/1980 | Hipp et al. |
| 4,209,475 A | 6/1980 | Herrington |
| 4,222,911 A | 9/1980 | Christenson |
| 4,301,053 A | 11/1981 | Wolfrey |
| 4,397,986 A | 8/1983 | Hornbaker |
| 4,420,920 A * | 12/1983 | Hewitt ............ E06B 3/205 428/34 |

(56) References Cited

U.S. PATENT DOCUMENTS

| | | | |
|---|---|---|---|
| 4,430,484 A | 2/1984 | Quinn | |
| 4,433,088 A | 2/1984 | Haaf et al. | |
| 4,452,933 A | 6/1984 | McCready | |
| 4,465,820 A | 8/1984 | Miller et al. | |
| 4,514,449 A * | 4/1985 | Budich | E06B 3/22 |
| | | | 428/174 |
| 4,558,096 A | 12/1985 | Boon et al. | |
| 4,567,142 A | 1/1986 | Lloyd | |
| 4,576,846 A | 3/1986 | Noel | |
| 4,589,456 A | 5/1986 | Traben | |
| 4,613,653 A | 9/1986 | Kitchens et al. | |
| 4,740,556 A | 4/1988 | Abolins et al. | |
| 4,757,110 A | 7/1988 | Sato | |
| 4,760,114 A | 7/1988 | Haaf et al. | |
| 4,774,794 A | 10/1988 | Grieb | |
| 4,775,597 A | 10/1988 | Birkmeyer et al. | |
| 4,790,851 A | 12/1988 | Suire et al. | |
| 4,872,907 A | 10/1989 | Areaux | |
| 4,935,306 A | 6/1990 | Ohtsuka et al. | |
| 4,963,435 A | 10/1990 | Hara et al. | |
| 4,981,898 A | 1/1991 | Bassett | |
| 4,982,014 A | 1/1991 | Freitag et al. | |
| 4,984,406 A | 1/1991 | Friesen | |
| 4,987,702 A | 1/1991 | Anschutz | |
| 5,010,162 A | 4/1991 | Serini et al. | |
| 5,084,511 A | 1/1992 | Abe et al. | |
| 5,095,069 A | 3/1992 | Ambrose et al. | |
| 5,162,058 A | 11/1992 | Uenaka et al. | |
| 5,166,237 A | 11/1992 | Abe et al. | |
| 5,197,319 A | 3/1993 | Beekel | |
| 5,286,547 A | 2/1994 | Tyerman | |
| 5,288,559 A | 2/1994 | Oka et al. | |
| 5,312,863 A | 5/1994 | Van Rheenen et al. | |
| 5,321,056 A | 6/1994 | Carson et al. | |
| 5,344,700 A | 9/1994 | McGath et al. | |
| 5,382,401 A | 1/1995 | Pickett et al. | |
| 5,415,943 A | 5/1995 | Groger et al. | |
| 5,417,904 A | 5/1995 | Razi et al. | |
| 5,484,632 A | 1/1996 | Mercer, Jr. et al. | |
| 5,625,999 A | 5/1997 | Buzza et al. | |
| 5,654,347 A | 8/1997 | Khemani et al. | |
| 5,672,391 A | 9/1997 | Santarossa | |
| 5,674,928 A | 10/1997 | Chisholm et al. | |
| 5,696,176 A | 12/1997 | Khemani et al. | |
| 5,725,944 A | 3/1998 | Jones et al. | |
| 5,824,373 A | 10/1998 | Biller et al. | |
| 5,858,522 A | 1/1999 | Turk | |
| 5,897,708 A | 4/1999 | Hsu | |
| 5,898,043 A | 4/1999 | Uemae et al. | |
| 5,907,006 A | 5/1999 | Rennie et al. | |
| 5,914,083 A | 6/1999 | Yada et al. | |
| 5,925,698 A | 7/1999 | Steckel | |
| 5,962,573 A | 10/1999 | Berta | |
| 5,965,075 A | 10/1999 | Pauley | |
| 5,972,471 A | 10/1999 | Jasenof et al. | |
| 5,976,676 A | 11/1999 | Miki et al. | |
| 5,985,397 A | 11/1999 | Witt et al. | |
| 5,997,456 A | 12/1999 | Butters et al. | |
| 6,020,414 A | 2/2000 | Nelsen et al. | |
| 6,074,727 A | 6/2000 | Miller et al. | |
| 6,083,601 A | 7/2000 | Prince et al. | |
| 6,093,773 A | 7/2000 | Evans et al. | |
| 6,114,021 A | 9/2000 | Pankratz | |
| 6,153,264 A | 11/2000 | Schmid et al. | |
| 6,168,866 B1 | 1/2001 | Clark | |
| 6,203,915 B1 | 3/2001 | Prissok et al. | |
| 6,206,965 B1 | 3/2001 | Rao et al. | |
| 6,298,626 B2 | 10/2001 | Rudden | |
| 6,306,507 B1 | 10/2001 | Brunelle et al. | |
| 6,336,265 B1 | 1/2002 | Niedermair | |
| 6,352,657 B1 | 3/2002 | Veldhuis et al. | |
| 6,352,784 B1 | 3/2002 | Katagiri | |
| 6,353,050 B1 | 3/2002 | Bastiaens et al. | |
| 6,391,461 B1 | 5/2002 | Ryntz et al. | |
| 6,394,784 B1 | 5/2002 | Gellert et al. | |
| 6,448,328 B1 | 9/2002 | Kappler et al. | |
| 6,455,161 B1 | 9/2002 | Regnier et al. | |
| 6,461,792 B1 | 10/2002 | Kawamura et al. | |
| 6,500,895 B1 | 12/2002 | Bastiaens et al. | |
| 6,540,624 B1 | 4/2003 | Isogawa | |
| 6,551,662 B1 | 4/2003 | Schmid et al. | |
| 6,576,309 B2 | 6/2003 | Dalgewicz, III et al. | |
| 6,579,611 B1 | 6/2003 | Iwashita et al. | |
| 6,583,189 B1 | 6/2003 | King | |
| 6,584,743 B2 | 7/2003 | Paxton et al. | |
| 6,592,668 B2 | 7/2003 | Rao et al. | |
| 6,596,784 B1 | 7/2003 | King | |
| 6,601,357 B2 | 8/2003 | Tunis | |
| 6,616,998 B2 | 9/2003 | Greer et al. | |
| 6,660,086 B1 | 12/2003 | Prince et al. | |
| 6,667,367 B1 | 12/2003 | Berta | |
| 6,673,293 B1 | 1/2004 | Mistopoulos | |
| 6,680,104 B2 | 1/2004 | Boris et al. | |
| 6,716,522 B2 | 4/2004 | Matsumoto et al. | |
| 6,852,765 B2 | 2/2005 | Decker et al. | |
| 6,933,043 B1 | 8/2005 | Son et al. | |
| 6,991,632 B2 | 1/2006 | Ritland | |
| 6,994,752 B2 | 2/2006 | Estrada et al. | |
| 7,022,257 B1 | 4/2006 | Ohkido et al. | |
| 7,022,768 B1 | 4/2006 | Lacroix et al. | |
| 7,034,072 B2 | 4/2006 | Milic | |
| 7,081,488 B2 | 7/2006 | Bardman et al. | |
| 7,097,879 B2 | 8/2006 | Bolton et al. | |
| 7,160,977 B2 | 1/2007 | Hale et al. | |
| 7,175,905 B2 | 2/2007 | Curtis et al. | |
| 7,226,985 B2 | 6/2007 | Hale et al. | |
| 7,318,958 B2 | 1/2008 | Wang | |
| 7,335,399 B2 | 2/2008 | Bolton et al. | |
| 7,368,511 B2 | 5/2008 | Hale et al. | |
| 7,374,795 B2 | 5/2008 | Prince et al. | |
| 7,435,483 B2 | 10/2008 | Lee et al. | |
| 7,644,553 B2 | 1/2010 | Knauseder | |
| 7,687,768 B2 | 3/2010 | Hashizume et al. | |
| 7,694,468 B2 | 4/2010 | Prince et al. | |
| 7,695,498 B2 | 4/2010 | Ritland | |
| 7,766,915 B2 | 8/2010 | Jackson | |
| 7,883,597 B2 | 2/2011 | Blahut et al. | |
| 7,901,435 B2 | 3/2011 | Slivka et al. | |
| 8,065,848 B2 | 11/2011 | Carlson et al. | |
| 8,071,198 B2 | 12/2011 | Michalczyk et al. | |
| 8,071,695 B2 | 12/2011 | Strand et al. | |
| 8,113,143 B2 | 2/2012 | Prince et al. | |
| 8,197,733 B2 | 6/2012 | Sudano | |
| 8,394,784 B2 | 3/2013 | Stroumpoulis et al. | |
| 8,734,909 B2 | 5/2014 | Iyer et al. | |
| 8,865,261 B2 | 10/2014 | Helton et al. | |
| 2001/0013211 A1 | 8/2001 | Rudden | |
| 2001/0055671 A1 | 12/2001 | Pickett et al. | |
| 2002/0136911 A1 | 9/2002 | Yamamoto et al. | |
| 2002/0192451 A1 | 12/2002 | Kobayashi et al. | |
| 2003/0093078 A1 | 5/2003 | Ritland | |
| 2003/0108735 A1 | 6/2003 | Hoppe et al. | |
| 2003/0211347 A1 | 11/2003 | Rabinovitch et al. | |
| 2004/0003903 A1* | 1/2004 | Wenrick | B29C 47/0047 |
| | | | 160/236 |
| 2004/0023052 A1 | 2/2004 | Ambroise | |
| 2004/0109946 A1 | 6/2004 | Prince et al. | |
| 2004/0131871 A1 | 7/2004 | Lee et al. | |
| 2004/0236063 A1 | 11/2004 | Suzuki et al. | |
| 2005/0037176 A1 | 2/2005 | Domine | |
| 2005/0050814 A1 | 3/2005 | Prince et al. | |
| 2005/0102963 A1 | 5/2005 | Nien et al. | |
| 2005/0106406 A1 | 5/2005 | Curtis et al. | |
| 2005/0137332 A1 | 6/2005 | Hale et al. | |
| 2005/0137356 A1 | 6/2005 | Hale et al. | |
| 2005/0288401 A1 | 12/2005 | Pearson et al. | |
| 2006/0022376 A1 | 2/2006 | Prince et al. | |
| 2006/0111519 A1 | 5/2006 | Strand et al. | |
| 2006/0255496 A1* | 11/2006 | Wells | B29C 47/1063 |
| | | | 264/176.1 |
| 2006/0258801 A1 | 11/2006 | Martin et al. | |
| 2006/0270806 A1 | 11/2006 | Hale | |
| 2007/0000568 A1 | 1/2007 | Bohme et al. | |

(56) References Cited

U.S. PATENT DOCUMENTS

| | | | |
|---|---|---|---|
| 2007/0059463 A1* | 3/2007 | Melkonian | B29C 44/22 428/34.1 |
| 2007/0292569 A1 | 12/2007 | Bohme et al. | |
| 2008/0118741 A1 | 5/2008 | Michalczyk et al. | |
| 2008/0145564 A1 | 6/2008 | Allam et al. | |
| 2008/0145637 A1 | 6/2008 | Frank | |
| 2008/0153984 A1 | 6/2008 | Renken et al. | |
| 2009/0011164 A1 | 1/2009 | Masuda et al. | |
| 2009/0035581 A1 | 2/2009 | Sudano | |
| 2009/0036581 A1 | 2/2009 | Joshi et al. | |
| 2009/0064627 A1 | 3/2009 | Struthers et al. | |
| 2009/0260313 A1 | 10/2009 | Segaert | |
| 2010/0003410 A1 | 1/2010 | King et al. | |
| 2010/0015456 A1 | 1/2010 | Lizotte et al. | |
| 2010/0021677 A1 | 1/2010 | West et al. | |
| 2010/0036007 A1 | 2/2010 | Journee | |
| 2010/0211180 A1 | 8/2010 | Helmuth et al. | |
| 2011/0223342 A1 | 9/2011 | Iyer et al. | |
| 2011/0245876 A1 | 10/2011 | Brumfield | |
| 2013/0005892 A1 | 1/2013 | Lizotte et al. | |
| 2013/0011563 A1 | 1/2013 | Lizotte et al. | |
| 2013/0060345 A1 | 3/2013 | Tepic | |
| 2015/0110996 A1 | 4/2015 | Peavey | |

FOREIGN PATENT DOCUMENTS

| | | |
|---|---|---|
| DE | 9316759 U1 | 2/1994 |
| DE | 44 24 767 C1 | 11/1995 |
| DE | 198 57 045 A1 | 6/2000 |
| DE | 20 2011 003953 U1 | 5/2011 |
| DE | 10 2012 001910 A1 | 8/2013 |
| EP | 0 132 218 A2 | 1/1985 |
| EP | 0 210 297 A1 | 2/1987 |
| EP | 0 210 297 B1 | 12/1988 |
| EP | 0 488 711 A2 | 6/1992 |
| EP | 0 510 463 A1 | 10/1992 |
| EP | 653469 A2 | 5/1995 |
| FR | 2 861 738 A1 | 5/2005 |
| GB | 1 397 270 A1 | 6/1975 |
| GB | 2 024 658 A | 1/1980 |
| JP | S52 103465 A | 8/1977 |
| JP | 58-118231 A | 7/1983 |
| JP | S59 155024 A | 9/1984 |
| JP | 60-085921 A | 5/1985 |
| JP | 1-225647 A | 9/1989 |
| JP | 3-26752 A | 2/1991 |
| JP | 8-34866 A | 2/1996 |
| JP | 1996 034866 A | 2/1996 |
| JP | 08300590 A | 11/1996 |
| JP | 09-302078 | 11/1997 |
| JP | 9324135 A | 12/1997 |
| JP | 11-90827 A | 4/1999 |
| JP | 1999245590 A | 9/1999 |
| JP | 2002-337291 A | 11/2002 |
| JP | 2003-056168 A | 2/2003 |
| JP | 2004-211039 A | 7/2004 |
| JP | 2005-154731 | 6/2005 |
| JP | 2005-264136 A | 9/2005 |
| JP | 2006-281544 A | 10/2006 |
| WO | WO 96/18685 A1 | 6/1996 |
| WO | WO 97/46627 A1 | 12/1997 |
| WO | WO 98/27159 A1 | 6/1998 |
| WO | WO 01/27200 A3 | 4/2001 |
| WO | WO 01/58663 A1 | 8/2001 |
| WO | WO 2006/093916 A2 | 9/2006 |
| WO | WO 2006/102705 A1 | 10/2006 |
| WO | WO 2008/040498 A1 | 4/2008 |

OTHER PUBLICATIONS

December, Timothy S., et al.; "The Effects of TPO Composition on Adhesion and Proposed Chemical Mechanism"; Paint and Coatings Industry; Mar. 2008; www.pcimag.com; pp. 76-82.
Berta, Dominic A.; "Formulating Plastics for Paint Adhesion"; Chapter 3 from Coatings of Polymers and Plastics, 2003, edited by Ryntz, Rose, A. and Yaneff, Phillip V.; pp. 85-119.
ASTM Test Method D 2457 Mar. 2008.
ASTM D 3359-02 Oct. 2002.
ASTM D3330 Oct. 2004.
ASTM D 523 Jun. 2008.
ASTM E 1164 Jun. 2009.
ASTM E 308 Jan. 2009.
"BLENDEX BMAT Data Sheet Styrene Acrylonitrile", http://www.ides.com/info/datasheet/E73798/BLENDEX-BMAT, Sep. 13, 2012.
"PARALOID™ KM-377 Acrylic Impact Modifier", Technical Data Sheet, The Dow Chemical Company.
"Blendex BMAT Modifier Resin"; Chemtura; www.chemtura.com; Effective Jun. 4, 2008; (2007).
"Butyl acrylate-methyl methacrylate polymers"; Chemical Book; www.chemicalbook.com; (2008).
"PARALOID KM-377 Impact Modifier"; Material Safety Data Sheet, DOW; Revision Date: Feb. 7, 2004.
Turner, S. R., et al.; "Polyesters Based on 1,4-Cyclohexanedimethanol"; Modern Polyesters: Chemistry and Technology of Polyesters and Copolyesters; (2003); pp. 280-282.
"Chlorocarbons and Chlorohydrocarbons-$C_2$ To Combustion Technology"; Encyclopedia of Chemical Technology; $4^{th}$ Edition, vol. 6, (1993), pp. 620-623.
Notification of Transmittal of the International Search Report and the Written Opinion of the International Searching Authority dated Jan. 22, 2010 for International Application No. PCT/US2009/004107.
Copending U.S. Appl. No. 12/721,080, filed Mar. 10, 2010, Subramanian Iyer et al.
Copending U.S. Appl. No. 12/503,675, filed Jul. 15, 2009, Jeremy Richard Lizotte et al.
Strasser, CFD Investigation of Gear Pump Mixing Using Deforming/Agglomerating Mesh, J. Fluids Eng.—Apr. 2007—vol. 129, Issue 4, 476 (9 pages).
Notification of Transmittal of the International Search Report and the Written Opinion of the International Searching Authority dated Apr. 28, 2011 for International Application No. PCT/US2011/026942.
U.S. Office Action dated Apr. 2, 2012 for copending U.S. Appl. No. 12/503,675.
U.S. Office Action dated May 7, 2012 for copending U.S. Appl. No. 12/721,080.
Copending U.S. Appl. No. 13/616,672, filed Sep. 14, 2012, Jeremy Richard Lizotte et al.
Copending U.S. Appl. No. 13/616,681, filed Sep. 14, 2012, Jeremy Richard Lizotte et al.
U.S. Office Action dated Dec. 6, 2012 for copending U.S. Appl. No. 12/503,675.
Copending U.S. Appl. No. 13/706,408, filed Dec. 6, 2012, Tony Wayne Helton.
U.S. Office Action dated Jan. 11, 2013 for copending U.S. Appl. No. 12/721,080.
U.S. Office Action dated Feb. 26, 2013 for copending U.S. Appl. No. 13/616,672.
U.S. Office Action dated Feb. 27, 2013 for copending U.S. Appl. No. 13/616,681.
Copending U.S. Appl. No. 13/861,412, filed Apr. 12, 2013, Gordon L. King.
U.S. Offfice Action dated Jul. 16, 2013 in copending U.S. Appl. No. 13/706,408.
Notification of Transmittal of the International Search Report and the Written Opinion of the International Searching Authority dated Jul. 18, 2013 for International Application No. PCT/US2013/037957.
U.S. Office Action dated Aug. 23, 2013 in copending U.S. Appl. No. 12/721,080.
U.S. Office Action dated Sep. 13, 2013 in copending U.S. Appl. No. 13/616,681.
Fred W. Billmeyer, Jr., Textbook of Polymer Science, $3^{rd}$ Edition, John Wiley & Sons, Inc., New York, p. 153 (1984).

(56) References Cited

OTHER PUBLICATIONS

Carraher, Introduction to Polymer Chemistry $3^{rd}$ Edition, CRC Press, Taylor & France Group, Boca Raton FL p. 240 (2013).
U.S. Office Action dated Jan. 6, 2014 in copending U.S. Appl. No. 12/503,675.
Notification of Transmittal of the International Search Report and the Written Opinion of the International Searching Authority, or the Declaration—International Application No. PCT/US2013/072546 dated Mar. 11, 2014.
Notice of Allowance received in Co-pending U.S. Appl. No. 12/721,080 dated Apr. 10, 2014.
Notice of Allowance received in Co-pending U.S. Appl. No. 13/706,408 dated May 12, 2014.
U.S. Office Action dated Jun. 2, 2014 in copending U.S. Appl. No. 13/616,672.
U.S. Notice of Allowance dated Jun. 20, 2014 in co-pending U.S. Appl. No. 13/706,408.
U.S. Office Action dated Aug. 29, 2014 in copending U.S. Appl. No. 12/503,675.
Copending U.S. Appl. No. 14/487,355, filed Sep. 16, 2014, Tony Wayne Helton.
Copending U.S. Appl. No. 14/496,529, filed Sep. 25, 2014, Jennifer Lynne Peavey.
Copending U.S. Appl. No. 14/496,483, filed Sep. 25, 2014, Jennifer Lynne Peavey.
Copending U.S. Appl. No. 14/496,567, filed Sep. 25, 2014, Chad Alan Frazier.
Copending U.S. Appl. No. 14/496,508, filed Sep. 25, 2014, Jennifer Lynne Peavey.
U.S. Office Action dated Dec. 19, 2014in copending U.S. Appl. No. 13/616,672.
ASTM D4541; "Standard Test Method for Pull-Off Strength of Coatings Using Portable Adhesion Testers"; Published Apr. 2009.
Copending U.S. Appl. No. 14/571,568, filed Dec. 16, 2014, Kevin Michael Cable.
Notification of Transmittal of the International Search Report and the Written Opinion of the International Searching Authority, or the Declaration—International Application No. PCT/US2014/059839 dated Jan. 22, 2015.
U.S. Office Action dated Mar. 25, 2015 in copending U.S. Appl. No. 14/496,567.
Notification of Transmittal of the International Search Report and the Written Opinion of the International Searching Authority, or the Declaration—International Application No. PCT/US2014/059824 dated Mar. 30, 2015.
ASTM D882; "Standard Test Method for Tensile Properties of Thin Plastic Sheeting"; Published Sep. 2012.
ASTM D1037; "Evaluating Properties of Wood-Based Fiber and Particle Panel Materials"; Published Jun. 2012.
Chemical Abstract Services No. 25852-37-3.
U.S. Office Action dated May 11, 2015 in copending U.S. Appl. No. 12/503,675.
Office Action dated Aug. 14, 2015 received in U.S. Appl. No. 13/616,672.
U.S. Office Action dated Apr. 27, 2015 in co-pending U.S. Appl. No. 13/616,681.
U.S. Office Action dated Sep. 25, 2012 for copending U.S. Appl. No. 12/721,080.
Office Communication notification dated Sep. 14, 2015 received in co-pending U.S. Appl. No. 13/616,681.
Notification of Transmittal of The International Search Report and The Written Opinion of the International Searching Authority, or the Declaration—International Application No. PCT/US2015/065681 dated Mar. 8, 2016.
Office Communication notification dated Oct. 27, 2015 received in co-pending U.S. Appl. No. 12/503,675.
Office Communication notification dated Apr. 11, 2016 received in co-pending U.S. Appl. No. 12/503,675.
Notice of Allowance and Fee(s) Due dated May 18, 2016 received in U.S. Appl. No. 13/616,672.
Office Action notification dated Jan. 6, 2016 received in co-pending U.S. Appl. No. 14/487,355.
Office Communication notification dated Apr. 27, 2016 received in co-pending U.S. Appl. No. 14/496,483.
Office Communication notification dated Nov. 18, 2015 received in co-pending U.S. Appl. No. 14/496,567.
Office Communication notification dated Mar. 2, 2016 received in co-pending U.S. Appl. No. 14/496,567.
Office Communication notification dated Sep. 23, 2016 received in co-pending U.S. Appl. No. 12/503,675.
Notice of Allowance and Fee(s) Due dated Sep. 28, 2016 received in U.S. Appl. No. 13/616,672.
Office Communication notification dated Oct. 14, 2016 received in co-pending U.S. Appl. No. 13/616,681.
Office Communication notification dated Sep. 28, 2016 received in co-pending U.S. Appl. No. 14/496,549.
Office Communication notification dated Jul. 12, 2016 received in co-pending U.S. Appl. No. 14/496,508.
Office Communication notification dated Dec. 12, 2016 received in co-pending U.S. Appl. No. 14/496,508.
Office Communication notification dated Aug. 18, 2016 received in co-pending U.S. Appl. No. 14/496,567.
Office Communication notification dated Jan. 12, 2017 received in co-pending U.S. Appl. No. 14/487,355.
Office Communication notification dated Oct. 26, 2016 received in co-pending U.S. Appl. No. 14/496,483.
Office Communication notification date Nov. 3, 2016 received in co-pending U.S. Appl. No. 14/571,568.
Notice of Allowance and Fee(s) Due dated Jan. 30, 2017 received in U.S. Appl. No. 13/616,672.
Office Communication notification dated Feb. 21, 2017 received in co-pending U.S. Appl. No. 13/616,681.
Office Communication notification dated Feb. 22, 2017 received in co-pending U.S. Appl. No. 14/496,483.
Office Communication notification dated Mar. 9, 2017 received in co-pending U.S. Appl. No. 14/496,567.

* cited by examiner

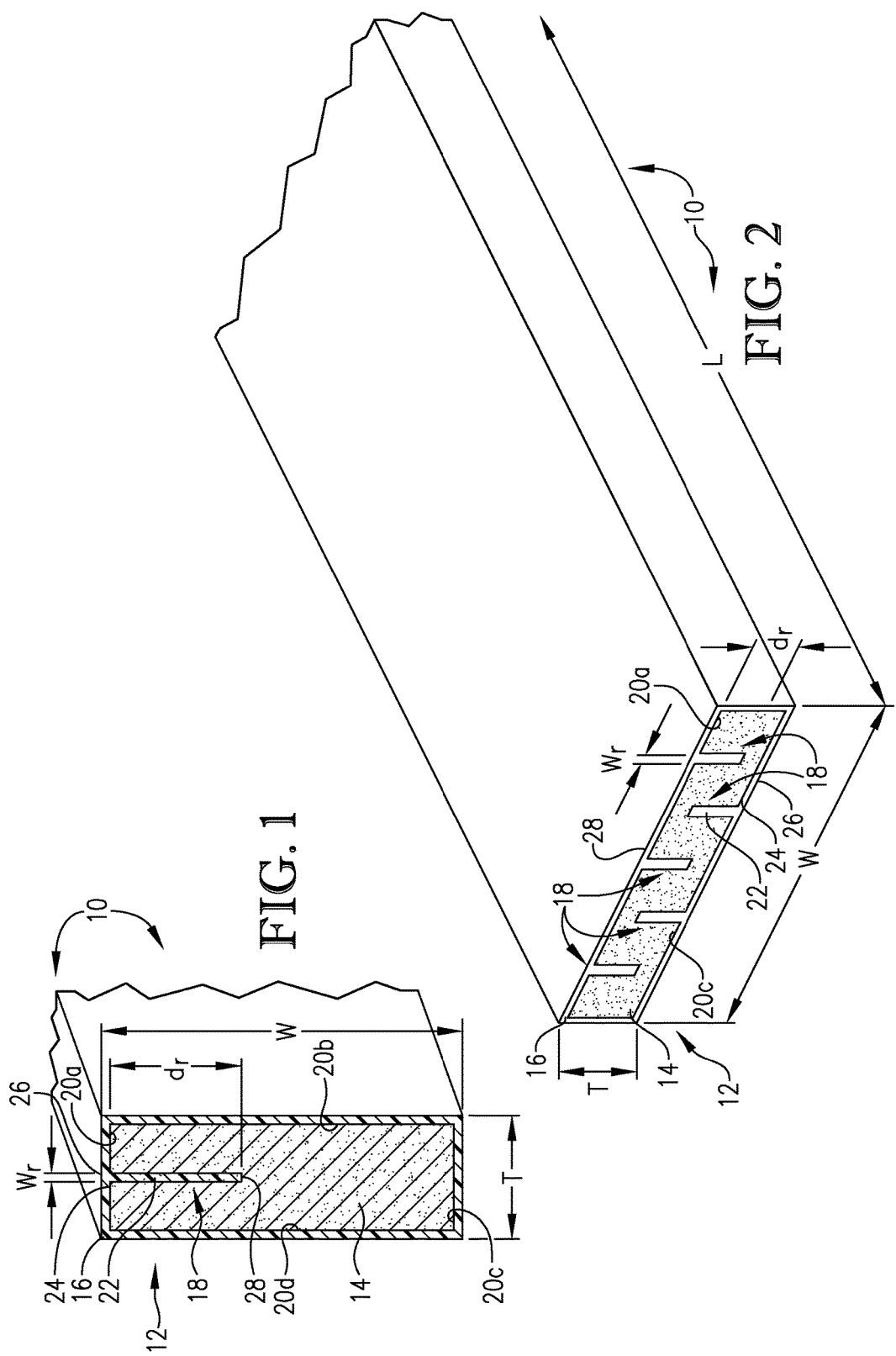

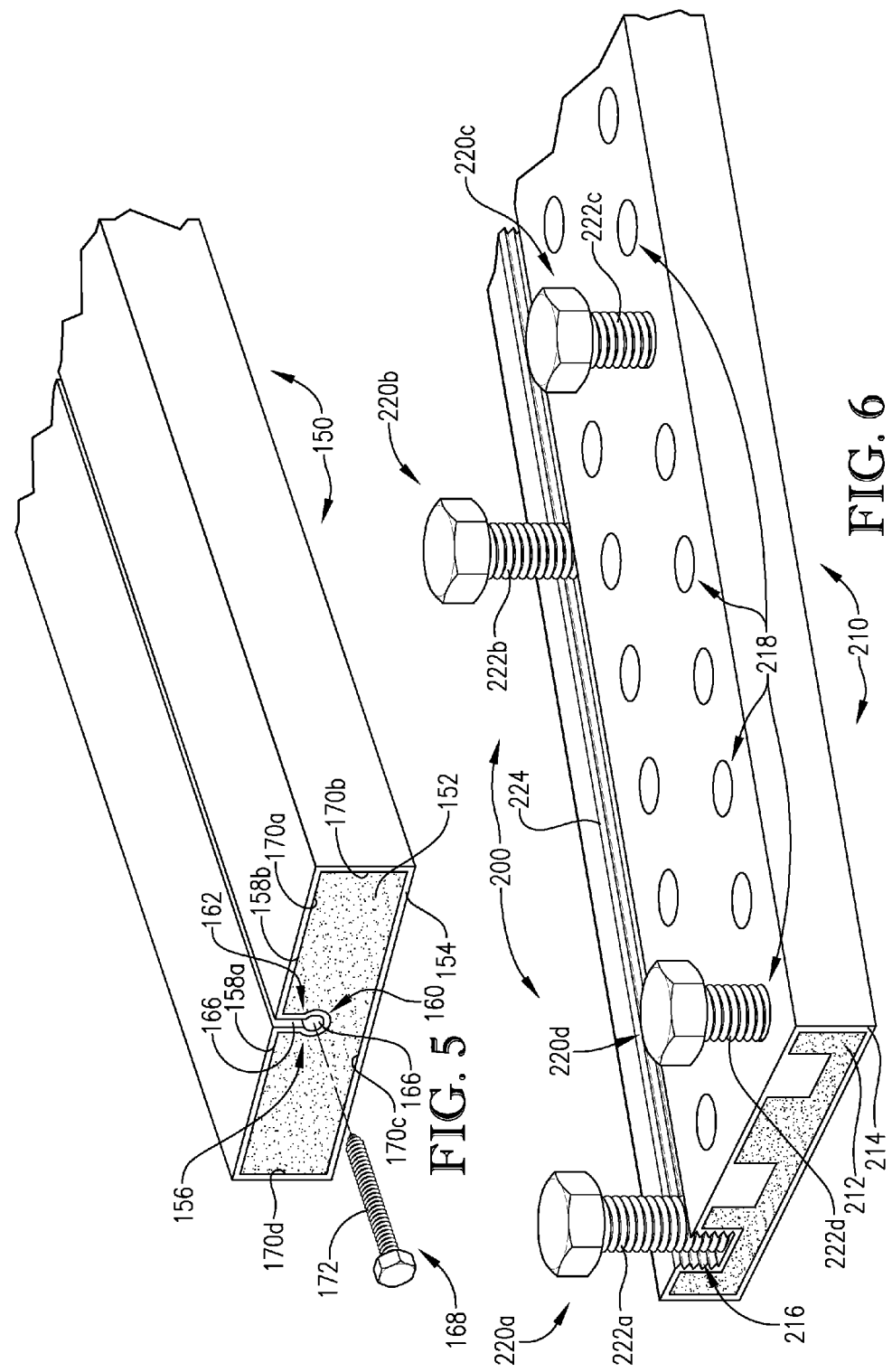

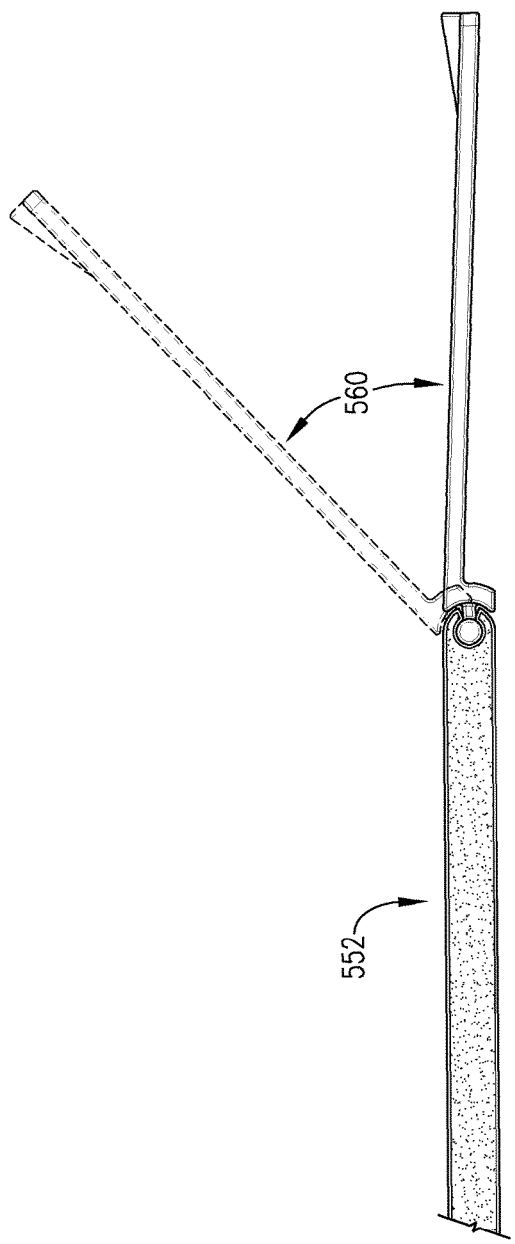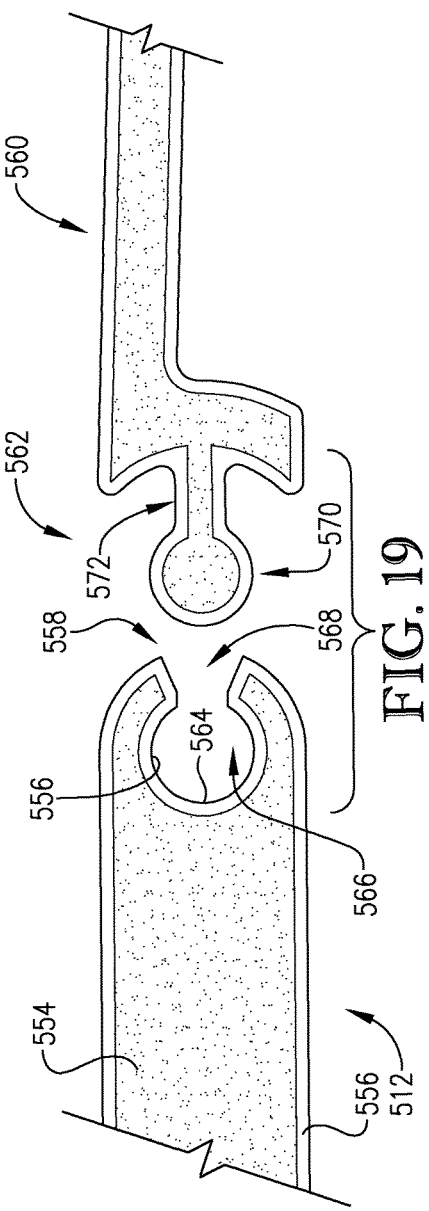

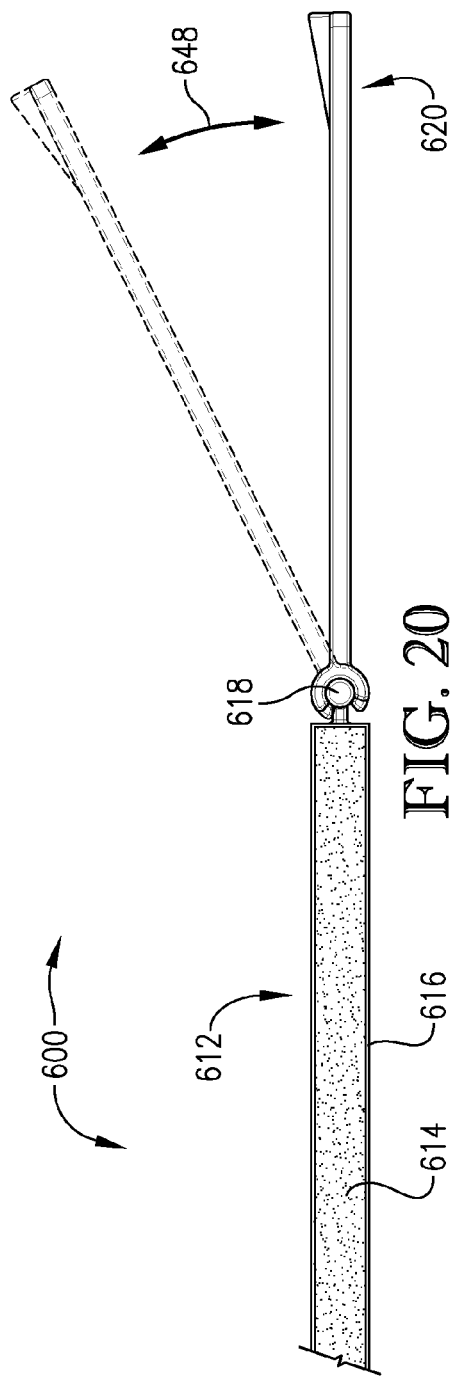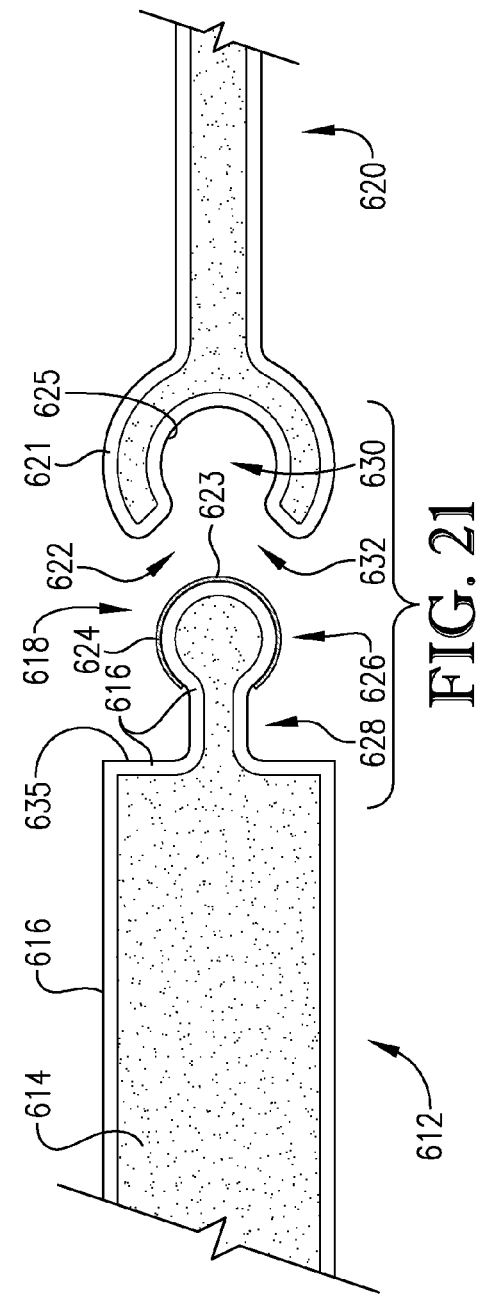

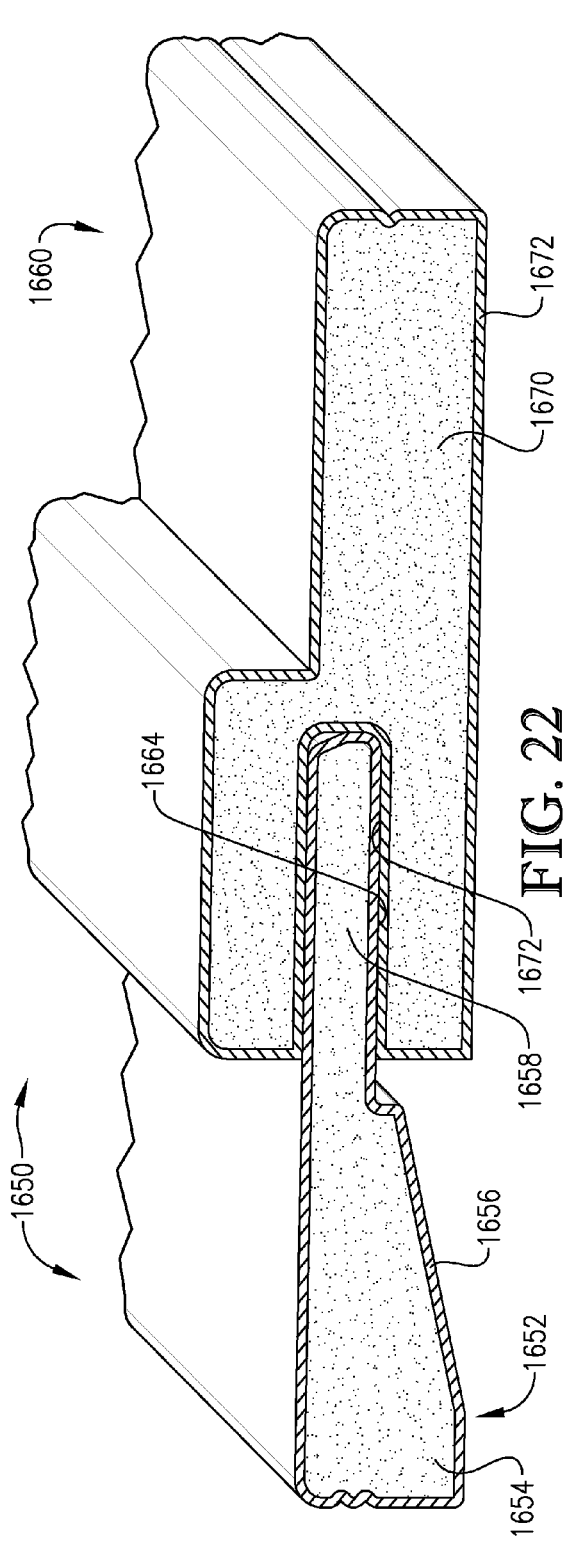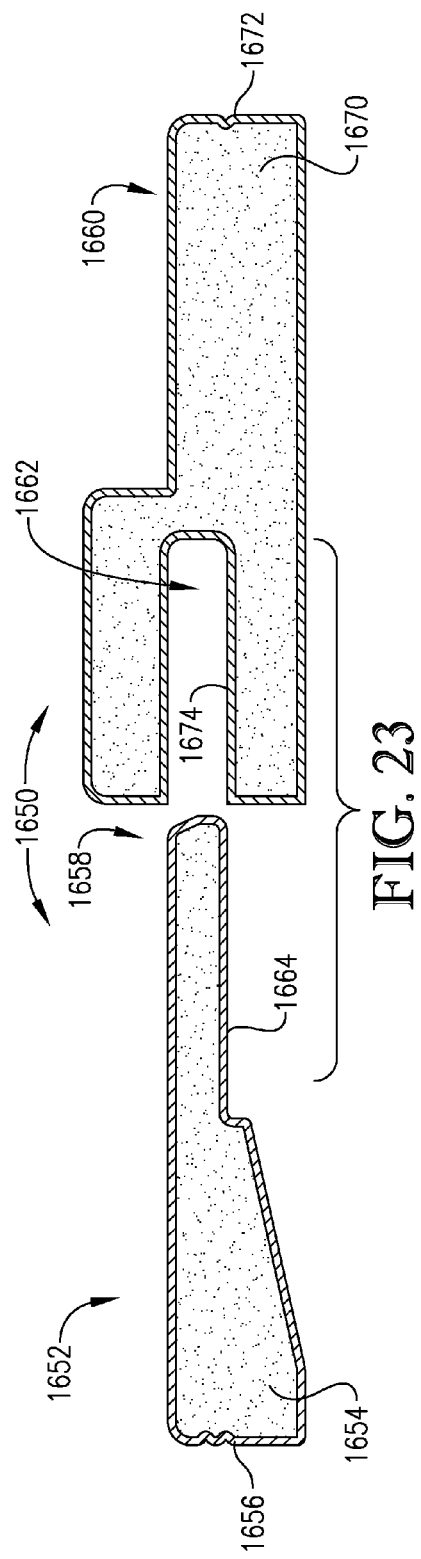

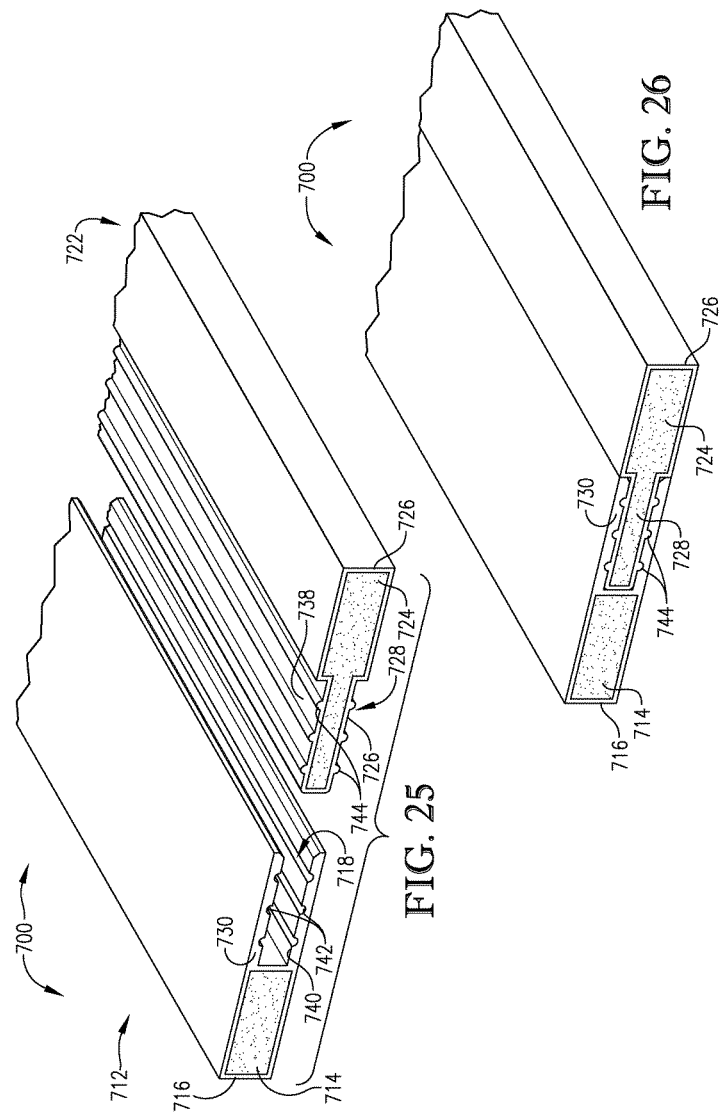

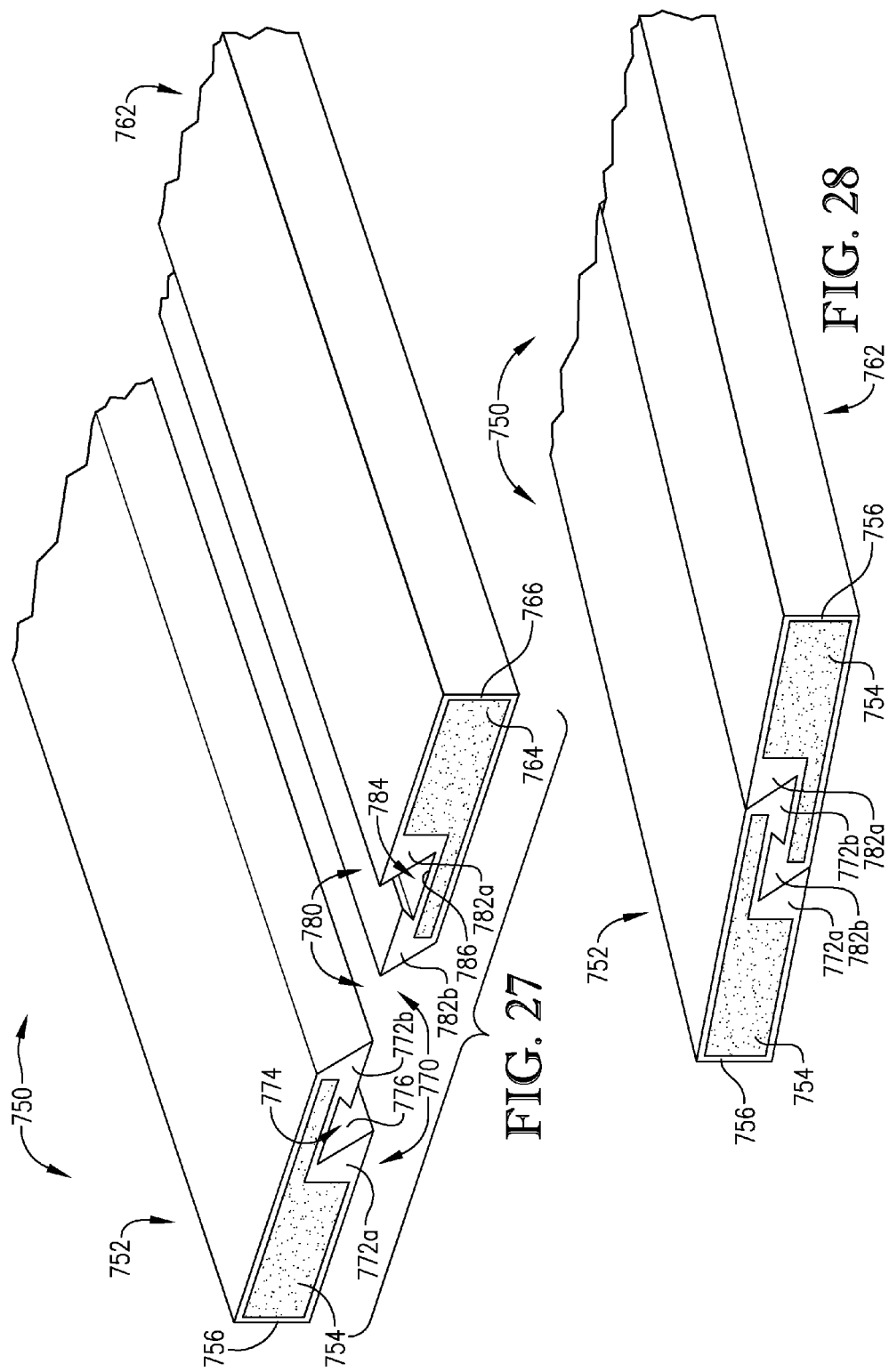

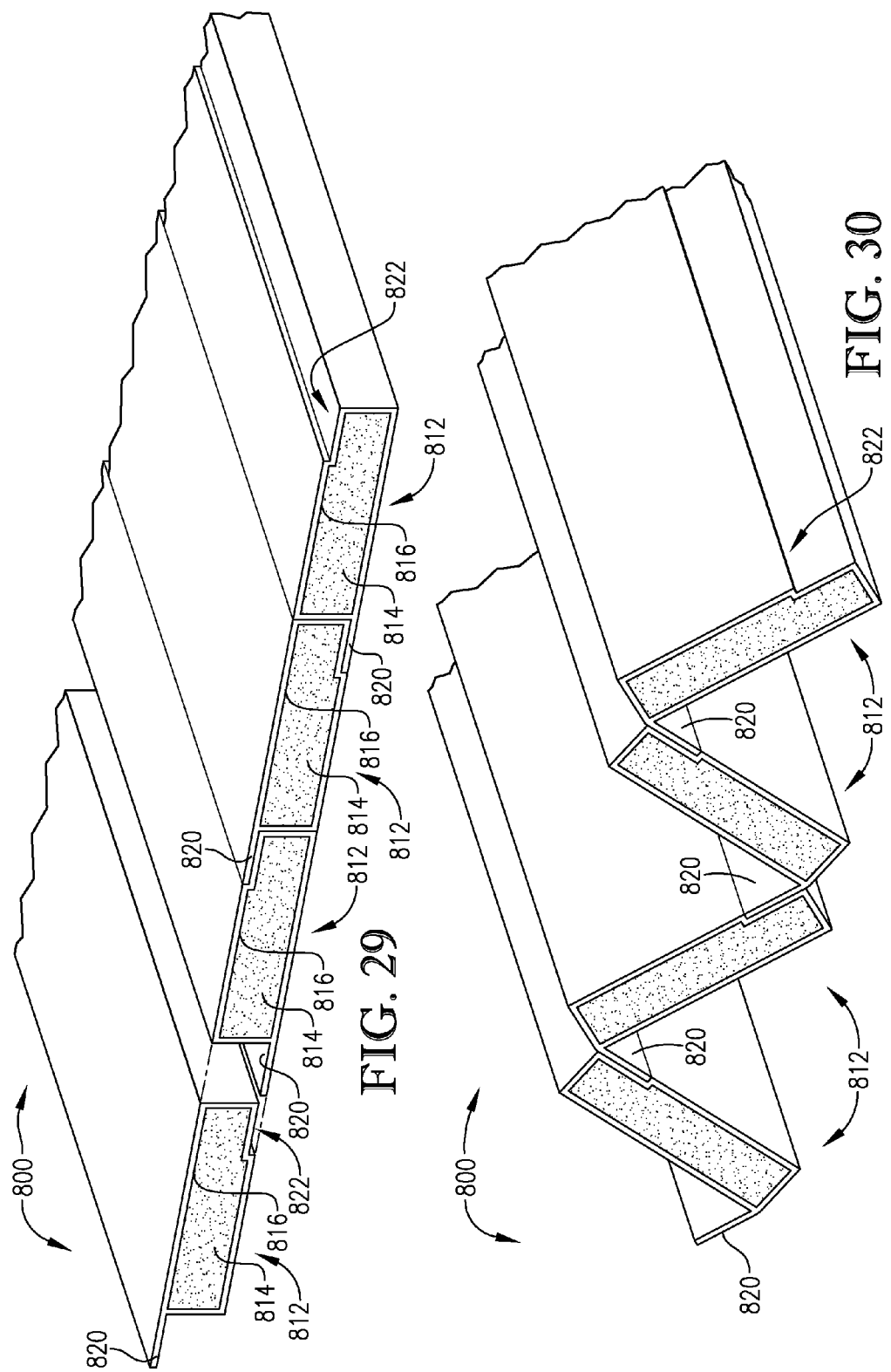

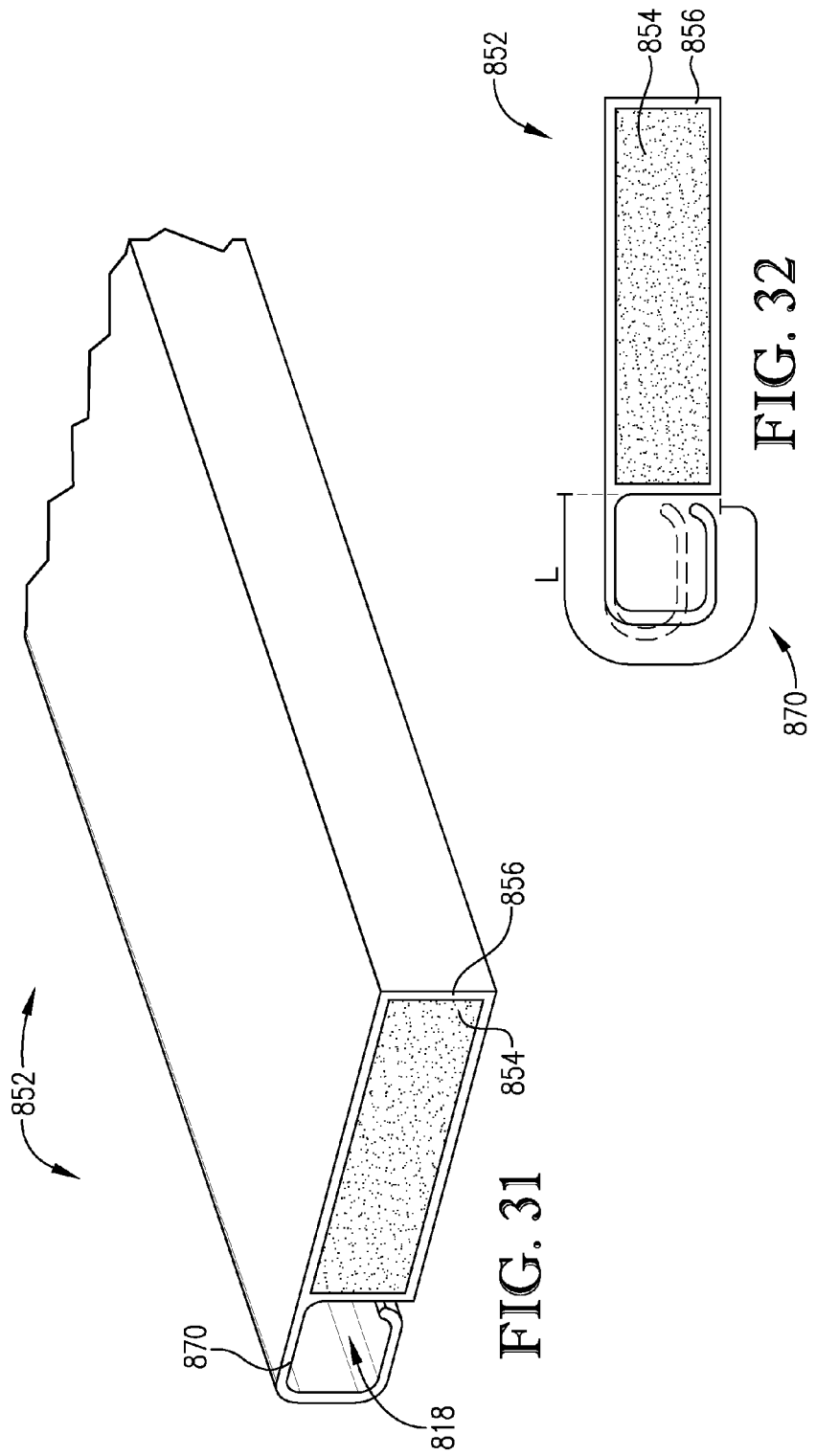

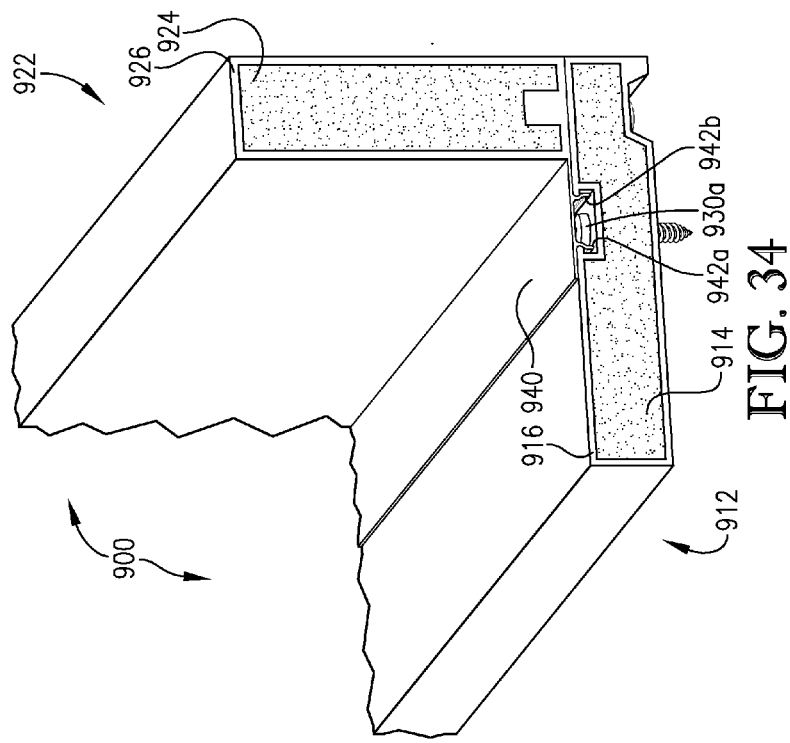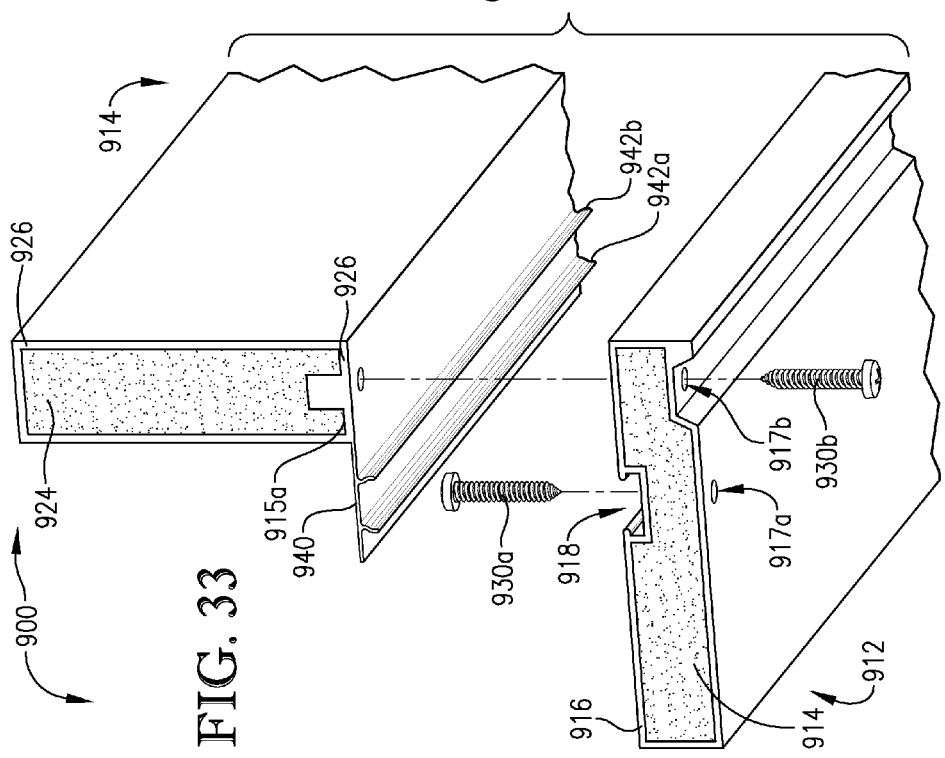

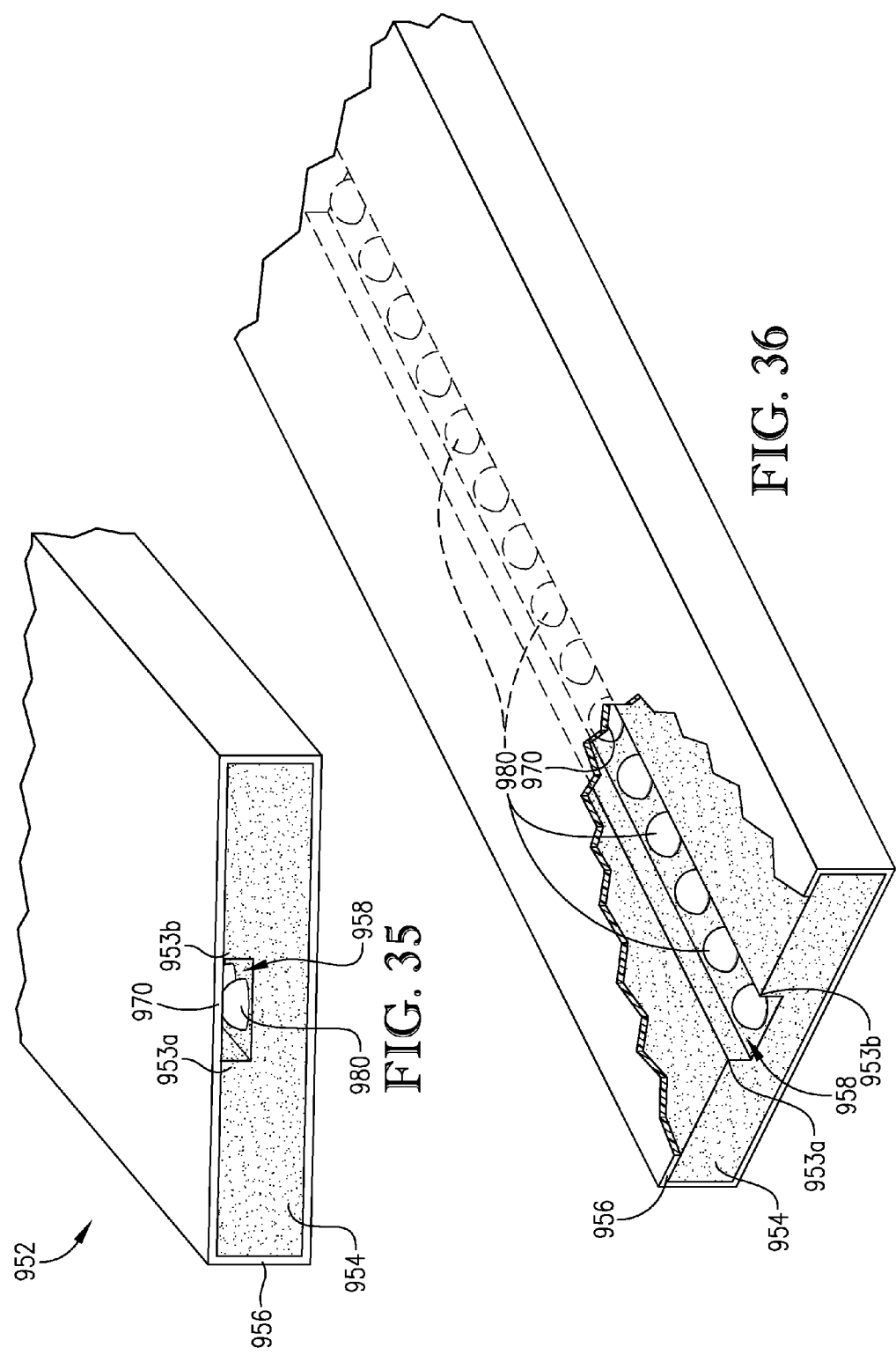

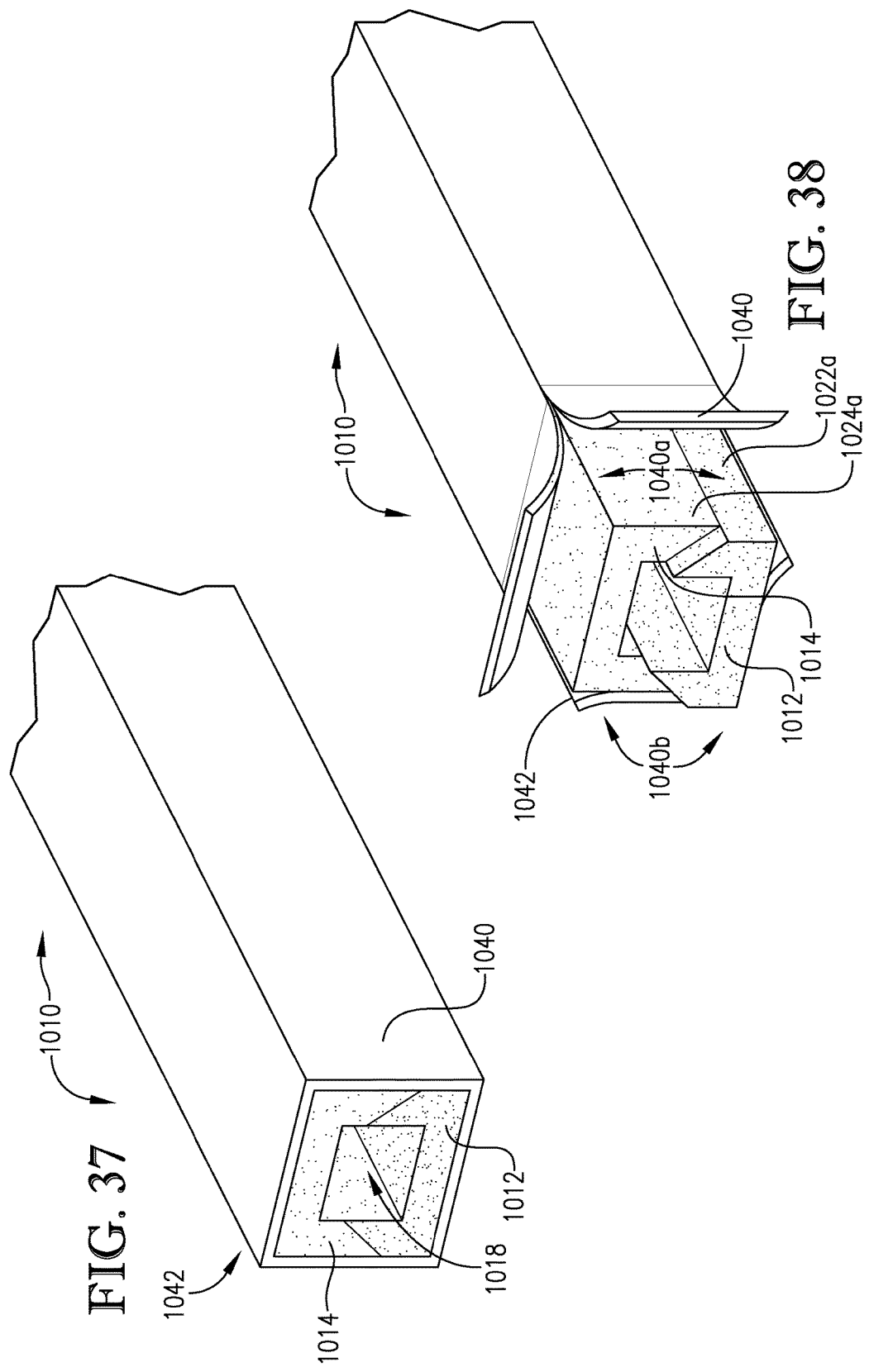

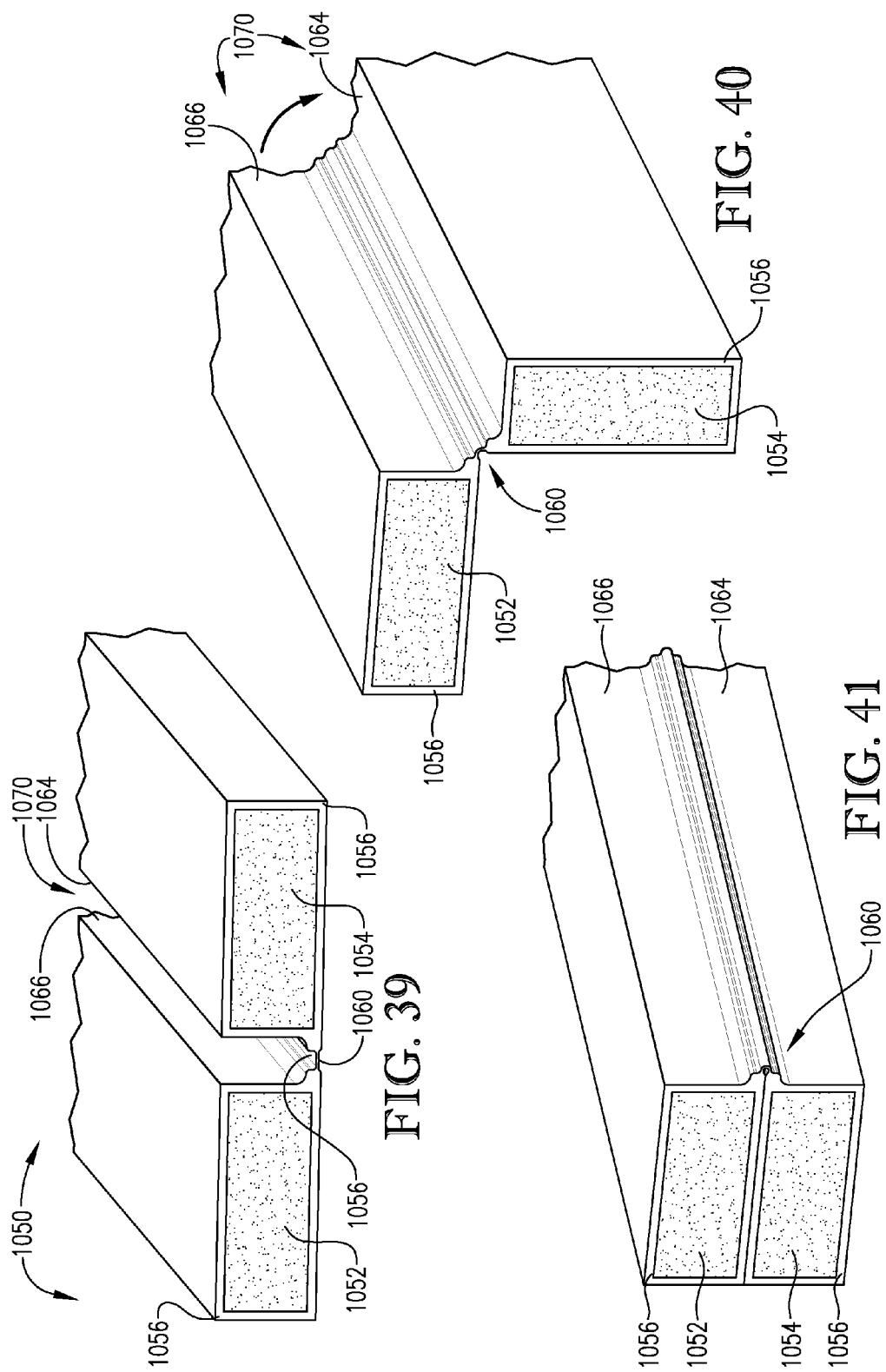

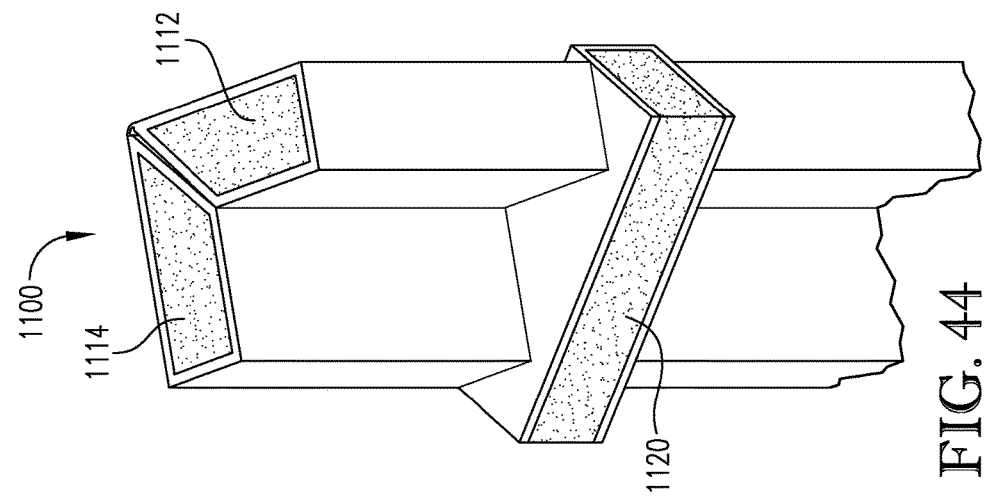
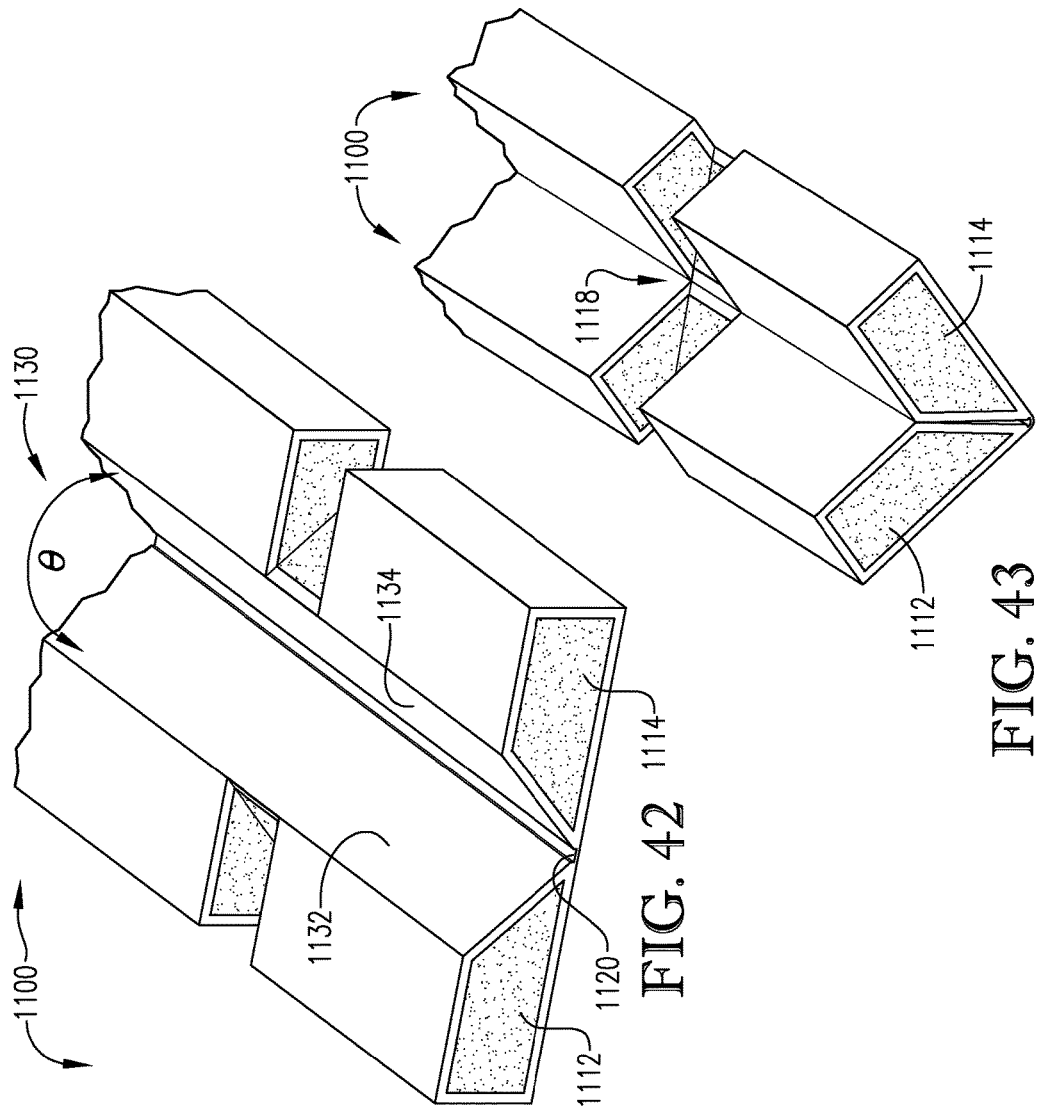

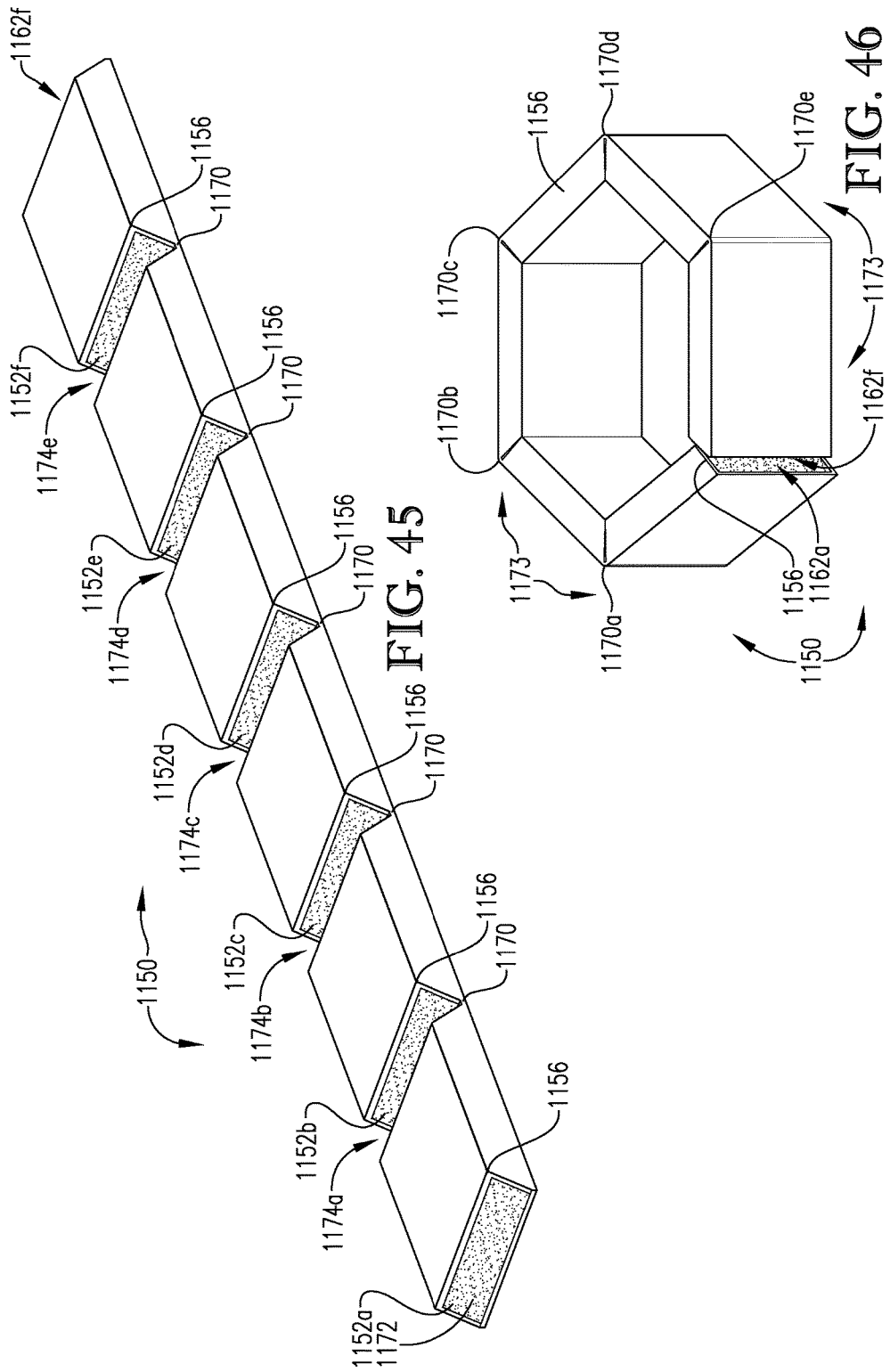

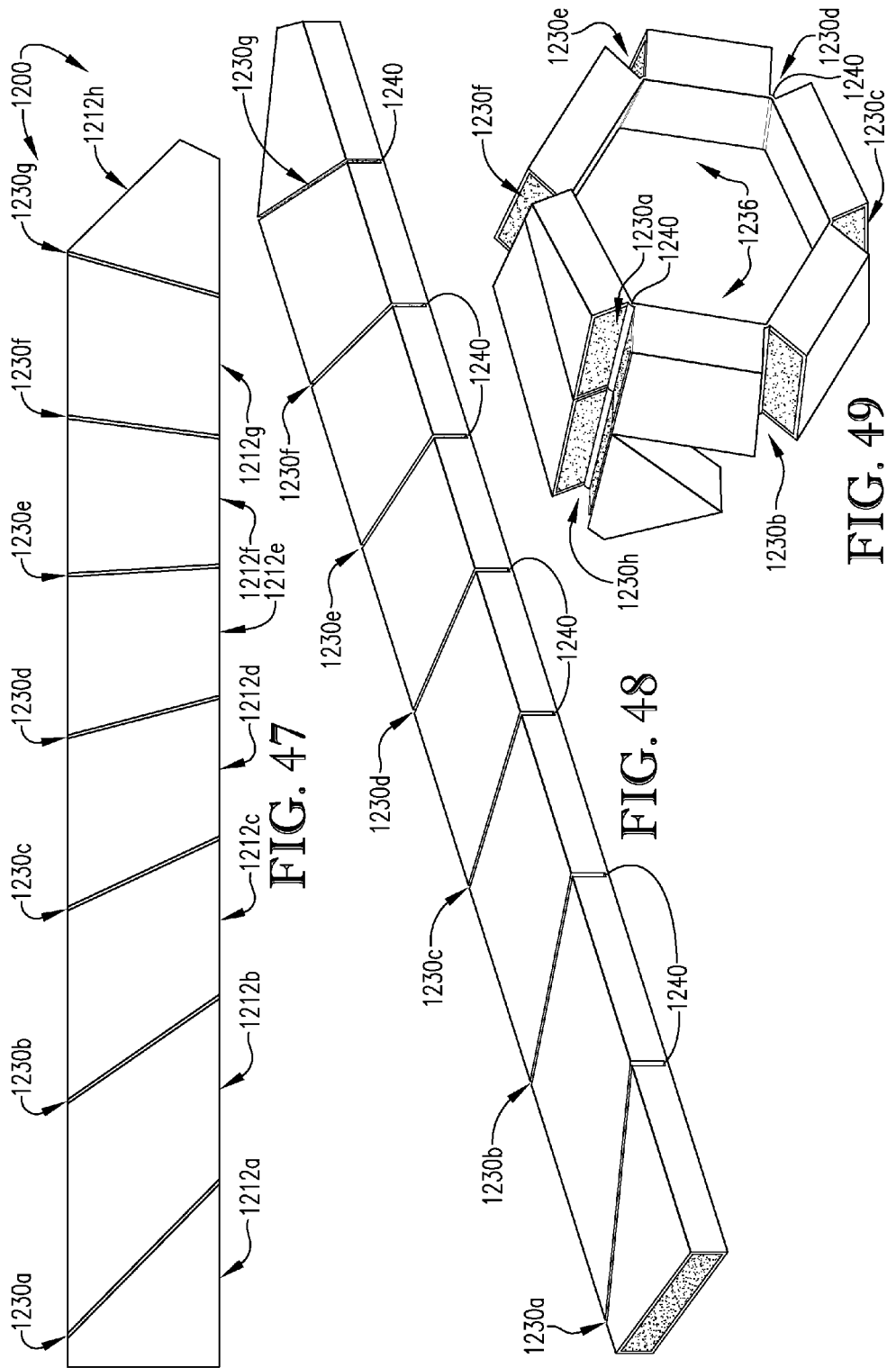

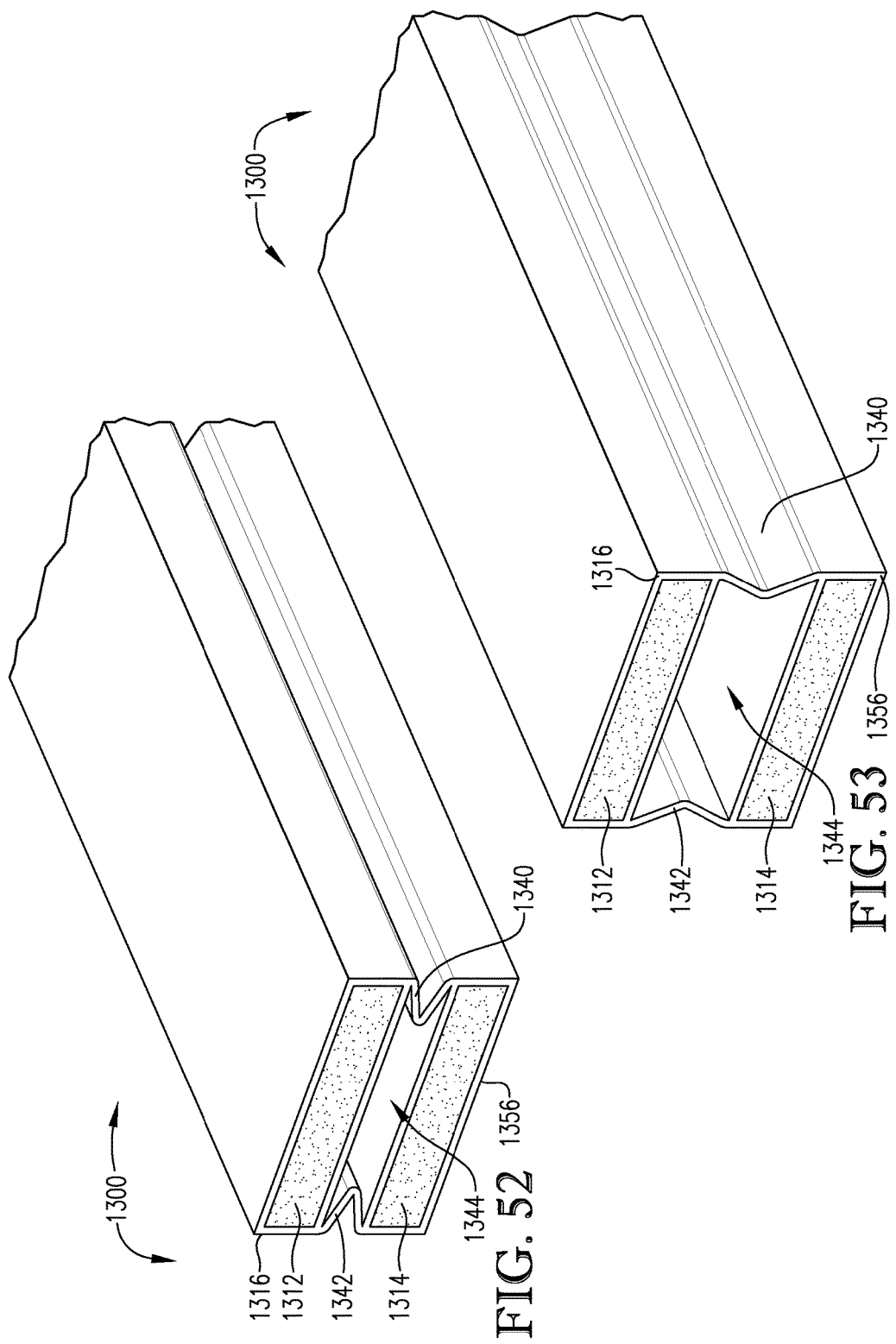

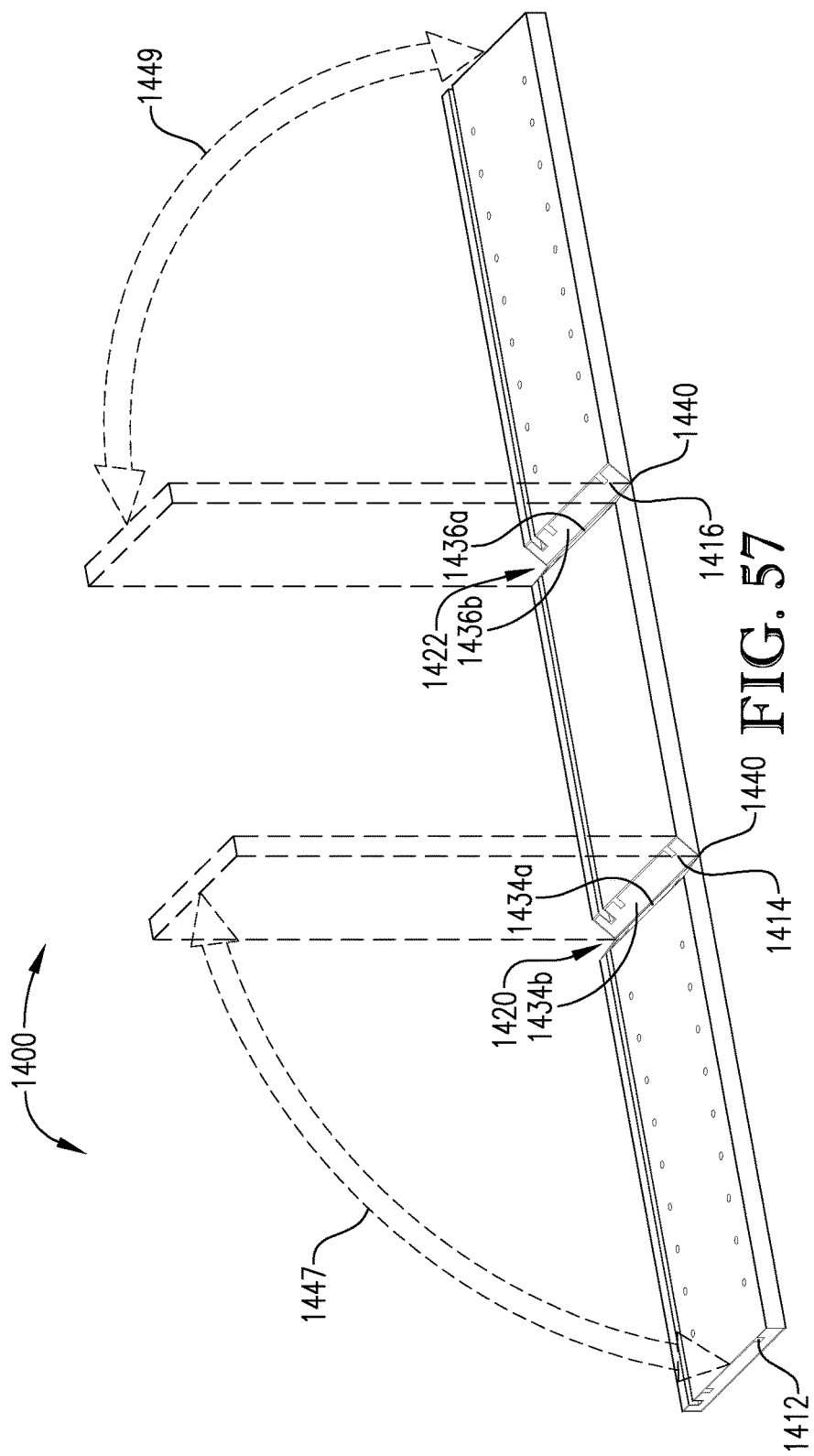

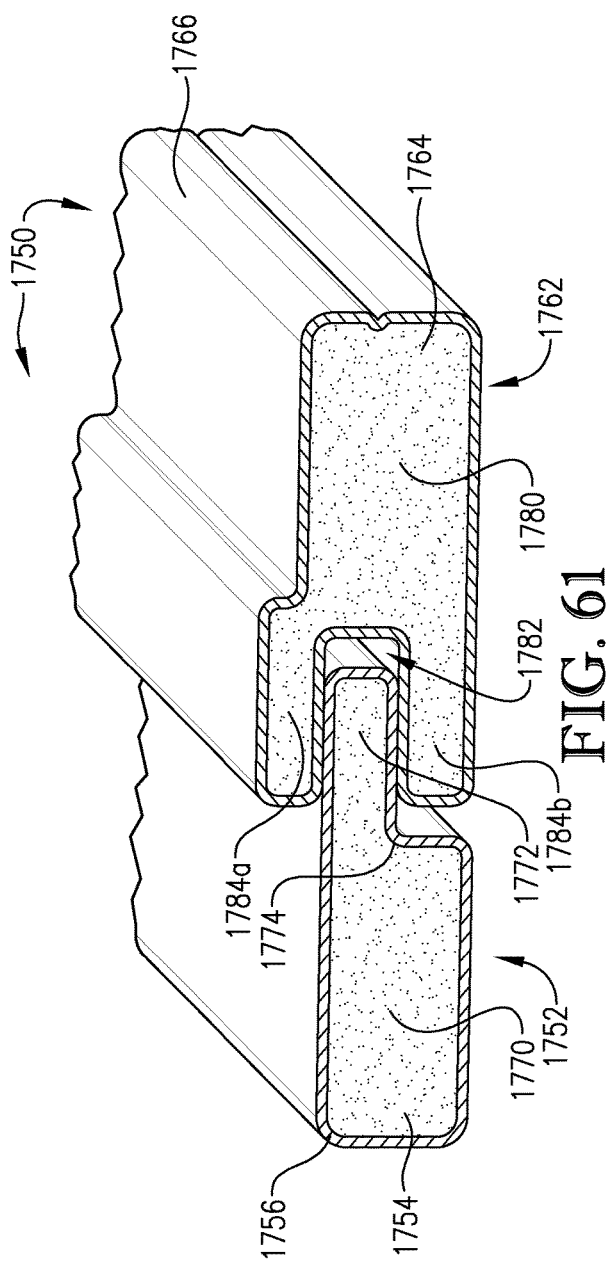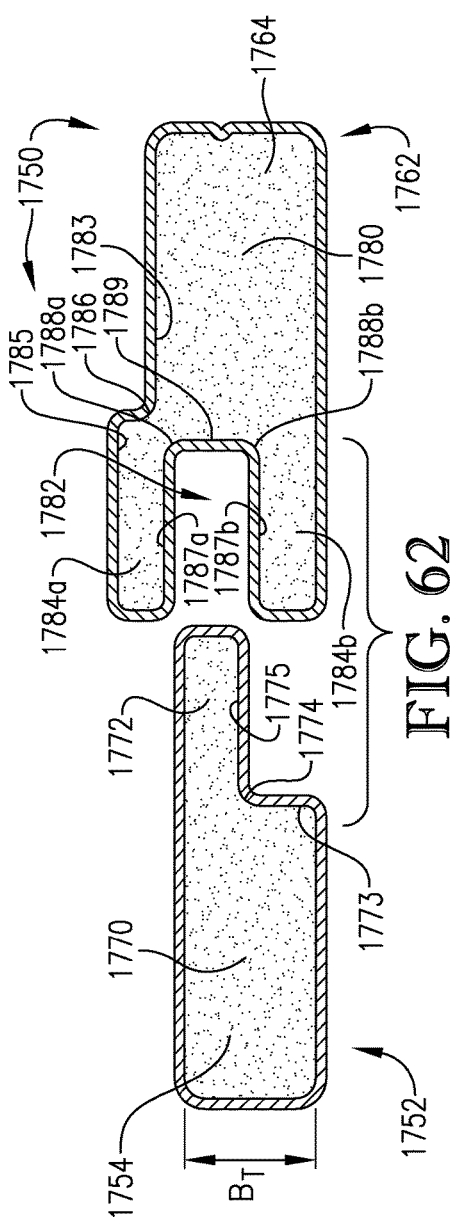
FIG. 61
FIG. 62

US 9,744,707 B2

EXTRUSION-COATED STRUCTURAL MEMBERS HAVING EXTRUDED PROFILE MEMBERS

CROSS REFERENCE TO RELATED APPLICATIONS

This application claims the benefit of U.S. Provisional Application Ser. No. 61/892,599, filed Oct. 18, 2013.

FIELD OF THE INVENTION

This invention relates to structural systems. In particular, the present invention relates to structural systems useful as furniture and in other applications, as well as methods of making and using the same.

BACKGROUND

Ready-to-assemble items, such as furniture, shelving, and even construction-related materials, are widely used by consumers in a number of different applications. Although such items are generally more convenient than traditional items to manufacture, ship, store, and construct, conventional ready-to-assemble structures have room for improvement, both in terms of functionality and aesthetics. Further, many ready-to-assemble structures lack strength and durability and, oftentimes, have a limited usable life, especially when exposed to heavy use, rough service, and/or repeated assembly and disassembly. One proposed method of enhancing the strength, durability, and/or aesthetics of a ready-to-assemble structure is to apply a coating material to each of the components of the system. Unfortunately, many coating materials used in such applications exhibit poor adhesion to the underlying substrate and/or fail to exhibit a desirable final appearance, resulting in an overall low-quality product. Other coatings are difficult to apply or can only be applied to relatively simple substrates having planar surfaces without cuts, grooves, channels, or other complex geometries or geometric features, greatly limiting the design and functionality of the resulting system.

Thus, a need exists for improved structural systems with greater durability, enhanced functionality, and a higher aesthetic value that are also simple to manufacture, ship, assemble, and use. Preferably, such structures would also be capable of being produced both conveniently and inexpensively, while still providing final products having a high level of quality.

SUMMARY

One embodiment of the present invention concerns an extrusion-coated structural system comprising: an extrusion-coated structural member comprising at least one substrate and a coating material extrusion coated onto at least a portion of the substrate, wherein the extrusion-coated structural member further comprises an extruded profile member formed of the coating material, wherein the extruded profile member extends outwardly from the substrate for a maximum distance that is at least two times greater than the average thickness of the coating material coated onto the substrate adjacent the extruded profile member.

Another embodiment of the present invention concerns a method of making an extrusion-coated structural system, the method comprising extrusion coating a coating material onto at least a portion of a substrate to form an extrusion-coated structural member, wherein the extrusion coating forms at least one extruded profile member extending outwardly from the substrate for a maximum distance that is at least two times greater than the average thickness of the coating material coated onto the substrate proximate the extruded profile member.

Yet another embodiment of the present invention concerns a method for assembling an extrusion-coated structural system, the method comprising the following steps: (a) providing a first extrusion-coated structural member comprising a substrate and a coating material extrusion coated onto at least a portion of the substrate, wherein the first extrusion-coated structural member comprises an extruded profile member formed of the coating material, wherein the extruded profile member extends outwardly from the substrate for a maximum distance that is at least two times greater than the average thickness of the coating material proximate the extruded profile member; (b) providing a second structural element presenting a contact surface; and (c) contacting at least a portion of the extruded profile member with the contact surface of the second structural element to form at least a portion of the structural system.

BRIEF DESCRIPTION OF THE DRAWINGS

Various embodiments of the present invention are described in detail below with reference to the attached drawing figures, wherein:

FIG. 1 is a schematic cross-sectional view of one embodiment of an extrusion-coated structural member having a reinforced region;

FIG. 2 is a side perspective view of another embodiment of an extrusion-coated structural member having a reinforced region;

FIG. 5 is a side perspective view of another embodiment of an extrusion-coated structural system including at least one extrusion-coated structural member with a reinforced region;

FIG. 6 is a side perspective view of yet another embodiment of an extrusion-coated structural system including at least one extrusion-coated structural member with a reinforced region;

FIG. 18 is a side perspective view of the extrusion-coated structural system illustrated in FIG. 17;

FIG. 19 is a magnified schematic cross-sectional view of the connecting region between the hardware protrusion and structural recess of the extrusion-coated structural system shown in FIGS. 17 and 18;

FIG. 20 is a side view of another embodiment of an extrusion-coated structural system including an integrated hinge;

FIG. 21 is a magnified schematic cross-sectional view of the connecting region between the hardware recess and structural protrusion of the extrusion-coated structural system shown in FIG. 20;

FIG. 22 is a side perspective view of one embodiment of extrusion-coated structural system comprising a pair of extrusion-coated structural members;

FIG. 23 is a schematic cross-sectional view of the extrusion-coated structural system depicted in FIG. 22;

FIG. 25 is a side perspective view of another embodiment of an extrusion-coated structural system, arranged in a disassembled configuration;

FIG. 26 is a side perspective view of the extrusion-coated structural system depicted in FIG. 25, with the panels arranged in an assembled configuration;

FIG. 27 is a side perspective view of another embodiment of an extrusion-coated structural system, arranged in a disassembled configuration;

FIG. 28 is a side perspective view of the extrusion-coated structural system depicted in FIG. 27, arranged in an assembled configuration;

FIG. 29 is a side perspective view of another embodiment of an extrusion-coated structural system, arranged in a disassembled configuration;

FIG. 30 is a side perspective view of the extrusion-coated structural system depicted in FIG. 29, arranged in an assembled configuration;

FIG. 31 is a side perspective view of one embodiment of an extrusion-coated structural member having an extruded profile member;

FIG. 32 is a schematic cross-sectional view of the extrusion-coated structural member depicted in FIG. 31;

FIG. 33 is a bottom perspective view of another embodiment of an extrusion-coated structural system having an extruded profile member;

FIG. 34 is side perspective view of the extrusion-coated structural system depicted in FIG. 33;

FIG. 35 is an end perspective view of one embodiment of an extrusion-coated structural system having an extrusion-coated structural member including a functional or aesthetic element;

FIG. 36 is a side perspective view of the extrusion-coated structural system depicted in FIG. 35;

FIG. 37 is a side perspective view of one embodiment of an extrusion-coated structural system having a bridging member;

FIG. 38 is a break-away perspective view of the extrusion-coated structural system shown in FIG. 37;

FIG. 39 is side perspective view of another embodiment of an extrusion-coated structural system comprising a bridging member, arranged in a flat configuration;

FIG. 40 is a side perspective view of the extrusion-coated structural system depicted in FIG. 39, arranged in a folded configuration;

FIG. 41 is a side perspective view of the extrusion-coated structural system depicted in FIGS. 39 and 40, arranged in another folded configuration;

FIG. 42 is side perspective view of yet another embodiment of an extrusion-coated structural system comprising a bridging member, arranged in a flat configuration;

FIG. 43 is a side perspective view of the extrusion-coated structural system depicted in FIG. 42, arranged in a folded configuration;

FIG. 44 is a side perspective view of the extrusion-coated structural system depicted in FIGS. 42 and 43, also including a securing member;

FIG. 45 is a side perspective view of one embodiment of an extrusion-coated structural system, arranged in a flat configuration;

FIG. 46 is a side perspective view of the extrusion-coated structural system shown in FIG. 45, arranged in a folded configuration;

FIG. 47 is a top perspective view of another embodiment of an extrusion-coated structural system, arranged in a flat configuration;

FIG. 48 is a side perspective view of the extrusion-coated structural system shown in FIG. 47;

FIG. 49 is a side perspective view of the extrusion-coated structural system shown in FIGS. 47 and 48, arranged in a folded configuration;

FIG. 52 is a side perspective view of still another embodiment of an extrusion-coated structural system, arranged in a compressed configuration;

FIG. 53 is a side perspective view of the extrusion-coated structural system shown in FIG. 52, arranged in an extended configuration;

FIG. 57 is a side perspective view of another embodiment of an extrusion-coated structural system, arranged in a flat configuration;

FIG. 61 is a side perspective view of one embodiment of an extrusion-coated structural system comprising a pair of extrusion-coated structural members;

FIG. 62 is a schematic cross-sectional view of the extrusion-coated structural system depicted in FIG. 61;

DETAILED DESCRIPTION

Figure 3:
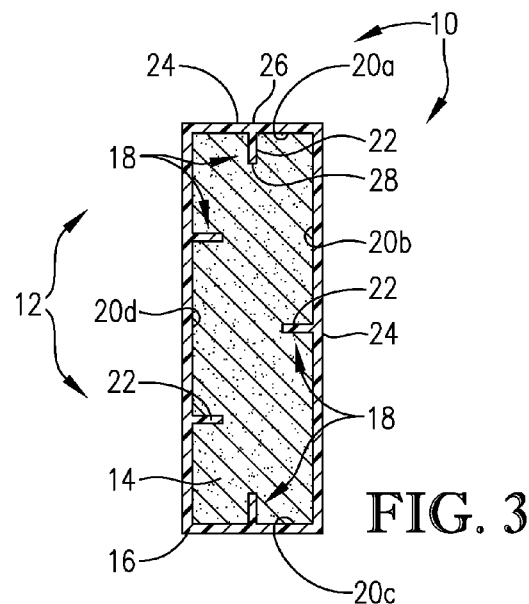
FIG. 3 is a schematic cross-sectional view of another embodiment of the extrusion-coated structural member shown in FIG. 1.

In one aspect, the present invention relates to extrusion-coated structural member and structural systems employing such structural members, as well as methods for making and using the same. Extrusion-coated structural systems configured according to embodiments of the present invention, can be more durable, easier to assemble, and provide enhanced aesthetic appearance over similar, conventionally-made articles. Additionally, structural systems of the present invention may be easier and/or less expensive to manufacture and/or ship, making these systems beneficial both for manufacturers and end users. Structural systems according to the present invention may be used in a variety of interior and exterior applications including, for example, as components of furniture or cabinetry, or as building materials such as flooring, wall covering, trim, molding, and the like.

In one embodiment, the extrusion-coated structural system can include at least one extrusion-coated structural member comprising at least one substrate and a coating material extrusion coated onto at least a portion of the substrate. As used herein, the term "extrusion coated" refers to a substrate which has been coated, or at least partially coated, with a coating material via an extrusion coating process. Extrusion coating can also include forming at least one extruded profile member spaced apart and extending outwardly from the substrate. Specific embodiments of extrusion-coated structural members including extruded profile members will be discussed in detail shortly. The coating material applied via extrusion coating may comprise a resin and can be applied under pressure and/or at an elevated temperature, although neither is required. In some embodiments, the coating material applied via extrusion coating may comprise at least one thermosetting and/or thermoplastic resin, optionally in combination with additional components. Examples of suitable coating materials and types of substrates suitable for use in the extrusion-coated structural systems of the present invention will be discussed in detail shortly.

In one embodiment, the extrusion-coated structural system can include at least one extrusion-coated structural member having a reinforced region. As used herein, the term "reinforced region" refers to an area of a structural member having increased strength and/or flexibility as compared to another area of the structural member. In one embodiment, the reinforced region or regions of the structural member may include a coating material applied with a greater thickness than the coating material applied to other regions of the substrate. For example, in one embodiment, the average thickness of the coating material applied to the reinforced region of the structural member can be at least about 2, at least about 3, at least about 4, at least about 5, at least about 10 times greater than the average thickness of the coating material applied to the remainder of the structural member. In some cases, the average thickness of the coating material in the reinforced region may be at least about 2, at least about 3, at least about 4, at least about 5, or at least about 10 times greater than the average thickness of the coating material applied to the substrate proximate the reinforced region. Additionally, or in the alternative, the maximum thickness of the coating material applied to the reinforced region may be at least about 2, at least about 3, at least about 5, at least about 10 times greater than the maximum thickness of the coating material applied to the remainder of the substrate and/or the average thickness of the coating material applied to the substrate proximate the reinforced region. The coating material applied to the reinforced region may be the same as, or different than, the coating material applied to the rest of the structural member.

Turning now to FIGS. 1-3, several embodiments of extrusion-coated structural members including at least one reinforced region are provided. Turning first to FIG. 1, one embodiment of an extrusion-coated structural member 10 that includes at least one reinforced region 12 is shown. As shown in FIG. 1, structural member 10 comprises at least one substrate 14 and a coating material 16 coated onto at least a portion of substrate 14. Preferably, coating material 16 has been extrusion coated onto substrate 14. Reinforced region 12 of structural member 10 is shown as including at least one structural recess 18 extending inwardly from an outer surface 20*a* of substrate 14. A coating material 22 extrusion can have been extrusion coated onto at least a portion of structural recess 18 or, alternatively, the coating may have been applied in another manner, such as, for example, via brushing, spraying, and/or dipping. Coating material 22 can be the same as, or different than, coating material 16 coated onto the outer surfaces 20*a-d* of substrate 14.

The average thickness of coating material 22, measured from the upper surface 26 of coating material 22 to the bottom 28 of recess 18, may be greater than the average thickness of coating material 16 applied to a near-recess external surface 24 of substrate 14. For example, in one embodiment, the average thickness of coating material 22 within structural recess 18 can be at least about 1.5, at least about 2, at least about 5 times thicker than the average thickness of coating material 16 applied to near-recess external surface 24. Additionally, the maximum thickness of coating material 22 within structural recess 18 can be at least about 2, at least about 3, at least about 5, at least about 10 times and/or not more than about 100, not more than about 50, not more than about 25, not more than about 15 times greater than the maximum thickness of coating material 16 applied to near-recess external surface 24 and/or than the average thickness of coating material 16 applied to the at least a portion of surfaces 20*a-d* of substrate 14.

In one embodiment, the maximum thickness of coating material 22 within structural recess 18 can be in the range of from about 1.5 to about 100, about 1.5 to about 50, about 1.5 to about 25, about 1.5 to about 15, about 2 to about 100, about 2 to about 50, about 2 to about 25, about 2 to about 15, about 3 to about 100, about 3 to about 50, about 3 to about 25, about 3 to about 15, about 5 to about 100, about 5 to about 50, about 5 to about 25, about 5 to about 15, about 10 to about 100, about 10 to about 50, about 10 to about 25, about 10 to about 15 times greater than the maximum thickness of coating material 16 applied to near-recess external surface 24 and/or than the average thickness of coating material 16 applied to the at least a portion of surfaces 20*a-d* of substrate 14.

The average thickness of coating material 16 coated onto surfaces 20*a-d* and/or near-recess external surface 24 of substrate 14 can be at least about 0.001, at least about 0.005, at least about 0.010 inches and/or not more than about 0.025, not more than about 0.020, not more than about 0.015 inches, or in the range of from about 0.001 to about 0.025 inches, about 0.001 to about 0.020 inches, about 0.001 to about 0.015 inches, about 0.005 to about 0.025 inches, about 0.005 to about 0.020 inches, about 0.025 to about 0.015 inches, about 0.010 to about 0.025 inches, about 0.010 to about 0.020 inches, about 0.010 to about 0.015 inches. The average thickness of coating material 22 disposed within recess 18 can be at least about 0.001 inches, at least about 0.005 inches, at least about 0.01 inches, at least about 0.02 inches and/or not more than about 0.50 inches, not more than about 0.25 inches, not more than about 0.10 inches, not more than about 0.05 inches, depending on the specific configuration of the structural member. The average thickness of average thickness of coating material 22 disposed within recess 18 can be in the range of from about 0.001 to about 0.50 inches, about 0.001 to about 0.25 inches, about 0.001 to about 0.10 inches, about 0.001 to about 0.05 inches, about 0.005 to about 0.50 inches, about 0.005 to about 0.25 inches, about 0.005 to about 0.10 inches, about 0.005 to about 0.05 inches, about 0.01 to about 0.50 inches, about 0.01 to about 0.25 inches, about 0.01 to about 0.10 inches, about 0.01 to about 0.05 inches, about 0.02 to about 0.50 inches, about 0.02 to about 0.25 inches, about 0.02 to about 0.10 inches, about 0.02 to about 0.05 inches.

In one embodiment, structural recess 18 can be at least partially, or entirely, filled with coating material 22. For example, in one embodiment, at least about 40 percent, at least about 50 percent, at least about 60 percent, at least about 75 percent, at least about 80 percent, or at least about 90 percent of at least one lateral cross-section of structural recess 18 can be filled with coating material 22. In the same or another embodiment, at least about 40 percent, at least about 50 percent, at least about 60 percent, at least about 75 percent, at least about 80 percent, or at least about 90 percent, at least about 95 percent of the total volume of structural recess 18 can be filled with coating material 22. In one embodiment, coating material 22 can fill structural recess 18 beyond the inlet of structural recess 18 defined by substrate 14, such that the uppermost surface 26 of coating material 22 applied to structural recess 18 can be continuous with coating material 16 coated onto near-recess external surface 24, as shown in the embodiments depicted in FIGS. 1-3.

Extrusion-coated structural member 10 can include any suitable number of structural recesses 18. In one embodiment depicted in FIG. 1, extrusion-coated structural member 10 can include a single structural recess 18, while in another embodiment, examples of which are shown in FIGS. 2 and 3, extrusion-coated structural member 10 can include a plurality of structural recess 18 extending from one or more outer surfaces 20 of substrate 14. In one embodiment, structural member 10 can include at least 2, at least 4, at least 5 and/or not more than 20, not more than 15, not more than 10 recesses, or can include about 2 to about 20, about 4 to about 15, or about 5 to about 10 recesses extending from one or more surfaces 20 of substrate 14. When substrate 14 includes more than one recess 18, the structural recesses may have the same size, shape, and/or be coated with the same type of coating material, or at least one of the size, shape, and/or coating material applied to one or more of structural recesses 18 may be different than the size, shape, and/or coating material applied to one or more of the other of structural recesses 18.

When structural member 10 includes more than one structural recess, all or a portion of the recesses may extend from the same surface and/or one or more recesses may extend from a different surface than one or more other recesses. When one or more recesses extend from different surfaces, the surfaces may be adjacent surfaces, such as, for example, surfaces 20*a* and 20*b* in FIG. 3. Alternative, the different surfaces from which the recesses extend may be opposite surfaces, such as, for example, surfaces 20*a* and 20*c* shown in FIG. 2. When at least a portion of the recesses extend from opposite surfaces, the recesses can be arranged in a staggered configuration, as shown in FIG. 2, or at least a portion of the recesses 18 can be directly opposed from one another. The spacing between adjacent structural recesses 18 extending from a single surface 20*a-d* can be at least about 5 percent, at least about 10 percent, at least about 20 percent and/or not more than 50 percent, not more than about 40 percent, not more than about 30 percent of the total length of the surface 20*a-d* from which the recesses 18 extend. The spacing between adjacent structural recesses 18 extending from a single surface 20*a-d* can be in the range of from about 5 to about 50 percent, about 5 to about 40 percent, about 5 to about 30 percent, about 10 to about 50 percent, about 10 to about 40 percent, about 10 to about 30 percent, about 20 to about 50 percent, about 20 to about 40 percent, about 20 to about 30 percent.

In one embodiment, the ratio of the depth ($d_r$) of structural recess 18 to the dimension of substrate 14 parallel to the depth of structural recess 18 can be at least about 0.10:1, at least about 0.25:1, at least about 0.50:1 and/or not more than about 0.99:1, not more than about 0.90:1, not more than about 0.85:1, or in the range of from about 0.10:1 to about 0.99:1, about 0.10:1 to about 0.90:1, about 0.10:1 to about 0.85:1, about 0.25:1 to about 0.99:1, about 0.25:1 to about 0.90:1, about 0.25:1 to about 0.85:1, about 0.50:1 to about 0.99:1, about 0.50:1 to about 0.90:1, about 0.50:1 to about 0.85:1. As used herein, the "depth" of a structural recess is defined as the distance that the structural recess extends into the substrate. For example, as shown in the embodiment depicted in FIG. 1, when structural recess 18 of extrusion-coated structural member 10 extends inwardly from surface 20*a*, which defines the thickness (T) or shortest dimension of substrate 14, the depth ($d_r$) of structural recess 18 is parallel to surfaces 20*b* and 20*d*, which are illustrated in FIG. 1 as defining the width (W), or second longest dimension, of the substrate 14. Thus, in this embodiment, the ratio of the depth ($d_r$) of structural recess 18 to the width of substrate 14 can fall within the ranges described above.

Alternatively, according to another embodiment depicted in FIG. 2, if structural recess 18 extends from a surface 20a that defines the width (W) of substrate 14, the depth ($d_r$) of the structural recess 18 is parallel to the thickness (T) of substrate 14. Thus, in this embodiment, the ratio of the depth ($d_r$) of structural recess 18 to the thickness of substrate 14 may fall within one or more ranges described above. In further embodiments (not shown in FIGS. 1 and 2), the structural recess of the structural member may extend through the entire width or thickness of the structural member such that the ratio of the depth of the recess to the dimension of the substrate parallel to the depth of the structural recess can be about 1:1.

Similarly, the "width" of the structural recess ($w_r$) refers to the dimension of the structural recess parallel to the surface from which the structural recess extends. For example, as shown in the embodiment in FIG. 1, if the structural recess 18 extends from an outer surface 20a of substrate 14 that defines the thickness (T) of substrate 14, the width ($w_r$) of structural recess 18 may be parallel to the thickness (T) of substrate 14. Alternatively, as shown in the embodiment depicted in FIG. 2, if the structural recess 18 extends from an outer surface 20a of substrate 14 that defines the width (W) of substrate 14, the width ($w_r$) of structural recess 18 can be parallel to the width (W) of substrate 14. The ratio of the width of the structural recess to the dimension of the substrate parallel to the width of the structural recess can be at least about 0.005:1, at least about 0.010:1, at least about 0.025:1 and/or not more than about 0.2:1, not more than about 0.10:1, not more than about 0.05:1, or ratio of the width of the structural recess to the dimension of the substrate parallel to the width of the structural recess can be in the range of from about 0.005:1 to about 0.2:1, about 0.005:1 to about 0.1:1, about 0.005:1 to about 0.05:1, about 0.010:1 to about 0.2:1, about 0.010:1 to about 0.1:1, about 0.010:1 to about 0.05:1, about 0.025:1 to about 0.2:1, about 0.025:1 to about 0.1:1, about 0.025:1 to about 0.05:1.

In one embodiment, the width and/or depth of the structural recess can be substantially constant, while, in another embodiment, one or both recess dimensions may change along the length of the recess. According to one embodiment, the ratio of the maximum width of the structural recess ($w_r$) to its maximum depth ($d_r$) can be at least about 0.001:1, at least about 0.01:1, at least about 0.05:1, at least about 0.10:1, at least about 0.50:1, at least about 1:1 and/or not more than about 5:1, not more than about 4:1, not more than about 2:1, not more than about 1:1, not more than about 0.50:1, not more than about 0.25:1, not more than about 0.10:1.

The ratio of the maximum width of the structural recess ($w_r$) to its maximum depth ($d_r$) can be in the range of from about 0.001:1 to about 5:1, about 0.001:1 to about 4:1, about 0.001:1 to about 2:1, about 0.001:1 to about 1:1, about 0.001:1 to about 0.5:1, about 0.001:1 to about 0.25:1, about 0.001:1 to about 0.10:1, about 0.01:1 to about 5:1, about 0.01:1 to about 4:1, about 0.01:1 to about 2:1, about 0.01:1 to about 1:1, about 0.01:1 to about 0.5:1, about 0.01:1 to about 0.25:1, about 0.01:1 to about 0.10:1, about 0.05:1 to about 5:1, about 0.05:1 to about 4:1, about 0.05:1 to about 2:1, about 0.05:1 to about 1:1, about 0.05:1 to about 0.5:1, about 0.05:1 to about 0.25:1, about 0.05:1 to about 0.10:1, about 0.1:1 to about 5:1, about 0.1:1 to about 4:1, about 0.1:1 to about 2:1, about 0.1:1 to about 1:1, about 0.1:1 to about 0.5:1, about 0.1:1 to about 0.25:1, about 0.5:1 to about 5:1, about 0.5:1 to about 4:1, about 0.5:1 to about 2:1, about 0.5:1 to about 1:1, about 1:1 to about 5:1, about 1:1 to about 4:1, about 1:1 to about 2:1.

The structural recess may extend along at least a portion of the length, or longest dimension, of the structural member. In one embodiment, the structural recess may be an elongated recess and can extend along a portion of the length of the structural member such that the ratio of the length of the structural recess (not shown in FIGS. 1 and 2) to the length of the structural member (L) can be at least 0.50:1, at least about 0.60:1, at least about 0.75:1, at least about 0.85:1, at least about 0.90:1 and/or not more than about 1:1, not more than about 0.95:1, not more than about 0.90:1. The structural recess may extend along at least about 50 percent, at least about 60 percent, at least about 70 percent, at least about 80 percent, or at least about 90 percent of the total length of the substrate.

The ratio of the length of the structural recess to the length of the structural member (L) can be in the range of from about 0.50:1 to about 1:1, about 0.50:1 to about 0.95:1, about 0.50:1 to about 0.90:1, about 0.60:1 to about 1:1, about 0.60:1 to about 0.95:1, about 0.60:1 to about 0.90:1, about 0.75:1 to about 1:1, about 0.75:1 to about 0.95:1, about 0.75:1 to about 0.90:1, about 0.85:1 to about 1:1, about 0.85:1 to about 0.95:1, about 0.85:1 to about 0.90:1, about 0.90:1 to about 1:1, about 0.90:1 to about 0.95:1.

In another embodiment, the structural recess may not be an elongated slot and can be, for example, a shortened slot or a hole. According to this embodiment, the ratio of the length of the structural recess to the length of the structural member can be not more than about 0.50:1, not more than about 0.40:1, not more than about 0.30:1, not more than about 0.20:1, not more than about 0.10:1. The structural recess may extend along not more than about 50 percent, not more than about 40 percent, not more than about 30 percent, not more than about 20 percent, not more than about 10 percent of the total length of the substrate. Additionally, the ratio of the length of the structural recess to its maximum width can be at least about 0.25:1, at least about 0.50:1, at least about 0.75:1 and/or not more than about 1.5:1, not more than about 1.1:1, not more than about 0.90:1, or in the range of from about 0.25:1 to about 1.5:1, about 0.25:1, to about 1.1:1, about 0.25:1 to about 0.90:1, about 0.50:1 to about 1.5:1, about 0.50:1, to about 1.1:1, about 0.50:1 to about 0.90:1, about 0.75:1 to about 1.5:1, about 0.75:1, to about 1.1:1, about 0.75:1 to about 0.90:1.

Although shown in FIGS. 1-3 as being formed within a single substrate, the structural recess may also be collectively defined by two or more substrates positioned proximate one another. The structural recess can have any suitable cross-sectional shape, such as, for example, a square shape, a rectangular shape, a semi-circular shape, a triangular shape, or other polygonal shape.

Figure 4:
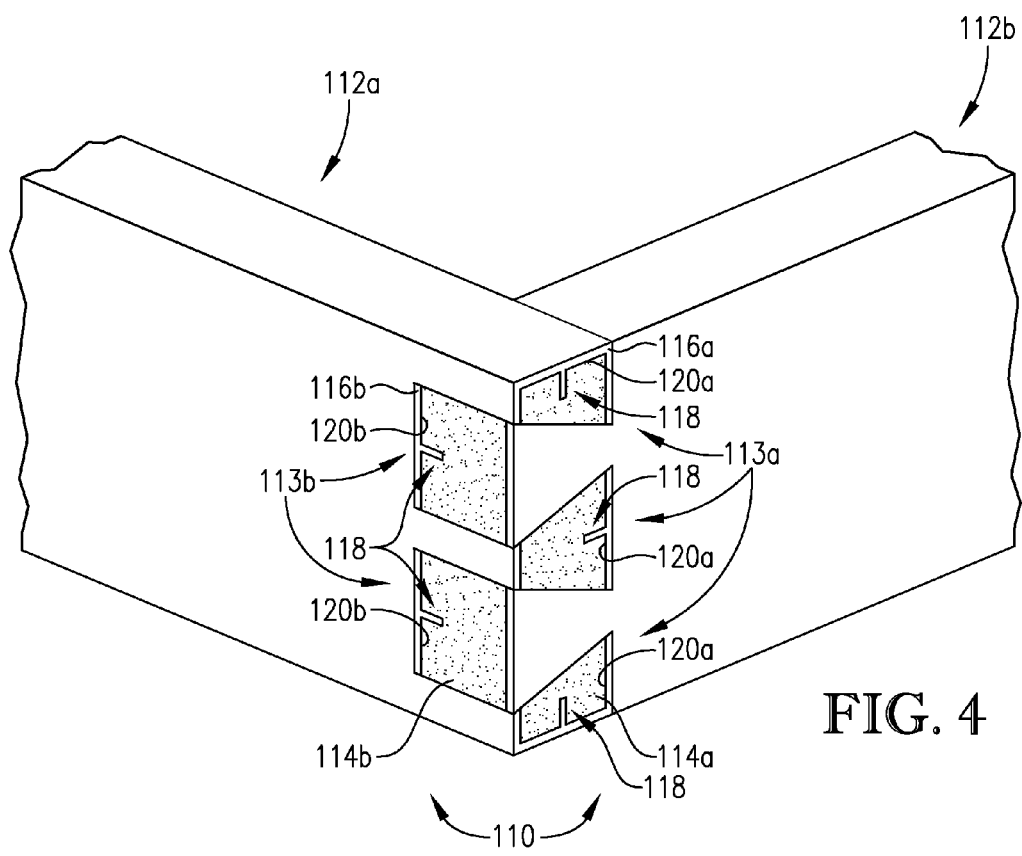
FIG. 4 is a side perspective view of one embodiment of an extrusion-coated structural system including at least one extrusion-coated structural member with a reinforced region.

Extrusion-coated structural systems configured according to the present invention can include one or more extrusion-coated structural members 10 as described above. For example, in one embodiment depicted in FIG. 4, extrusion-coated structural system 110 can include a pair of extrusion-coated structural members 112a,b, which each include a substrate 114a,b and a coating material 116a,b extrusion coated onto at least a portion of substrate 114a,b. As shown in the embodiment in FIG. 4, each of structural members 112a and 112b can include a reinforced region 113a, 113b positioned proximate to the location where structural members 112a,b are joined. In another embodiment (not shown), only one of substrates 112a or 112b may include a reinforced region 113. Each of reinforced regions 113a,b include one or a plurality of structural recesses 118 extending inwardly from at least one surface 120a, 120b of substrates 114a,b. Structural recesses 118 may be coated with a coating material having a thickness greater than the coating material coated onto substrate 114a,b proximate recesses 118 and/or may be further configured according to one or more embodiments described previously with respect to FIGS. 1-3.

Figure 7:
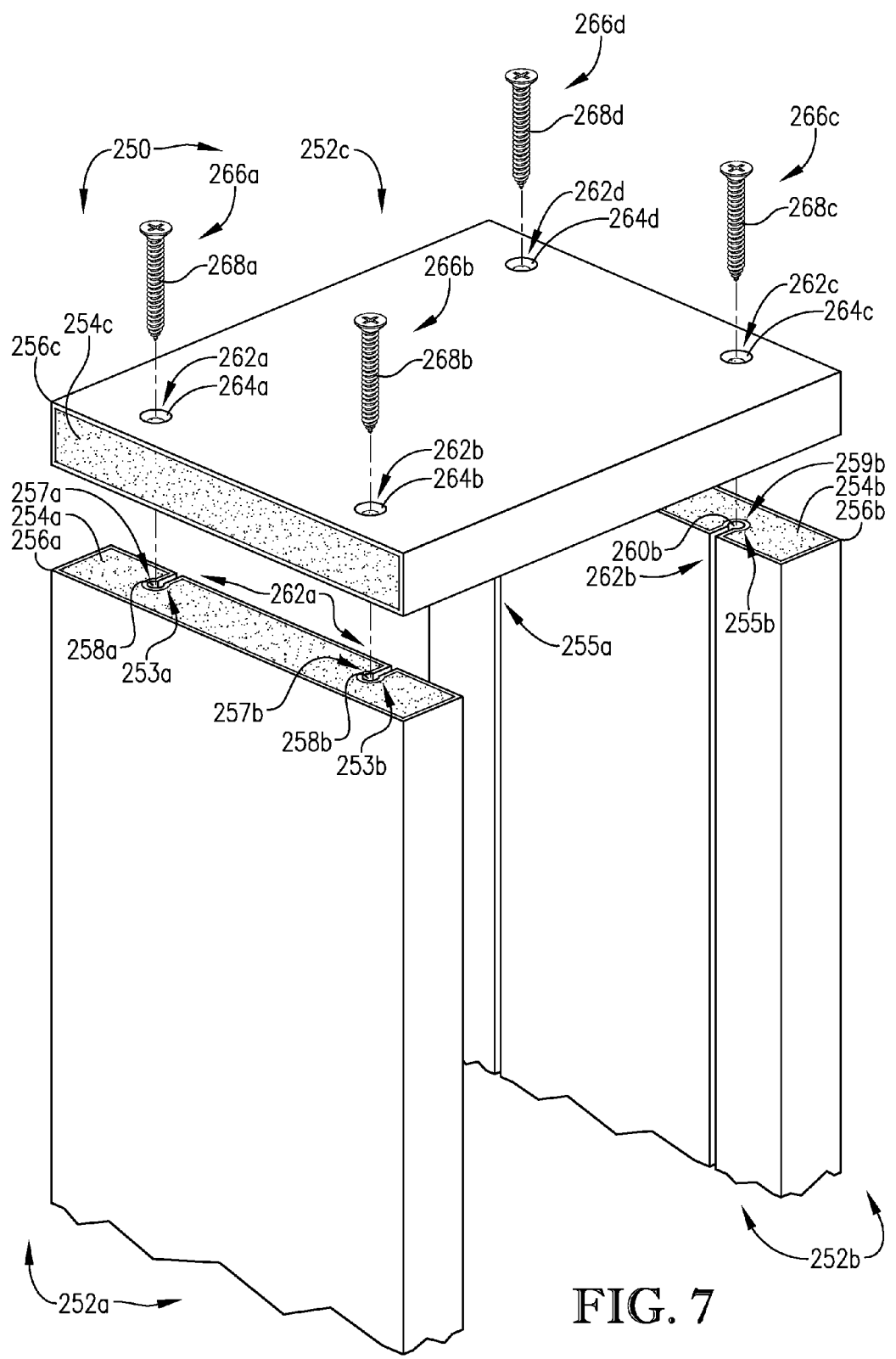
FIG. 7 is a side perspective view of one embodiment of an extrusion-coated structural system including multiple extrusion-coated structural members coupled to one another by a plurality of hardware members.

Extrusion-coated structural systems configured according to embodiments of the present invention may also include one or more additional components such as, for example, one or more hardware components. Turning now to FIGS. 5-7, several examples of extrusion-coated structural systems that include at least one extrusion-coated structural member and at least one hardware component are provided. Referring first to FIG. 5, an extrusion-coated structural member 150 is illustrated as generally comprising a substrate 152 and a coating material 154 extrusion-coated on to at least a portion of substrate 152. In the embodiment shown in FIG. 5, coating material 154 has been applied to at least about 90 percent, at least about 95 percent, at least about 99 percent, or all of the outer surfaces 170a-d of substrate 152.

Additionally, extrusion-coated structural member 150 comprises a structural recess 156 extending inwardly from outer surface 170a of substrate 152 and at least one near-recess external surface 158a or 158b proximate recess 156. Structural recess 156 is at least partially coated with a coating material, which can be the same as or different than, coating material 154 applied to one or both of near-recess external surfaces 158a,b. In the embodiment shown in FIG. 5, the coating material is continuous with at least a portion of coating material 154 applied to near-recess external surfaces 158a and/or 158b.

As depicted in the embodiment shown in FIG. 5, structural recess 156 of structural member 150 is an elongated recess having a cross-sectional shape that remains substantially constant along its length. Structural recess 156 can include a broad portion 160 and a narrow portion 162, with narrow portion 162 being closer to near-recess external surface 158. Structural recess 156 also presents a recess attachment surface 166, which can be at least partially defined by coating material. Recess attachment surface 166, which extends generally between near-recess external surfaces 158a,b, can be configured to receive at least a portion of a hardware component 168, illustrated in FIG. 5 as a screw, so that, when inserted into structural recess 156, at least a portion of hardware member 168 can be at least partially supported by recess attachment surface 166.

As used herein, the term "hardware member" refers to any component separate from the structural member used to enhance the functionality, strength, and/or aesthetic characteristics of the structural member or system. Examples of hardware members can include, but are not limited to, screws, bolts, nuts, slides, rollers, handles, pins, and supports. However, in one embodiment, the hardware members included in structural systems of the present invention can also include other substrates, or portions of thereof, such as, for example, boards, shelves, trim, and other similar components. In another embodiment, the hardware member may be defined by one or more other extrusion-coated structural members and/or itself may be an extrusion-coated structural member. When configured for insertion into a structural recess, such as structural recess 156, hardware member 168 may include at least one hardware protrusion 172. Hardware protrusion 172 can be of any suitable size and/or shape, and may be threaded, as illustrated in the embodiment shown in FIG. 5.

When hardware protrusion 172 is inserted into structural recess 156, at least a portion of recess attachment surface 166 may be configured support hardware protrusion 172. As used herein, the term "support" means to restrict or prevent motion in at least one direction. Structural recess 156 of structural member 150 may be configured such that hardware protrusion 172 directly contacts at least a portion of recess attachment surface 166, or recess attachment surface 166 can include at least one layer of intervening material (not shown in FIG. 5) disposed between at least a portion of recess attachment surface 166 and hardware protrusion 172.

When present, the intervening material layer can be made of any suitable material and may comprise one or more materials different than coating material 154 applied to near-recess external surface 158. The intervening material layer can add functionality to the recess and/or may improve its aesthetic characteristics or durability. In one embodiment, the intervening material layer can be a friction-modifying layer to either enhance or reduce the friction between recess attachment surface 166 and hardware protrusion 172. In one embodiment, the intervening material layer can be a friction enhancing layer capable of increasing the friction between recess attachment surface 166 and hardware protrusion 172 by at least about 5 percent, at least about 10 percent, or at least about 15 percent and may be, for example, a coating material comprising a medium or coarse grit of a layer or sand paper. In another embodiment, the intervening material layer can be a friction-reducing layer configured to reduce the friction between recess attachment surface 166 and hardware protrusion 172 by at least about 5, at least about 10, at least about 15 percent. Suitable materials for inclusion in the friction-reducing intervening layer can include, for example, TEFLON® or other similar materials.

When structural recess is at least partially coated with coating material 159, the withdrawal force required to remove hardware protrusion 172 from structural recess 156 may be higher than if the coating material were not present. For example, in one embodiment, the withdrawal force required to remove hardware protrusion 172 from structural recess 156, once inserted, may be at least about 300 pounds, at least about 350 pounds, at least about 400 pounds, at least about 450 pounds, at least about 475 pounds, at least about 500 pounds, measured according to ASTM D1037 and as further described in Example 1. In contrast, the withdrawal force required to remove the same hardware component from a similarly-configured but uncoated structural recess may be less than about 300 pounds. Extrusion-coated structural member 150 may be useful in furniture or cabinetry applications, for example, wherein increased withdrawal strength may be beneficial to increase the durability of the structural system.

Turning now to FIG. 6, another embodiment of an extrusion-coated structural system 200 including an extrusion-coated structural member 210 is provided. In the embodiment shown in FIG. 6, the extrusion-coated structural member 210 includes a substrate 212 and a coating material 214 coated onto at least a portion of the substrate 212. Substrate 212 is also illustrated as comprising plurality of structural recesses, including an elongated slot 216 and a plurality of holes 218, each at least partially filled with the coating material 214. Extrusion-coated structural system 210 further includes a plurality of hardware members 220a-d, shown in FIG. 6 as a plurality of screws, each comprising a hardware protrusion 222*a-d* configured for insertion into at least one, or both, of structural recesses 216, 218.

Elongated slot 216 can extend along at least a portion of the length of extrusion-coated structural member 210 and, in one embodiment, may present a recess attachment surface 224 that may optionally be threaded. Each of hardware protrusions 222*a-d* of hardware members 220*a-d* can be configured for insertion into elongated slot 216, and, in one embodiment, may be configured for insertion at multiple locations along the length of elongated slot 216. Additionally, in one embodiment, two or more hardware protrusions, such as, for example, protrusions 222*a,b* shown in FIG. 6, may be configured for simultaneous insertion into elongated slot 216, such that two or more hardware protrusions 222*a,b* may be at least partially supported by recess attachment surface 224. Although not shown in FIG. 6, at least a portion of recess attachment surface 224 may include at least one intervening material layer.

Additionally, as shown in the embodiment depicted in FIG. 6, extrusion-coated structural member 210 can include a plurality of holes 218 each extending inwardly from an outer surface. As shown in FIG. 6, at least a portion (or all) of holes 218 may be at least partially, or entirely, filled with coating material 214. The hardware protrusion 222*a-d* of each of hardware members 220*a-d* may be configured for insertion into one or more of holes 218 and, as shown in FIG. 6, two or more hardware protrusion 222*c,d* may be received into separate holes (structural recesses) 218 at the same time. Extrusion-coated structural system 210 may be useful in furniture or cabinetry applications when it may be advantageous to adjust the position of the hardware member, such as, for example, in shelving or cabinetry applications.

Turning now to FIG. 7, one embodiment of an extrusion-coated structural system 250 comprising more than one extrusion-coated structural members 252*a-c* and a plurality of hardware members 266*a-d* is provided. In the embodiment depicted in FIG. 7, extrusion-coated structural system 250 includes at least three extrusion-coated structural members 252*a-c* that each includes a substrate 254*a-c* and a coating material 256*a-c* extrusion coated onto to at least a portion of each substrate 254*a-c*. Each of substrates 254*a* and 254*b* comprise a pair of structural recesses 253*a,b* and 255*a,b* spaced apart from one another along the width of substrates 254*a,b*. In the embodiment shown in FIG. 7, each of structural recesses 253*a,b* and 255*a,b* comprise elongated slots extending along at least a portion of the length of substrates 254*a,b* that are at least partially filled with coating material 256. Each of slots 253*a,b* and 255*a,b* present a respective recess attachment surface 258*a,b* and 260*a,b* (260*a* not shown) formed of the coating material. Additionally, each of recesses 253*a,b* and 255*a,b* include a recess inlet 257*a,b* and 259*a,b* (259*a* not shown) defined by an outer surface 262*a,b* of substrate 254*a,b*. Although shown as being uncoated in FIG. 7, outer surfaces 262*a,b* of substrates 254*a,b* may also be at least partially coated with coating material 256*a,b*.

Additionally, as shown in FIG. 7, substrate 254*c* includes four structural recesses 262*a-d* spaced apart from one another and extending through the entire thickness of substrate 254*c*. Each of structural recesses 262*a-d* are at least partially coated with coating material 256*c* and may present at least one recess attachment surface 264*a-d* defined by coating material 256*c*. Alternatively, structural recesses 262*a-d* may be formed in extrusion coated member 252*c* after substrate 254*c* has been extrusion coated and, in that embodiment, structural recesses 262*a-d* may not be coated with a coating material.

Extrusion-coated structural system 250 further comprises four hardware members, shown as screws 266*a-d*, each comprising a hardware protrusion 268*a-d*, shown in FIG. 7 as being threaded hardware protrusions. As shown in FIG. 7, each of hardware protrusions 268*a-d* of hardware members 266*a-d* are configured for insertion into respective recess inlets 257*a,b* and 259*a,b* (259*a* not shown) via structural recess 262*a-b* of substrate 254*c*. Once inserted, a portion of hardware protrusion 268*a*, for example, can be at least partially supported by recess attachment surface 264*a* of structural recess 262*a* and recess attachment surface 258*a* of elongated recess 253*a* of substrate 254*a*. If structural recess 262*a* is not coated with coating material 256, the hardware protrusion 268*a* can be at least partially supported, or in direct contact with, a surface of structural recess 262*a*. Similarly, hardware protrusions 268*b-d* inserted into and through respective structural recesses 262*b-d* can be received into inlets 257*b* and 259*a* (not shown) and 259*b* of elongated recesses 253*b* and 255*a,b*. Once inserted, a portion of hardware protrusions 268*b-d* may be at least partially supported by respective recess attachment surfaces 264*b-d* (or a surface 262*b-d* of structural recesses 262*b-d* if uncoated) and recess attachment surfaces 258*b*, 260*a* (not shown), and 260*b*.

Figure 8:
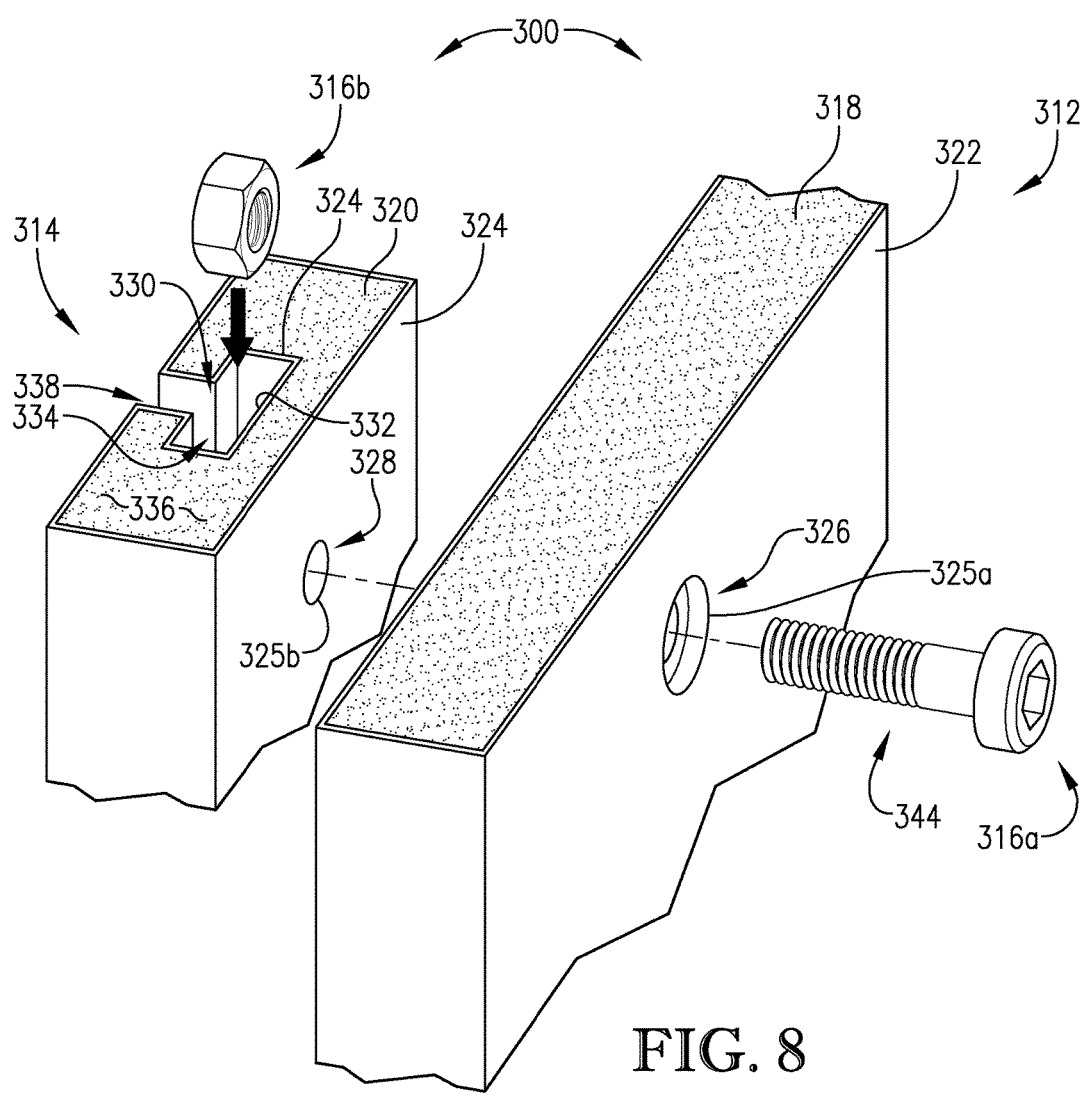
FIG. 8 is a side perspective view of another embodiment of an extrusion-coated structural system including multiple extrusion-coated structural members coupled by a plurality of hardware members.

Turning now to FIG. 8, another embodiment of an extrusion-coated structural system 300 is illustrated as generally comprising a pair of extrusion-coated structural members 312, 314, and two hardware members 316*a,b*. As shown in FIG. 8, each of extrusion-coated structural members 312, 314 comprises a substrate 318, 320 and a coating material 322, 324 extrusion-coated onto at least a portion of respective substrates 318, 320. Coating materials 322 and 324 may be the same or different. As shown in the embodiment depicted in FIG. 8, substrate 318 comprises a single structural recess 326, while substrate 320 comprises two structural recesses 328 and 330. Structural recesses 326 and 328 each include a respective inlet 325*a,b* and an outlet (not shown) and extend through the entire thickness respective substrates 318 and 320. Structural recess 330 includes a recess inlet 338 defined on an outer surface 336 of substrate 320. As shown in FIG. 8, structural recess 330 is at least partially coated by coating material 324 and presents a recess attachment surface 332 at least partially formed of the coating material.

Extrusion-coated structural system 300 further comprises two hardware members, shown in FIG. 8 as a bolt 316*a* and a nut 316*b*, configured for insertion into one or more of structural recesses 326, 328, 330 of structural members 312, 314. As shown in the embodiment depicted in FIG. 8, bolt 316*a*, which comprises a hardware protrusion 344, can be configured for insertion into and through structural recesses 326 and 328 so that at least a portion of structural recesses 326 and 328 can at least partially support hardware protrusion 344. In one embodiment, at least a portion of one or both of structural recesses 326 and 328 may be coated by coating material 322 or 324 and, in those cases, at least a portion of hardware protrusion 344 may be supported by at least one recess attachment surface (not shown) formed of coating material 322 or 324. Simultaneously, nut 342 may also be inserted into broad portion 334 of structural recess 330 via recess inlet 338 and coupled with hardware protrusion 344 of bolt 316*a* within structural recess 330. In this manner, extrusion-coated structural members 312 and 314 may be coupled to one another while visually shielding nut 316*b* and protrusion 344 of bolt 316*a* from view within recess 330, thereby enhancing the aesthetics of the entire system 300.

When the extrusion-coated structural system of the present invention includes at least one hardware member insertable into a structural recess, at least a portion of the hardware member can be configured for movement within the recess, once inserted. For example, in one embodiment when the recess is an elongated recess, the hardware member, or portion thereof, may be configured to move in said recess in the direction of elongation of said recess. Alternatively, the hardware protrusion may be movable in a direction substantially perpendicular to the direction of elongation of the recess, while, in another embodiment, the hardware member or protrusion may be configured to rotate within the structural recess. The movement of the hardware member within the structural recess may be at least partially inhibited, either by at least one locking mechanism which can selectively restrain the movement of the hardware protrusion within the recess, and/or by the physical dimensions of the hardware protrusion and/or structural recess. Several embodiments of extrusion-coated and hardware integrated systems comprising a movable hardware protrusion are provided in FIGS. 9-19.

Figure 9:
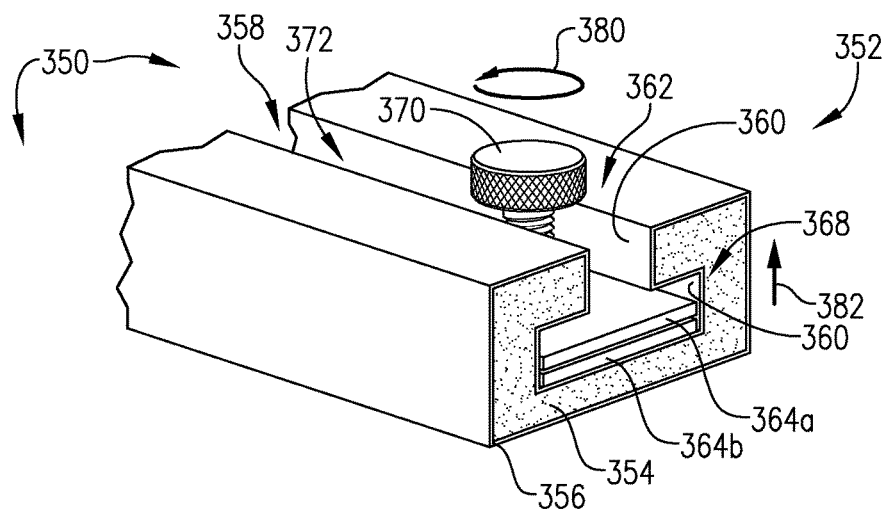
FIG. 9 is a side perspective view of one embodiment of an extrusion-coated structural system including at least one extrusion-coated structural member having a structural recess and a hardware protrusion.
Figure 10:
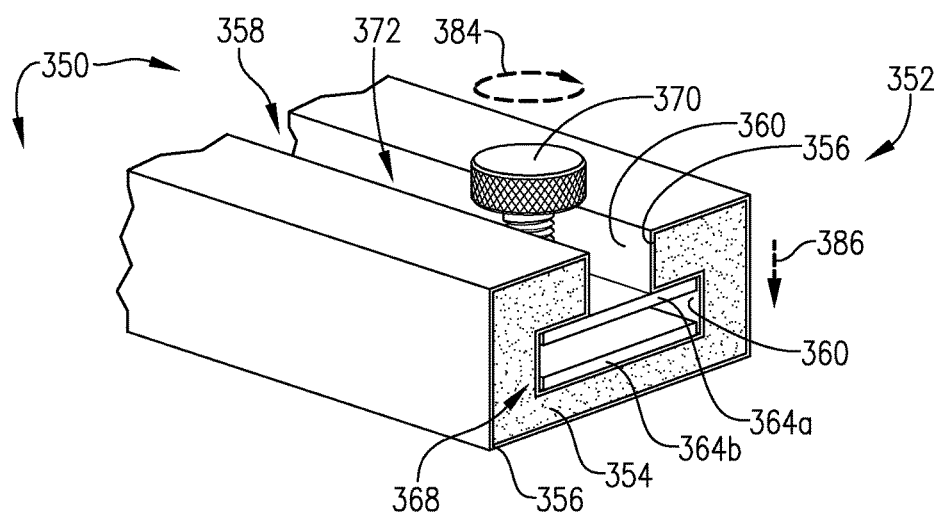
FIG. 10 is another side perspective view of the extrusion-coated structural system depicted in FIG. 9.
Figure 11:
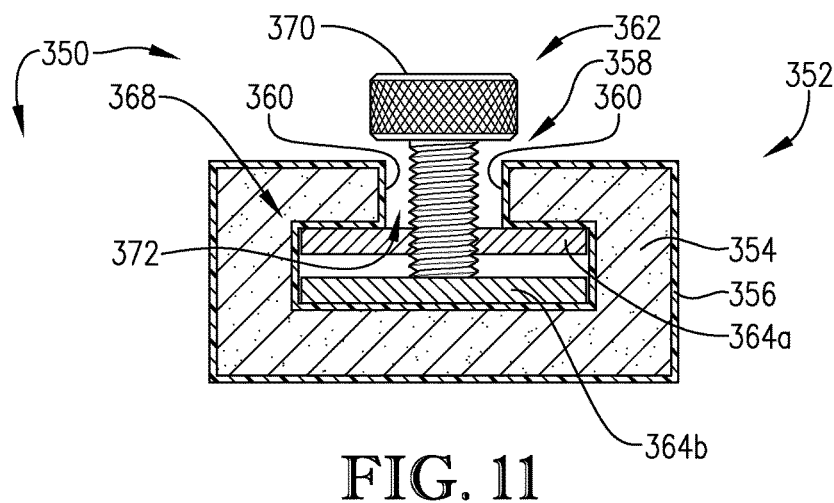
FIG. 11 is a schematic cross-section of the extrusion-coated structural system depicted in FIGS. 9 and 10.

Turning initially to FIGS. 9-11, one embodiment of an extrusion-coated structural system 350 is provided. Extrusion-coated structural system 350 illustrated in FIGS. 9-11 includes an extrusion-coated structural member 352 comprising a substrate 354 and a coating material 356 extrusion coated to at least a portion of substrate 354. Substrate 354 comprises a structural recess 358, which is at least partially coated with coating material 356. Structural recess 358 presents a recess attachment surface 360 configured to at least partially support a hardware member 362 when hardware member 362 is inserted into structural recess 358. In the embodiment shown in FIGS. 9-11, hardware member 362 comprises a hardware protrusion, shown in FIGS. 9-11 as a pair of movable plates 364a,b, disposed in a broad portion 368 of structural recess 358.

Hardware member 362 can further comprises a locking mechanism, shown as bolt or fastener 370, at least partially disposed in narrow portion 372 of structural recess 358. Locking mechanism 370 can be a threaded member, as particularly shown in FIG. 11, and may be configured for rotation to selectively permit and inhibit movement of one or both of plates 364a,b within structural recess 358. For example, as shown in FIGS. 9 and 10, rotation of locking mechanism 370, as indicated by arrow 380, can cause upper plate 364a of hardware member 362 to move in a direction generally perpendicular to the direction of extension of recess 358, as indicated by arrow 382 in FIG. 9. Opposite rotation of locking mechanism 370, indicated by dashed arrow 384 in FIG. 10, may move upper plate 364a in the opposite direction.

Figure 12:
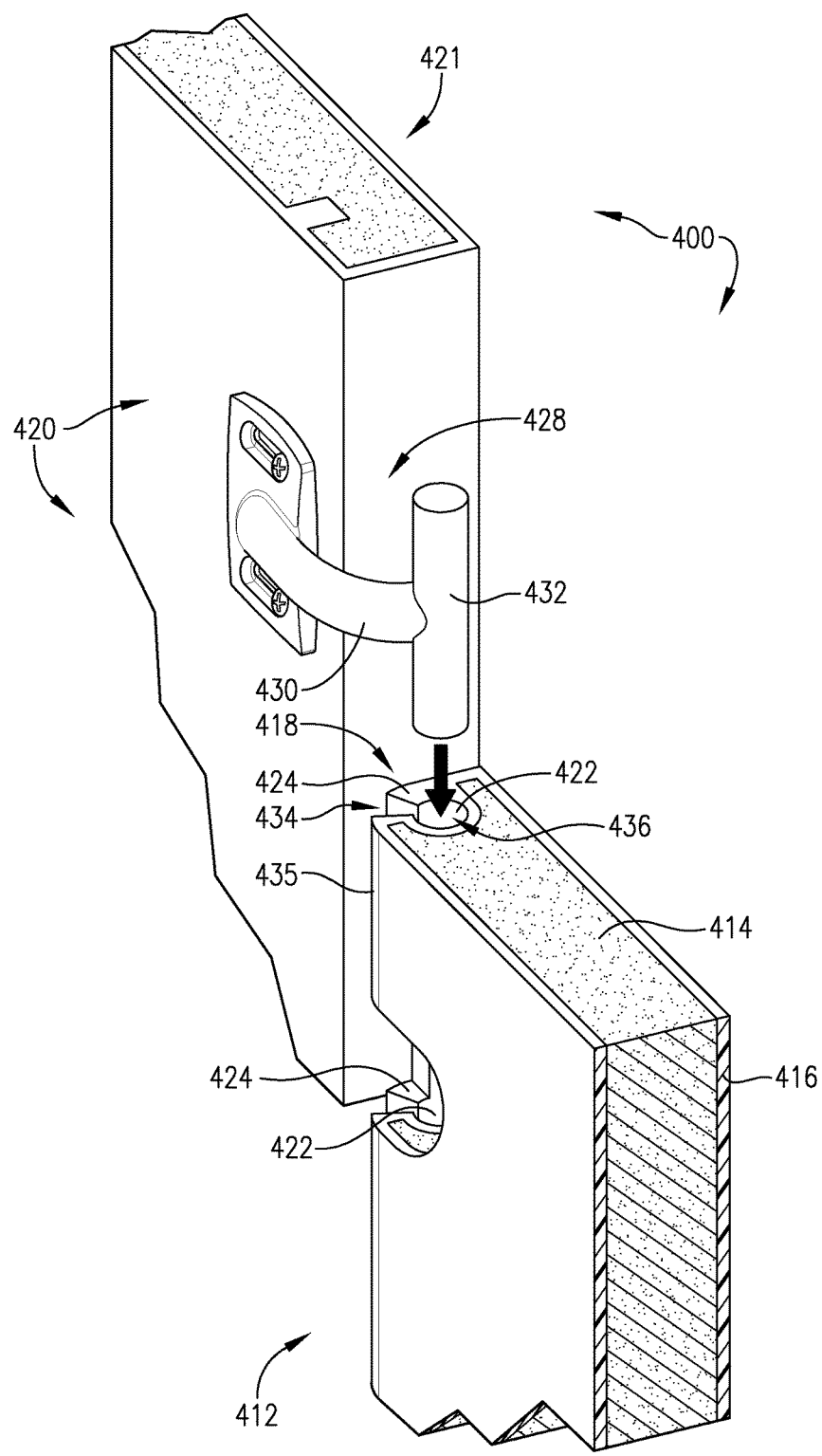
FIG. 12 is a partial perspective view of an extrusion-coated structural system configured according to one embodiment of the present invention, particularly illustrating an integrated hinge.

Turning now to FIG. 12, another embodiment of an extrusion-coated structural system 400 is illustrated as generally comprising an extrusion-coated structural member 412 and a hardware member 420. Extrusion-coated structural member 412 comprises a substrate 414 and a coating material 416 extrusion coated onto at least a portion of substrate 414. Structural member 412 comprises at least one structural recess 418, which is at least partially coated with coating material 416, which presents a recess attachment surface 422 within structural recess 418. In one embodiment depicted in FIG. 12, at least a portion of recess attachment surface 422 may be formed by a portion of at least one extruded profile member 424 formed of coating material 416 and extending outwardly from substrate 414. Additional embodiments of extrusion-coated structural members including extruded profile members will be discussed in detail shortly.

Hardware member 420, illustrated in FIG. 12 as comprising a hinge, may be fastened to a second structural member 421, which may optionally be another extrusion-coated structural member. Hardware member 420 can comprise a hardware protrusion 428 having a narrow portion 430 and a broad portion 432. During assembly, broad portion 432 of hardware member 420 may be inserted into broad section 436 of structural recess 418 while narrow portion 430 of hardware member 420 can be inserted into narrow section 434 of recess 418, such that hardware protrusion 428 may be at least partially supported by a portion of recess attachment surface 422, which may optionally include at least one intervening material layer disposed therein. Additionally, once inserted, hardware protrusion 428 may be configured for movement within recess 418 and, more particularly, may be configured for rotation within recess 418. When broad portion 432 of hardware protrusion 428 is wider than narrow section 434 of structural recess 418, as shown in FIG. 12, removal of hardware protrusion, once received in structural recess 418, is inhibited in at least one direction. In one embodiment, extrusion-coated structural system 400 may be a cabinet, structural member 421 may be a cabinet box or support, and extrusion-coated structural member 412 can be a cabinet door.

Another extrusion-coated structural system 450 configured according to one embodiment of the present invention is illustrated as generally comprising an extrusion-coated structural member 452 and at least one hardware member 460. Extrusion-coated structural member 452, shown in FIGS. 13 and 14, as being a portion of a drawer or door, comprises a substrate 454 and a coating material 456 extrusion-coated onto at least a portion of substrate 454. Substrate 454 comprises a structural recess 458, illustrated in FIGS. 13 and 14 as an elongated recess that extends along at least a portion of the length of substrate 454.

Figure 13:
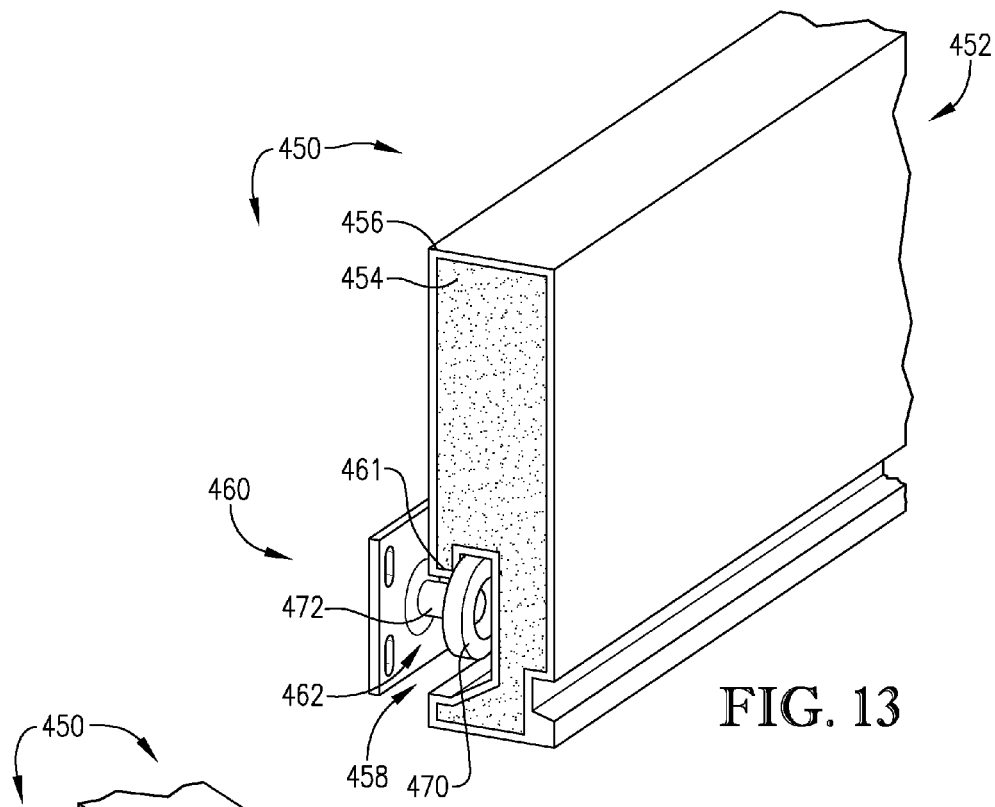
FIG. 13 is a partial front perspective view of an extrusion-coated structural system configured according to another embodiment of the present invention, particularly illustrating an integrated drawer roller.
Figure 14:
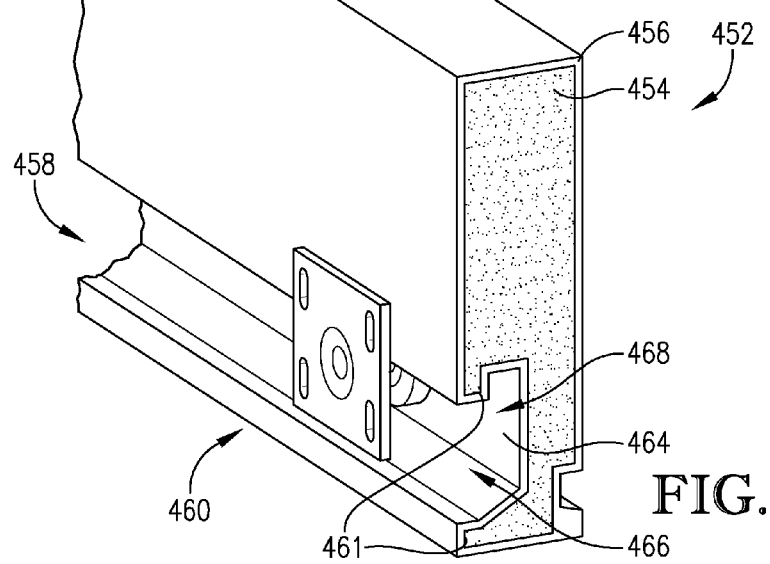
FIG. 14 is the a partial rear perspective view of the extrusion-coated structural system depicted in FIG. 13.

In one embodiment, coating material 456 may also be applied to at least a portion of structural recess 458, thereby forming a recess attachment surface 464 from the coating material. Recess attachment surface 464 can be configured to at least partially support a hardware protrusion 462 of at least one hardware member, shown in FIGS. 13 and 14 as a roller 460, when hardware protrusion 462 is inserted into structural recess 458. As shown in FIGS. 13 and 14, when inserted into structural recess 458, at least a portion of hardware protrusion may directly contact at least a portion of recess attachment surface 464. Alternatively, at least a portion of recess attachment surface 464 may be coated with at least one intervening material layer such that hardware protrusion 462 may be in contact with the intervening layer when inserted into recess 458. When present, the intervening layer may be coated onto only a portion of structural recess 458 and, when recess 458 includes an elongated recess, for example, the partial intervening layer may be disposed at either terminal end of recess 458.

As illustrated in FIGS. 13 and 14, structural recess 458 can include a broad section 466 and a narrow section 468 configured to receive a broad portion 470 and a narrow portion 472 of hardware protrusion 462. When inserted in structural recess 458, hardware protrusion 462 may be movable within structural recess 458 in a direction substantially parallel to the direction of extension of recess 458. The movement of hardware protrusion member 462 within structural recess 458 may be at least partially restrained by the physical dimensions of hardware protrusion 472 and/or hardware recess 458. In one embodiment, extrusion-coated structural system 450 may include multiple rollers, each having at least one hardware protrusion configured for simultaneous receipt into structural recess 458.

Figure 15:
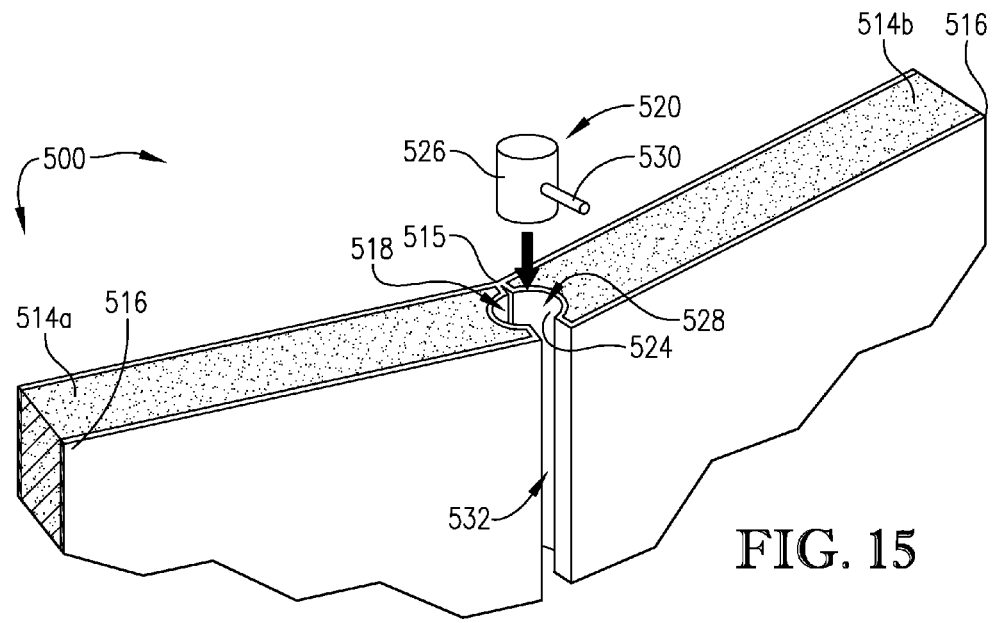
FIG. 15 is a side perspective view of an extrusion-coated structural system configured according to still another embodiment of the present invention, particularly illustrating an integrated shelf support in a unlocked configuration.
Figure 16:
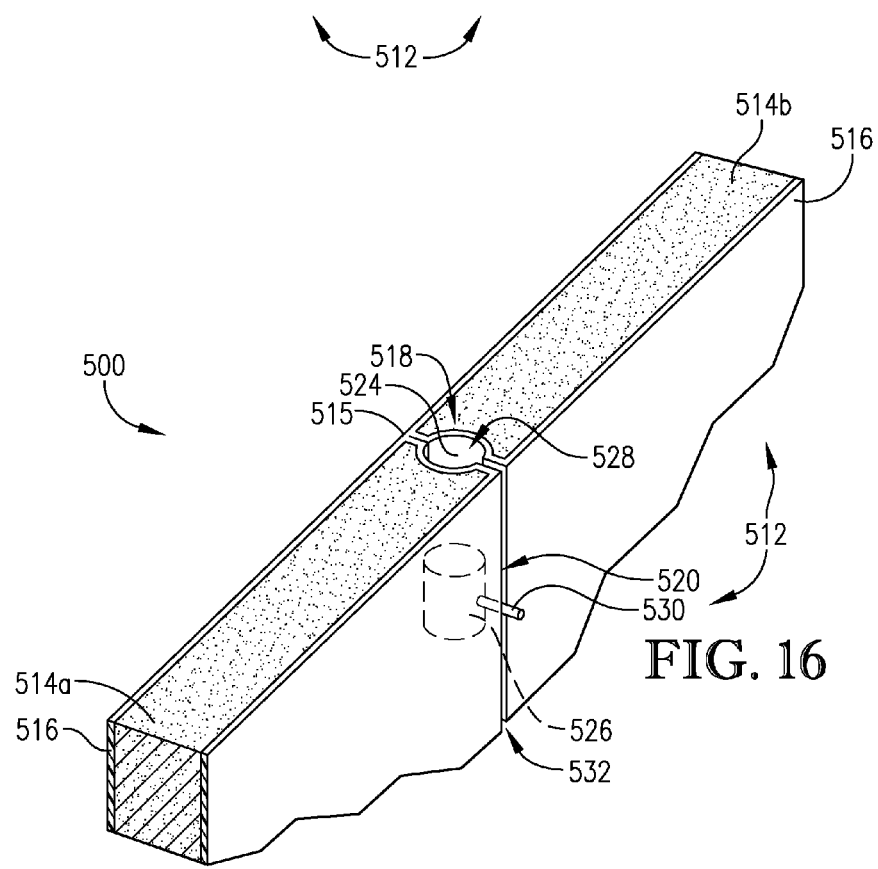
FIG. 16 is another side perspective view of the extrusion-coated structural system depicted in FIG. 15, with the extrusion-coated structural member in a locked configuration.

Turning now to FIGS. 15 and 16, another extrusion-coated structural system 500 configured according to embodiments of the present invention is provided. Extrusion-coated structural system 500 comprises an extrusion-coated structural member 512 and at least one hardware member 520. Extrusion-coated structural member 512 comprises two substrates 514*a,b* and a coating material 516 extrusion-coated onto at least a portion of substrates 514*a,b* shown in FIGS. 15 and 16. Extrusion-coated structural system 500 further comprises a bridging member 515 formed of coating material 516 and extending from substrate 514*a* to 514*b* in order to coupling substrates 514*a,b* to one another. As shown in FIGS. 15 and 16, bridging member 515 is configured to permit movement of substrates 514*a* and 514*b* relative to one another without decoupling substrates 514*a* and 514*b* from each other.

As shown in FIGS. 15 and 16, the extrusion-coated structural member 512 comprises a structural recess 518 collectively defined by substrates 514*a,b*. Structural recess 518 is an elongated recess at least partially coated with coating material 516. Structural recess 518 presents a recess attachment surface 524 configured to at least partially support at least a portion of hardware member 520, shown as a shelf support pin in FIGS. 15 and 16, when hardware member 520 is inserted into structural recess 518. The broad portion 526 of hardware member 520 can be configured for receipt into the broad section 528 of structural recess 518, while the narrow portion 530 of hardware member 520 may be configured for receipt into a narrow section 532 of structural recess 518.

Once inserted into structural recess 518, hardware member 520 may be movable within recess 518 in a direction substantially parallel to the direction of extension of recess 518. In one embodiment, structural member 512 can be shiftable between a locked position and an unlocked position by pivoting at least one of substrates 514*a,b* relative to the other via bridging member 515. When structural member 512 is in an unlocked position, as shown in FIG. 15, the movement of hardware protrusion 522 within structural recess 518 may be permitted, but when structural member 512 is in a locked position, as shown in FIG. 16, movement of hardware protrusion 522 within structural recess 518 is substantially prevented. When in the locked position, at least one dimension of the structural recess 518 is smaller than when the structural member 512 is in the unlocked position. Although illustrated in FIGS. 15 and 16 as only including a single hardware member 520, it should be understood that any suitable number of hardware members could be inserted into structural recess 518 and, in one embodiment, structural recess 518 may be configured to receive multiple hardware protrusions 522 simultaneously.

Figure 17:
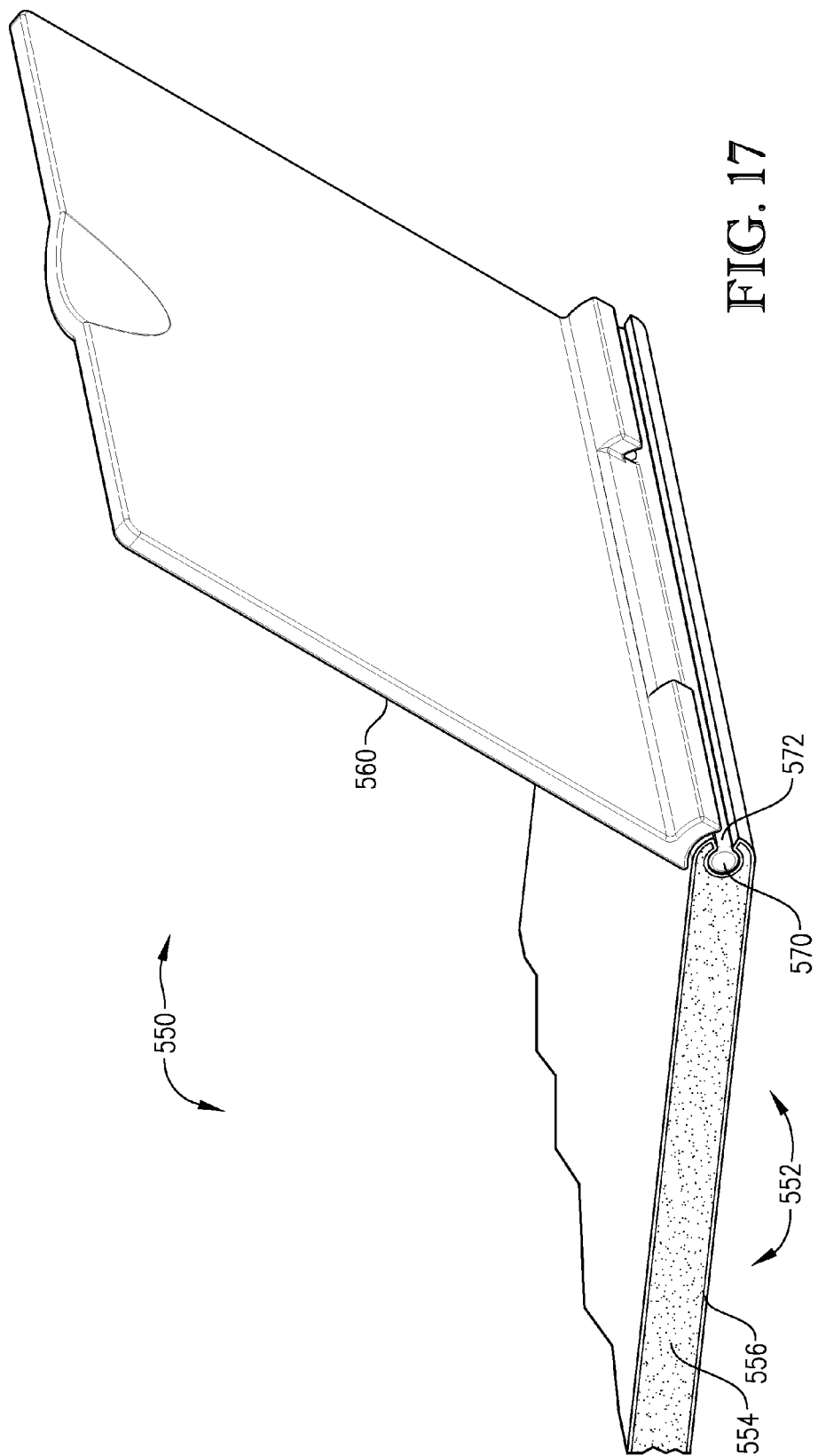
FIG. 17 is a side perspective view of an extrusion-coated structural system configured according to still another embodiment of the present invention, particularly illustrating an integrated hinge.

Another embodiment of an extrusion-coated structural system 550 is depicted in FIGS. 17-19. Extrusion-coated structural system 550 includes an extrusion-coated structural member 552 and at least one hardware member 560. As shown in FIGS. 17-19, extrusion-coated structural member 552 includes a substrate 554 and a coating material 556 extrusion coated onto at least a portion of substrate 554. Structural member 552 further comprises at least one structural recess 558 at least partially coated with coating material 556. Structural recess 558 presents a recess attachment surface 564 configured to at least partially support at least a portion of a hardware protrusion 562 of a hardware member 560. When received in structural recess 558, hardware protrusion 562 may directly contact recess attachment surface 564 or at least a portion of hardware protrusion 562 may contact at least one layer of intervening material (not shown).

As particularly shown in FIG. 19, structural recess 558 comprises a broad portion 566 and a narrow portion 568 and hardware protrusion 562 includes a broad section 570 and a narrow section 572. When inserted in structural recess 558, the narrow section 572 of hardware protrusion 562 is configured for receipt in the narrow portion 568 of structural recess 558 and broad portion 570 of hardware protrusion 562 can be configured for insertion in the broad portion 566 of structural recess 558. Once inserted, pullout of hardware protrusion 562 from structural recess 558 may be inhibited in at least one direction. Additionally, hardware protrusion 562 may be configured to move within structural recess 558 and, more particularly, may be configured to rotate, thereby changing the position of hardware member 560, as shown in FIG. 18.

According to another embodiment of the present invention, the extrusion-coated structural member can additionally, or alternatively, include at least one structural protrusion presenting at least one protrusion attachment surface formed of the coating material. When the structural system includes at least one structural member having a structural protrusion, the system may also include at least one hardware member comprising at least one hardware recess configured to receive the structural protrusion therein. Once inserted into the hardware recess, at least a portion of the protrusion attachment surface may be at least partially supported by the hardware recess. In one embodiment, the protrusion attachment surface may maintain direct contact with the hardware recess, while, in another embodiment, the protrusion attachment surface and/or the hardware recess may include at least one intervening material layer disposed thereon, such that the protrusion attachment contacts the intervening material layer when inserted in the hardware recess. Several embodiments of extrusion-coated structural systems including a hardware protrusion are illustrated in FIGS. 20-24.

Turning now to FIGS. 20 and 21, one embodiment of an extrusion-coated structural system 600 is illustrated as generally comprising an extrusion-coated structural member 612 and at least one hardware member 620. Extrusion-coated structural member 612 includes a substrate 614 and a coating material 616 extrusion coated onto at least a portion of substrate 614. Extrusion-coated structural system 600 illustrated in FIGS. 20 and 21 is similar to the extrusion-coated structural system 550 depicted in FIGS. 17-19, except extrusion-coated structural member 612 of system 600 comprises a structural protrusion 618 and hardware member 620 comprises a hardware recess 622.

As shown in FIGS. 20 and 21, structural protrusion 618 can be at least partially coated with coating material 616 and may present a protrusion attachment surface 624 formed of coating material 616. In one embodiment, at least one intervening layer, shown in FIG. 21 as layer 623, may be disposed on at least a portion of structural protrusion 618. Additionally, in one embodiment, at least a portion of hardware member 620 may also be coated with a coating material 621, including, for example, at least a portion of hardware recess 622. When hardware recess 622 is at least partially coated with coating material 621, as shown in FIG. 21, hardware recess 622 may present a hardware recess attachment surface 625 formed of coating material 621. When structural protrusion 618 is inserted in hardware recess 622, at least a portion of the protrusion attachment surface 624 (or, if present, intervening layer 623) of hardware protrusion 618 may be at least partially supported by hardware recess attachment surface 625. In another embodiment, hardware recess 624 may also include at least one intervening layer (not shown) disposed on at least a portion of hardware recess attachment surface 625.

Structural protrusion 618 also includes a near-protrusion surface 635 formed of coating material 616 and located proximate structural protrusion 618. In one embodiment, coating material 616 forming protrusion attachment surface 624 of structural protrusion 618 may be continuous with the coating material forming near-protrusion surface 635. As shown in FIGS. 20 and 21, structural protrusion 618 includes a broad portion 626 and a narrow portion 628, with narrow portion 628 of structural protrusion 618 being closer to near-protrusion surface 635 than broad portion 626. Broad and narrow portions 626, 628 of structural protrusion 618 can be configured for respective insertion into a broad section 630 and narrow section 632 of hardware recess. In one embodiment, broad portion 626 of structural protrusion 618 can be wider than narrow section 632 of hardware recess 622, such that, when inserted into hardware recess 622, pull out of structural protrusion 618 may be inhibited in at least one direction. Once inserted in hardware recess 622, structural protrusion 618 may be configured to move within hardware recess 622, thereby permitting movement of hardware member 620 in a direction as generally indicated by arrow 648 in FIG. 20.

In one embodiment, extrusion-coated structural systems 550 and 600 may be used in cabinetry or furniture applications, such that, for example, extrusion-coated structural member 552 or 612 can be a cabinet box or support member of a cabinet or other furniture item, and hardware members 570 or 620 can be a door or other movable component.

Referring now to FIGS. 22 and 23, another embodiment of an extrusion-coated structural system 1650 is illustrated as generally comprising two extrusion-coated structural members 1652, 1660. In one embodiment shown in FIGS. 22 and 23, one of extrusion-coated structural members 1652 may comprise a protrusion 1658, while the other 1660 may include a recess 1662 configured to receive protrusion 1658. Although each of recess 1662 and protrusion 1658 are defined by respective extrusion-coated structural members 1652 and 1662, one of extrusion-coated structural members 1652 and 1660 may be broadly considered to be a hardware member. Consequently, protrusion 1658 may either be a hardware protrusion insertable into structural recess 1662 of extrusion-coated structural member 1660 or may be a structural protrusion receivable in a hardware recess 1662 of extrusion-coated structural member 1660.

As shown in FIGS. 22 and 23, each of extrusion-coated structural members 1652, 1662 comprise a substrate 1654, 1670 and a coating material 1656, 1672 extrusion-coated onto at least a portion of respective substrates 1654, 1670. In one embodiment, at least a portion of protrusion 1658 and/or recess 1662 may be coated with respective coating materials 1656, 1672, such that protrusion 1658 and/or recess 1672 present respective protrusion and recess attachment surfaces 1664, 1674 formed of coating material 1656 and 1672. Coating materials 1656 and 1672 may be the same as or different from each other and, in one embodiment, protrusion 1658 and/or recess 1662 may include at least one intervening layer disposed on at least a portion of a recess and protrusion attachment surfaces 1664, 1674. When protrusion 1658 is inserted into recess 1662, protrusion attachment surface 1664 can be at least partially supported by recess attachment surface 1674. Protrusion attachment surface 1664 may be directly contacted with recess attachment surface 1674, as shown in FIG. 22, or, if present, protrusion attachment surface 1664 and/or recess attachment surface 1674 may contact an intervening layer disposed on at least a portion of the attachment surface of the other.

In one embodiment, extrusion-coated structural system 1650 may be useful as, for example, a door or window jamb, with extrusion-coated structural members 1652 and 1660 each comprising one portion of the jamb.

Figure 24:
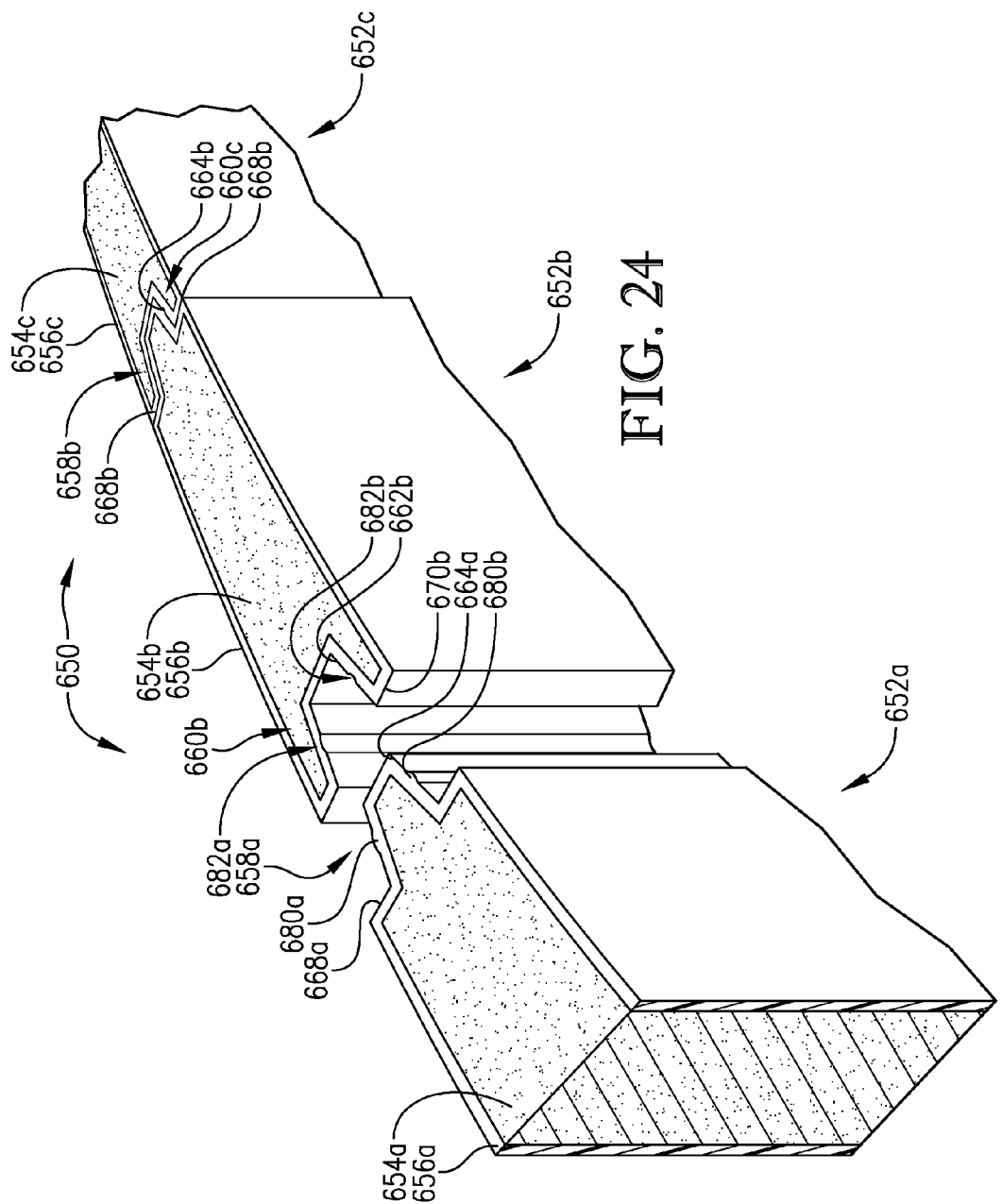
FIG. 24 is a side perspective view of one embodiment of an extrusion-coated structural system comprising a plurality of snap-on panels having both a protrusion and a recess.

Another embodiment of an extrusion-coated structural system 650 is illustrated in FIG. 24 as generally comprising a plurality of connectable extrusion-coated structural members 652a-c, portions of which are shown in FIG. 24. Each extrusion-coated structural member 652a-c includes a respective substrate 654a-c at least partially coated with a coating material 656a-c. Each of coating materials 656a-c can be the same, or at least one of coating materials 656a-c may be different than one or more of the other coating materials 656a-c. As shown in FIG. 24, each of extrusion-coated structural members 652a-c comprises a protrusion 658a-c (658c not shown in FIG. 24) and a recess 660a-c (660a not shown in FIG. 24). As described above with the embodiment depicted in FIGS. 22 and 23, each of protrusions 658a-c may be considered structural or hardware protrusions and each of recesses 660a-c may be considered structural or hardware recesses.

As shown in FIG. 24, one of more of protrusions 658a,b and/or recesses 660b,c can be at least partially coated with respective coating material 656a-c. One or more of protrusions 658a,b may present a protrusion attachment surface 664a,b at least partially formed of coating material 656a,b-c. Optionally, at least a portion of the protrusion attachment surface 664a,b may be defined by or comprise at least one intervening material layer (not shown in FIG. 24.). In one embodiment shown in FIG. 24, at least a portion of one or more protrusion attachment surfaces 664a,b may have a thickness that is at least 1 percent, at least about 2 percent, or at least about 5 percent greater than the average thickness of the remainder of protrusion attachment surface 664a,b. In the same or another embodiment, at least a portion of at least one protrusion attachment surface 664a,b may have a thickness that is at least 1 percent, at least about 2 percent, or at least about 5 percent less than the average thickness of the coating 656a,b coated onto the remainder of protrusion attachment surface 664a,b. Additionally, in one embodiment, at least a portion of protrusion attachment surfaces 664a,b may have a thickness at least 1 percent, at least about 2 percent, or at least about 5 percent greater than or less than the average thickness of the coating material 656a,b forming a near-protrusion surface 668a,b of structural member 652a,b.

Similarly, in the same or another embodiment, one or more of recesses 660b-c may present a recess attachment surface 662b,c formed of coating material 656b,c. In one embodiment shown in FIG. 24, at least a portion of one or more recess attachment surfaces 662b,c may have a thickness that is at least 1 percent, at least about 2 percent, or at least about 5 percent greater than the average thickness of the remainder of recess attachment surface 662b,c. In the same or another embodiment, at least a portion of at least one recess attachment surface 662b,c may have a thickness that is at least 1 percent, at least about 2 percent, or at least about 5 percent less than the average thickness of the remainder of recess attachment surface 662b,c. Additionally, in one embodiment, at least a portion of recess attachment surfaces 662b,c may have a thickness at least 1 percent, at least about 2 percent, or at least about 5 percent greater than or less than the average thickness of the coating material 656b,c forming a near-recess surface 670b,c (670c not shown) of structural member 652a-c.

In one embodiment, at least a portion of one or more of protrusion attachment surfaces 664a,b of protrusions 658a,b can include at least one coating cavity (not shown in FIG. 24) and/or at least one coating projection. In one embodiment, protrusion attachment surfaces 664a,b may include two or more coating cavities (not shown) or two or more coating projections 680a,b, as illustrated in FIG. 24. In one embodiment, one or more of protrusions 658a,b may include both coating cavities and protrusions. The ratio of the maximum height of the coating projections, or the minimum thickness of the coating cavities, when present, to the average thickness of the coating material 656a,b coated onto protrusion 658a,b can be at least about 0.05:1, at least about 0.10:1, at least about 0.25:1, at least about 0.50:1 and/or not more than about 1:1, not more than about 0.95:1, not more than about 0.75:1, or in the range of from about 0.05:1 to about 1:1, about 0.05:1 to about 0.95:1 about 0.05:1 to about 0.75:1, about 0.10:1 to about 1:1, about 0.10:1 to about 0.95:1 about 0.10:1 to about 0.75:1, about 0.25:1 to about 1:1, about 0.25:1 to about 0.95:1 about 0.25:1 to about 0.75:1, about 0.50:1 to about 1:1, about 0.50:1 to about 0.95:1 about 0.50:1 to about 0.75:1. In another embodiment (not shown in FIG. 24), at least a portion of one or more coating projections and/or one or more coating recesses may be defined within a portion of substrate 654.

In the same or another embodiment, at least a portion of one or more recess attachment surfaces 662b,c can include at least one coating cavity and/or at least one coating projection (not shown). In one embodiment, recess attachment surfaces 662b,c may include two or more coating projections (not shown) or two or more coating cavities 682a,b, as illustrated in FIG. 24. In one embodiment, recess 660b may include both coating cavities and protrusions. The ratio of the minimum thickness of coating cavities, or the maximum height of the coating projections, when present, to the average thickness of the coating material coated onto recess can be at least about 0.05:1, at least about 0.10:1, at least about 0.25:1, at least about 0.50:1 and/or not more than about 1:1, not more than about 0.95:1, not more than about 0.75:1, or in the range of from about 0.05:1 to about 1:1, about 0.05:1 to about 0.95:1 about 0.05:1 to about 0.75:1, about 0.10:1 to about 1:1, about 0.10:1 to about 0.95:1 about 0.10:1 to about 0.75:1, about 0.25:1 to about 1:1, about 0.25:1 to about 0.95:1 about 0.25:1 to about 0.75:1, about 0.50:1 to about 1:1, about 0.50:1 to about 0.95:1 about 0.50:1 to about 0.75:1. In another embodiment (not shown in FIG. 24), at least a portion of one or more coating projections and/or one or more coating recesses may be defined within a portion of substrate 654b,c.

In the embodiment depicted in FIG. 24, protrusion attachment surface 664a of extrusion-coated structural member 652a is illustrated as comprising a pair of coating projections 680a,b disposed on generally opposing sides of protrusion 658a. As shown in FIG. 24, protrusion 658a of extrusion-coated structural member 652a is configured for insertion into a recess 660b of extrusion-coated structural member 652b. Recess attachment surface 662b of recess 660b can include at least one coating cavity, shown in FIG. 24 as a pair of coating cavities 682a,b, disposed on generally opposing sides of recess 660. Upon insertion of protrusion 658a into recess 660a, coating projections 680a,b may also be inserted into corresponding coating cavities 682a,b thereby further securing and supporting protrusion 658a within recess 660a. When extrusion-coated structural system 650 includes two or more extrusion-coated structural members 652a-c, as shown in FIG. 24, each structural member 652a-c may include similar features such that each structural member 652a-c may be coupled to one or more other structural members 652a-c as generally shown in FIG. 24. The extrusion-coated structural system 650 depicted in FIG. 24 may be particularly useful in construction applications as, for example, wall or floor panels.

According to another embodiment of the present invention, one or more recesses or protrusions defined by an extrusion-coated structural member can be at least partially formed by an extruded profile member formed of the coating material. As used herein, the term "extruded profile member" refers to a portion of an extrusion-coated structural member that is separate, but extends outwardly from, at least a portion of one or more substrates included in the structural member. In one embodiment, the extruded profile member may extend outwardly from the substrate of the extrusion-coated structural member and may also extend along at least a portion of the length of the substrate.

In one embodiment, the extruded profile member may extend outwardly from the substrate for a maximum distance that is at least about two, at least about five, at least about ten, at least about 20 times greater than the average thickness of the coating material extruded onto the substrate at a location adjacent the extruded profile member. The average thickness of the coating material extrusion coated onto the substrate at a location adjacent the extruded profile member can be within the ranges described previously. The ratio of the maximum thickness of the extruded profile member to the average thickness of the coating material extrusion coated onto the substrate at a location adjacent the extruded profile member can be at least about 1:1, at least about 2:1, at least about 3:1 and/or not more than about 10:1, not more than about 8:1, not more than about 6:1, or in the range of from about 1;1 to about 10:1, about 1:1 to about 8:1, about 1:1 to about 6:1, about 2:1 to about 10:1, about 2:1 to about 8:1, about 2:1 to about 6:1, about 3:1 to about 10:1, about 3:1 to about 8:1, about 3:1 to about 6:1.

In the same or another embodiment, the extruded profile member may extend along at least about 50 percent, at least about 60 percent, at least about 70 percent, at least about 80 percent, or at least about 90 percent of the total length of the substrate, such that the ratio of the length of the extruded profile member to the ratio of the length of the substrate is at least about 0.50:1, at least about 0.60:1, at least about 0.70:1, at least about 0.80:1, or at least about 0.90:1. The extruded profile member can extend continuously along the length of the substrate.

The extruded profile member can be at least partially, or nearly entirely, formed of the coating material applied onto the substrate during formation of the extrusion-coated structural member and may, for example, be formed simultaneously during the extrusion coating process used to produce the extrusion-coated structural member, additional details of which will be discussed in detail shortly. In one embodiment, not more than about 20, not more than about 10, not more than about 5, not more than about 2 percent of the total volume of the extruded profile member may be occupied by the substrate and, in the same or another embodiment, at least about 5 percent, at least about 10 percent, at least about 15 percent, at least about 20 percent, or at least about 25 percent of the total weight of coating material applied to the substrate to form the extrusion-coated structural member may be used to form the extruded profile member.

In one embodiment, the extruded profile member of an extrusion-coated structural member may at least partially define at least one profile recess and/or at least one profile protrusion. When present, the profile recess may at least partially define a profile recess attachment surface configured to contact and at least partially support a hardware, structural, or profile protrusion inserted therein. Similarly, when present in the extrusion-coated structural member, the profile protrusion at least partially defined by the extruded profile member may present a protrusion profile attachment surface configured to contact at least a portion of a structural recess, a hardware recess, and/or a profile recess when inserted therein. In one embodiment, the extruded profile member can define at least about 50, at least about 60, at least about 70, at least about 80, or at least about 90 percent of the total area of recess attachment and/or profile attachment surfaces, and, in one embodiment, the entirety of the recess and/or profile attachment surfaces may be defined by the extruded profile member.

According to one embodiment, at least a portion of the profile recess attachment surface and/or the profile protrusion attachment surface can comprise one or more coating cavities and/or coating projections. When present, the coating cavities and/or projections may extend along at least a portion of the profile protrusion and/or profile recess attachment surfaces and can define areas of coating have a thickness that is at least about 1, at least about 2, at least about 3, at least about 5 percent greater than the average thickness of the profile protrusion and/or profile recess attachment surfaces.

In one embodiment, the profile protrusion attachment surface of an extruded profile member can include two or more coating cavities and/or two or more coating projections. In one embodiment, the profile protrusion attachment surface may include both coating cavities and protrusions. The ratio of the maximum height of the coating projections or the minimum thickness of the coating cavities, when present, to the average thickness of the coating material forming the profile protrusion attachment surface can be at least about 0.05:1, at least about 0.10:1, at least about 0.25:1, at least about 0.50:1 and/or not more than about 1:1, not more than about 0.95:1, not more than about 0.70:1, or in the range of from about 0.05:1 to about 1:1, about 0.05:1 to about 0.95:1, about 0.05:1 to about 0.70:1, about 0.10:1 to about 1:1, about 0.10:1 to about 0.95:1, about 0.10:1 to about 0.70:1, about 0.25:1 to about 1:1, about 0.25:1 to about 0.95:1, about 0.25:1 to about 0.70:1, about 0.50:1 to about 1:1, about 0.50:1 to about 0.95:1, about 0.50:1 to about 0.70:1.

In the same or another embodiment, at least a portion of one or more profile recess attachment surfaces can include at least one coating cavity and/or at least one coating projection. In one embodiment, the profile recess attachment surface may include both coating cavities and protrusions. The ratio of the maximum height of the coating projections or the minimum thickness of the coating cavities, when present, to the average thickness of the coating material forming the profile recess attachment surface can be at least about 0.05:1, at least about 0.10:1, at least about 0.25:1, at least about 0.50:1 and/or not more than about 1:1, not more than about 0.95:1, not more than about 0.70:1, or in the range of from about 0.05:1 to about 1:1, about 0.05:1 to about 0.95:1, about 0.05:1 to about 0.70:1, about 0.10:1 to about 1:1, about 0.10:1 to about 0.95:1, about 0.10:1 to about 0.70:1, about 0.25:1 to about 1:1, about 0.25:1 to about 0.95:1, about 0.25:1 to about 0.70:1, about 0.50:1 to about 1:1, about 0.50:1 to about 0.95:1, about 0.50:1 to about 0.70:1.

Several embodiments of extrusion-coated structural systems that include two or more extrusion-coated structural members having at least one extruded profile member are provided in FIGS. 25-30. Turning initially to FIGS. 25 and 26, an extrusion-coated structural system 700 is illustrated as generally comprising a pair of extrusion-coated structural members 712, 722. Each of structural members 712, 722 includes a substrate 714, 724 and a coating material 716, 726 extrusion coated onto at least a portion of substrate 714, 724. Coating materials 716 and 726 may be the same or different. As shown in FIGS. 25 and 26, extrusion-coated structural member 722 comprises a structural protrusion 728 at least partially coated with a coating material 726 and extrusion-coated structural member 712 includes a profile recess 718 at least partially defined by extruded profile member 730. In one embodiment shown in FIGS. 25 and 26, profile recess 718 can be entirely formed by extruded profile member 730 and may not be defined by substrate 714.

Profile recess 718 can present a profile recess attachment surface 740 that is at least partially formed from coating material 726 used to form extruded profile member 730. In the embodiment shown in FIGS. 25 and 26, at least a portion of profile recess attachment surface 740 comprises a plurality of coating cavities 742. Alternatively, profile recess attachment surface could additionally include at least one coating projection or could alternatively include only coating projections (not shown in FIGS. 25 and 26). Further, as shown in FIGS. 25 and 26, the profile protrusion attachment surface 738 presented by structural protrusion 728 can also include one or more coating projections 744 and/or one or more coating cavities (not shown) spaced along profile protrusion attachment surface 738.

The coating cavities 742 and projections 744 respectively defined by profile recess and profile protrusion attachment surfaces 740 and 738 may have the maximum height and/or minimum depth, relative to the average thickness of the coating material forming profile recess and/or profile protrusion attachment surfaces as described in detail previously. Further, although shown in FIGS. 25 and 26 as comprising generally semi-circular cavities, coating cavities 742 and/or coating projections 744 could have any desirable shape. Further, as illustrated in FIGS. 25 and 26, each of coating cavities 742 and coating projections 744 can extend along at least a portion of the length of substrates 714, 724 and/or along at least a portion of the respective lengths of extruded profile member 730 and structural protrusion 728.

To assemble extrusion-coated structural system 700, profile protrusion 728 may be inserted into profile recess 718 such that at least a portion of profile recess attachment surface is in direct contact with at least a portion of profile protrusion 728. When inserted into profile recess 718, at least a portion, or all, of the coating projections 744 disposed on profile protrusion attachment surface 783 of protrusion 728 can be inserted into a corresponding coating cavity 742 defined by profile recess attachment surface 740 of recess 718. In one embodiment, one of coating projections 744 of profile protrusion 728 may be insertable into more than one coating cavities 742 of profile recess 718 such that the position of extrusion-coated structural members 712 and 722 may be adjustable relative to one another.

Turning now to FIGS. 27 and 28, one embodiment of an extrusion-coated structural system 750 is illustrated as generally comprising a pair of extrusion-coated structural members 752, 762. Each of extrusion-coated structural members 752, 762 includes a substrate 754, 764 and a coating material 756, 766 extrusion coated onto at least a portion of substrates 754, 764. Extrusion-coated structural system 750 is similar to extrusion-coated structural system 700 described previously with respect to FIGS. 25 and 26, except each of extrusion-coated structural members 752, 762 of structural system 750 includes an extruded profile member 770, 780. Further, as shown in FIGS. 27 and 28, each of extruded profile members 770, 780 include a pair of profile projections 772a,b and 782a,b and a profile recess 774, 784 disposed therebetween.

As shown in particular by FIG. 28, extrusion-coated structural members 752 and 762 can be coupled to one another by inserting profile projection 772b of extruded profile member 770 into profile recess 784 of extruded profile member 780 and, at the same time, inserting profile projection 782b of extruded profile member 780 into profile recess 774 of extruded profile member 770. In this way, at least a portion of the attachment surface 786 presented by extruded profile member 780 can be in contact with at least a portion of the attachment surface 776 presented by extruded profile member 770. Although shown in FIGS. 27 and 28 as having a generally beveled shape, extruded profile member 770 and 780 may have any other suitable shapes.

Turning now to FIGS. 29 and 30, another embodiment of an extrusion-coated structural system 800 similar to the extrusion-coated structural system 700 and 750 described previously, is provided. Extrusion-coated structural system 800 includes a plurality of extrusion-coated structural members 812 that each includes a substrate 814 and a coating material 816 extrusion coated onto at least a portion of substrate 814. Coating materials 816 coated onto each substrate 816 can be the same as, or different than, the coating material 816 coated onto one or more other substrates 814. As shown in FIGS. 29 and 30, each of structural members 812 comprises an extruded profile member 820 and a recess 822 configured to receive the profile member 820 of another substrate 814. In one embodiment, substrate 814 includes a coating material 816 which can at least partially define recess 822, while, in another embodiment (not shown), recess 822 can be entirely formed of coating material 816.

To assemble extrusion-coated structural system 800, the extruded profile member 820 of one extrusion-coated structural member may be inserted into the recess 822 of a second extrusion-coated structural member to thereby couple structural members 812a and b to each other. Optionally, extruded profile member 820 may be further secured in recess 822 through use of adhesive (not shown) or by treating the points of connection amongst the assembled structural members 812 using, for example, heat or ultrasonic energy. Once secured, one or more of the structural members 812 may be moved relative to one or more other structural member in order to form the assembled structural member into a variety of shapes, preferably without uncoupling the individual structural members 812 from one another. Although shown as including only 4 extrusion-coated structural members 812, structural system 800 may include any suitable number of structural members, such as, for example, at least 2, at least 4, at least 6 and/or not more than 20, not more than 15, not more than 10. Extrusion-coated structural system 800 may be useful in a wide variety of applications but, in particular, may be utilized in a construction application as, for example, floor or wall paneling.

Turning now to FIGS. 31 and 32, another embodiment of an extrusion-coated structural member 852 including an extruded profile member 870 is provided. Extrusion-coated structural member 852 includes a substrate 854 and a coating material 856 extrusion coated onto at least a portion of substrate 854. In one embodiment, the extrusion-coated structural member 852 includes at least one extruded profile member 870 that extends outwardly from substrate 854 for a maximum distance, indicated by the letter L in FIG. 32, of at least about 0.25 inches, at least about 0.5 inches, at least about 0.75 inches and/or not more than 4 inches, not more than about 3 inches, not more than about 2 inches. the extrusion-coated structural member 852 includes at least one extruded profile member 870 that extends outwardly from substrate 854 for a maximum distance in the range of from about 0.25 to about 4 inches, about 0.25 to about 3 inches, about 0.25 to about 2 inches, about 0.5 to about 4 inches, about 0.5 to about 3 inches, about 0.5 to about 2 inches, about 0.75 to about 4 inches, about 0.75 to about 3 inches, about 0.75 to about 2 inches.

According to one embodiment, the ratio of the maximum distance, L, of extension of extruded profile member 870 from substrate 854 to the maximum thickness of the extruded profile member may be at least about 0.5:1, at least about 1:1, at least about 2:1, at least about 5:1 and/or not more than about 20:1, not more than about 15:1, not more than about 10:1, not more than about 8:1, not more than about 6:1. The ratio can be in the range of from about 0.5:1 to about 20:1, about 0.5:1 to about 15:1, about 0.5:1 to about 10:1, about 0.5:1 to about 8:1, about 0.5:1 to about 6:1, about 1:1 to about 20:1, about 1:1 to about 15:1, about 1:1 to about 10:1, about 1:1 to about 8:1, about 1:1 to about 6:1, about 2:1 to about 20:1, about 2:1 to about 15:1, about 2:1 to about 10:1, about 2:1 to about 8:1, about 2:1 to about 6:1, about 5:1 to about 20:1, about 5:1 to about 15:1, about 5:1 to about 10:1, about 5:1 to about 8:1, about 5:1 to about 6:1. In the embodiment depicted in FIGS. 31 and 32, structural member 852 can comprise a profile cavity 818 that is at least partially, or nearly entirely, defined by extruded profile member 870. Extruded profile member 870 depicted in FIGS. 31 and 32 comprises a shock absorbing member shiftable between an extended position, as indicated by the solid lines in FIG. 32, and a compacted position, as indicated by the dashed lines in FIG. 32. Upon contact with a surface of a second structural member (not shown), shock absorbing member 870 can shift from an extended position to a compacted position, thereby absorbing or lessening at least a portion of the contact energy transferred between the structural members. Extrusion-coated structural member 852 may be useful as a door or drawer in a variety of furniture or cabinetry applications.

Additional embodiments of extrusion-coated structural systems including extruded profile member are provided in FIGS. 33-36. Each of extrusion-coated structural system 900 and extrusion-coated structural member 952 respectively depicted in FIGS. 33 and 34 and FIGS. 35 and 36 include at least one extrusion-coated structural member and one or more extruded profile member used to enhance the aesthetic appeal and/or functionality of the structural system. For example, in the embodiments depicted in FIGS. 33 and 34, extrusion-coated structural system 900 comprises two extrusion-coated structural members 912, 922 each including a substrate 914, 924 and a coating material 916, 926 extrusion coated to at least a portion of substrate 914, 924.

As shown in FIGS. 33 and 34, one of extrusion-coated structural member 912 includes a first elongated structural recess 918 and at least two other structural recesses 917a,b configured to receive a portion of two hardware members, shown in FIGS. 33 and 35 as comprising screws 930a,b. The other extrusion-coated structural member 920 includes an extruded profile member, shown as a tab 940, extending outwardly from one of the surfaces 915*a* of substrate 924, continuous with coating material 926 applied to surface 915*a*. Tab 940 includes a pair of projections 942*a,b* configured to be received within structural recess 918 of extrusion-coated structural member 912. When inserted into structural recess 918, as shown in FIG. 34, tab 940 may be suitable for hiding one or more hardware members, such as screw 930*a* from view when the structural members 912, 922 are assembled to form structural system 900. Thus, extruded profile member 940 may be used to increase the aesthetic properties of a structural system.

Turning now to FIGS. 35 and 36 another embodiment of an extrusion-coated structural member 952 exhibiting enhanced functional and/or aesthetic characteristics are provided. As shown in FIGS. 35 and 36, extrusion-coated structural member 952 comprises a substrate 954 and a coating material 956 extrusion coated onto at least a portion of substrate 954. As shown in the embodiment depicted in FIGS. 35 and 36, structural member 952 includes an extruded profile member 970 extending outwardly from at least a portion of substrate 954 and being continuous with coating material 956 coated onto the portion of substrate 954 adjacent extruded profile member 970. Rather than include an unsupported terminal end, like another embodiment of extruded profile member previously discussed, extruded profile member 970 illustrated in FIGS. 35 and 36 extends between and is supported by each of a first and second portion 953*a,b* of substrate 954. As a result, extruded profile member 970 forms a portion of profile recess 958, although less than 50 percent of the total area of the inner surface area of profile recess 958 is defined by extruded profile member 970.

In one embodiment shown in FIGS. 35 and 36, profile recess 958 can be configured to receive at least one functional and/or aesthetic member to enhance the functionality and/or aesthetic characteristics of the structural member and/or structural system. Examples of suitable functional and/or aesthetic members suitable for insertion into a profile recess, such as profile recess 958, can include, but are not limited to, piping, electrical conduit or wires, cables, lighting elements or fixtures, LED elements, and combinations thereof. In the embodiment shown in FIGS. 35 and 36, a plurality LED elements 980 can be inserted into profile recess 958 to enhance the functionality and/or aesthetics of structural member 952.

According to one or more other embodiments of the present invention, one or more structural systems as described herein may include at least one bridging member coupling two or more substrates to one another in order to permit movement of at least one substrate relative to the other. In one embodiment, the structural system of the present invention can comprise at least two substrates and at least one bridging member coupling the first and second substrates to one another. The bridging member can be formed of a coating material extrusion coated onto at least a portion of the first and second substrates and may extend from at least a portion of the one of the substrates to at least a portion of one of the other substrates to thereby form an extrusion-coated structural member.

According to one embodiment, the bridging member may be the only connection between the substrates being coupled. In one embodiment, the maximum thickness of the bridging member can be greater than the average thickness of the coating material applied to the substrate adjacent the bridging member, while, in another embodiment, the maximum thickness of the bridging member can be approximately the same as the average thickness of the coating material applied to the substrate adjacent the bridging member. The ratio of the maximum thickness of the bridging member to the average thickness of the coating material applied to the substrate proximate the bridging member can be at least about 0.9:1, at least about 1:1, at least about 1.5:1, at least about 2:1 and/or not more than about 10:1, not more than about 8:1, not more than about 6:1. The ratio of the maximum thickness of the bridging member to the average thickness of the coating material applied to the substrate proximate the bridging member can be in the range of from about 0.9:1 to about 10:1, about 0.9:1 to about 8:1, about 0.9:1 to about 6:1, about 1:1 to about 10:1, about 1:1 to about 8:1, about 1:1 to about 6:1, about 1.5:1 to about 10:1, about 1.5:1 to about 8:1, about 1.5:1 to about 6:1, about 2:1 to about 10:1, about 2:1 to about 8:1, about 2:1 to about 6:1.

In another embodiment, the ratio of the bridging member to the thickness, or shortest dimension, of the substrate can be at least about 0.005:1, at least about 0.01:1, at least about 0.05:1 and/or not more than 0.50:1, not more than about 0.25:1, not more than about 0.10:1, or in the range of from about 0.005:1 to about 0.50:1, about 0.005:1 to about 0.25:1, about 0.005:1 to about 0.10:1, about 0.01:1 to about 0.50:1, about 0.01:1 to about 0.25:1, about 0.01:1 to about 0.10:1, about 0.05:1 to about 0.50:1, about 0.05:1 to about 0.25:1, about 0.05:1 to about 0.10:1.

The maximum thickness of the bridging member can be at least about 0.005 inches, at least about 0.010 inches, at least about 0.050 inches, at least about 0.075 inches and/or not more than about 0.75 inches, not more than about 0.50 inches, not more than about 0.25 inches, or not more than about 0.15 inches. The bridging member can have a substantially constant thickness, or at least one portion of the bridging member can have a thickness different than at least one other portion of the bridging member. The ratio of the maximum thickness of the bridging member to the maximum thickness of the substrates being coupled can be at least about 0.001:1, at least about 0.005:1, at least about 0.010:1, at least about 0.050:1 and/or not more than about 0.5:1, not more than about 0.25:1, not more than about 0.20:1.

The substrates coupled by the at least one bridging member can have any suitable shape and/or size and can be arranged in any suitable configuration. In one embodiment, the length, width, and depth of each of the substrates being coupled may be the same or substantially the same, while, in another embodiment, at least one of the substrates being coupled may have a length, width, and/or depth different than the length, width, and/or depth of at least one other substrates being coupled. As used herein, the term "substantially" means within 5 percent. According to one embodiment, three or more substrates may be coupled with at least one bridging member and at least one of the substrates may have a different size, shape, and/or orientation than at least one of the others. In one embodiment, all of the substrates coupled with the bridging member may have the same size, shape, and/or orientation of each of the other substrates.

The position of the substrates within the extrusion-coated structural system may vary, depending on the specific design and use of the system. In one embodiment, the substrates of the structural system may be positioned in a side-by-side arrangement such that lengths and thicknesses of adjacent substrates are substantially parallel to one another and the widths are substantially aligned. As used herein, the term "substantially" means within 5° and "aligned" means extending along the same axis. In another embodiment, the substrates of the structural system may be configured in a "top-to-bottom" arrangement such that lengths and widths of adjacent substrates are substantially parallel to one another and the thicknesses are substantially aligned. Further, in yet another embodiment, the substrates may be arranged in an "end-to-end" arrangement such that widths and thicknesses of adjacent substrates are substantially parallel to one another and the lengths are substantially aligned. In a still further embodiment, the substrates may be arranged in a "nested" arrangement, wherein one or more substrates are positioned within a recess or cavity defined by one or more other substrates. Various embodiments having substrates arranged in each of these configurations will be discussed in detail shortly.

In one embodiment, the structural systems that include at least one bridging member may be shiftable between a flat configuration, wherein the bridging member extends between the first and second substrates in a substantially planar fashion, and a folded configuration, wherein at least a portion of the bridging member is bent, flexed, folded, or otherwise arranged in a non-planar way. According to one embodiment, the bridging member may be configured to permit movement of the substrates from a flat configuration to a folded configuration (and back to a flat configuration) without decoupling the substrates from one another. During the shifting, one of the substrates can be moved relative to the other by, for example, bending, rotating, or flexing at least a portion of the bridging member. In one embodiment, the bridging member may be configured to permit a maximum angular range of motion of at least about 15°, at least about 30°, at least about 45°, at least about 60°, at least about 75°, at least about 90°, at least about 135° and/or not more than about 180°, not more than about 135°, not more than about 90°, not more than about 75° of one substrate relative to the other.

When in the flat configuration, the substrates of the structural system may be spaced apart from one another to define a gap, and at least a portion of the bridging member may extend across the gap from at least a portion of one substrate to at least a portion of the other. The gap may be at least partially defined by opposing surfaces of each of the substrates which can be, in some cases, aligned substantially parallel to each other, when the structural system is in the flat configuration. In another embodiment, the opposing surfaces of adjacent substrates may be oriented at an alignment angle of at least about 5°, at least about 15°, at least about 30°, at least about 45°, at least about 60° and/or not more than about 160°, not more than about 135°, not more than about 110°, or not more than about 90° with respect to one another.

When present, one or more dimensions of the gap defined between the substrates may change as the structural system is shifted from a flat configuration to a folded configuration and, in some cases, the gap may not be present when the structural system is in a folded configuration. When configured in the flat configuration, the width of the gap, if present, may be constant along the length and/or depth of the gap. Alternatively, the width the gap may change (i.e., increase and/or decrease) along the length and/or depth thereof. As used herein, the "length" of the gap is measured in a direction parallel to the direction of extension of the substrates, and the "width" of the gap is measured in a direction parallel to the direction of extension of the bridging member. As used herein the "depth" of the gap is measured in a direction perpendicular to both the width and the length of the gap and, in one embodiment, can be parallel to the thickness of the substrates being coupled. In one embodiment, the ratio of the minimum width of the gap to the maximum width of the gap may be at least about 0.25:1, at least about 0.50:1, at least about 0.75:1 and/or not more than about 1:1, not more than about 0.90:1, not more than about 0.85:1 and/or the ratio of the depth of the gap to the maximum width of the gap can be at least about 0.10:1, at least about 0.25:1, at least about 0.40:1 and/or not more than about 3:1, not more than about 2:1, not more than about 1:1, not more than about 0.85:1.

Several embodiments of extrusion-coated structural systems including a structural member having at least one bridging member are provided in FIGS. 37-58. Turning first to FIGS. 37 and 38, one embodiment of an extrusion-coated structural member 1010 is illustrated as generally comprising a pair of substrates 1012, 1014 and at least two bridging members 1040, 1042 extending from at least a portion of substrate 1012 to at least a portion of substrate 1014. In one embodiment, substrates 1012 and 1014 are formed of the same substrate material, while, in another embodiment, substrates 1012 and 1014 may be formed of different materials. Similarly, bridging members 1040 and 1042 can be formed of different coating materials, but, in a preferred embodiment, both bridging members 1040 and 1042 can be formed of a single material extrusion coated onto at least a portion of extrusion-coated structural member 1010.

In one embodiment depicted in FIGS. 37 and 38, at least a portion of substrates 1012, 1014 can be in direct contact such that one or more of the outer surfaces 1022a (1022b not shown) of one substrate 1012 and one or more of the outer surface 1024a (1024b not shown) of the other substrate 1014 collectively form at least one composite surface 1040a,b as shown in FIG. 38. In one embodiment, bridging members 1040 and 1042 may extend along respective composite surfaces 1040a,b from at least a portion of outer surfaces 1022a,b of substrate 1012 to at least a portion of outer surfaces 1024a,b of substrate 1014 thereby forming extrusion-coated structural member 1010. In one embodiment shown in FIGS. 37 and 38, the extrusion-coated structural member may define an interior structural recess 1018, which can optionally be configured to receive one or more functional or aesthetic elements (not shown), such as, for example, one or more elements listed above.

Turning now to FIGS. 39-41, another embodiment of an extrusion-coated structural system 1050 is illustrated as comprising a pair of substrates 1052, 1054 and a bridging member 1060 coupling substrates 1052 and 1054 to one another. Bridging member 1060 can be formed of a coating material 1056 and may extend from at least a portion of substrate 1052 to at least a portion of substrate 1054. When substrates 1052 and 1054 are also coated with a coating material 1056, as shown in the embodiment in FIGS. 39-41, at least a portion of the coating material 1056 disposed on substrates 1052 and 1054 can be continuous with bridging member 1060.

When structural system 1050 is configured in a flat configuration, as generally shown in FIG. 39, substrates 1052 and 1054 can be spaced apart from one another to form a gap 1070. As shown in FIG. 39, gap 1070 is at least partially defined by opposing surfaces 1064, 1066 of respective substrates 1052, 1054, which are arranged substantially parallel to one another and at least partially coated with coating material 1056 and may be continuous with the material used to coat substrates 1052, 1054 and/or may be continuous with the coating material 1056 used to form bridging member 1070.

As structural system 1050 is shifted from a flat configuration to one or both of the folded configurations shown in FIGS. 40 and 41, the size and/or shape of gap 1070 may change. For example, when shifting structural system 1050 from a flat configuration to a folded configuration, the size of gap 1070 may increase, while, when shifting structural system 1050 from a folded configuration to a flat configuration, the size of gap 1070 may decrease. Structural systems configured similarly to structural system 1050 may have a variety of end uses and, in one embodiment, may be suitable for use as a trim piece or other component in a variety of indoor and/or outdoor construction applications.

Referring now to FIGS. 42-44, yet another embodiment of an extrusion-coated structural system 1100 configured according to the present invention is provided. Extrusion-coated structural system 1100 comprises a pair of substrates 1112, 1114 and a bridging member 1120 extending between at least a portion of substrates 1112 and 1114. Extrusion-coated structural system 1100 is similar to the extrusion-coated structural system 1050 depicted in FIGS. 39-41, with at least the following differences.

When structural system 1100 is arranged in a flat configuration, as shown in FIG. 42, substrates 1112 and 1114 can define a gap 1130 there between. In contrast to gap 1070 depicted in FIGS. 39-41, opposing surfaces 1132, 1134 of substrates 1112, 1114 shown in FIGS. 42-44 are not parallel, but instead are angularly aligned with one another at an alignment angle, shown as θ in FIG. 42, measured from surface 1132 of substrate 1112 to surface 1134 of substrate 1114. In one embodiment, the alignment angle can be at least about 5°, at least about 15°, at least about 30°, at least about 45°, at least about 60° and/or not more than about 160°, not more than about 135°, not more than about 110°, or not more than about 90°. Additionally, as particularly shown in FIG. 42, the width of gap 1130 changes along its depth. For example, as shown in FIG. 42, the width of the gap narrows nearer bridging member 1120, such that gap 1130 has a general "V"-shaped cross-section.

When structural system 1100 is shifted between a flat configuration, as shown in FIG. 42, to a folded configuration, as shown in FIG. 43, gap 1130 is no longer present and opposing surfaces 1132 and 1134 may contact one another. Additionally, when in the folded configuration shown in FIG. 43, substrates 1112 and 1114 may collectively define a structural recess 1118 configured to receive a hardware member, shown as structural member 1120 in FIG. 44, to thereby secure structural system 1100 in a folded configuration. Alternatively, other recess configurations and other types of hardware may be used or, in one embodiment, an adhesive material such as, for example, double-sided tape or glue, may also be used to secure structural system 1100 in a folded configuration. Hardware member 1120 may be used to secure structural system 1100 in a folded configuration permanently or may be removable such that structural system 1100 can be shifted back to a flat configuration, as shown in FIG. 42.

Turning now to FIGS. 45 and 46, another embodiment of an extrusion-coated structural system 1150 is illustrated as generally comprising a plurality of substrates 1152a-f and a coating material 1156 extrusion coated onto at least a portion of substrates 1152a-f. In one embodiment, substrates 1152a-f may be coupled to one another by at least one bridging member 1170 extending from one or more of the substrates 1152a-e to one or more other substrates 1152a-e. According to the embodiment shown in FIGS. 45 and 46, bridging member 1170 may be a single bridging member 1170 extending continuously from a first substrate, shown as substrate 1152a, along the length of structural system 1150 to a last substrate, shown as 1152e. Alternatively, each of bridging members 1170a-d may have been separately formed and may, in one embodiment, be formed of a coating material different than coating material 1156 and/or may discontinuous with at least a portion of coating material 1156.

Structural system 1150, as shown in FIGS. 45 and 46, may be formed in any suitable manner. In one embodiment, several individual, but similarly shaped, substrates 1152a-e may be simultaneously extrusion coated while maintaining a space between the substrates to thereby form a bridging member 1170 that spans at least a portion of the space between substrates 1152a-e. In another embodiment, a single elongated substrate may be at least partially coated with coating material 1156 and a plurality of gaps 1174a-e may then be cut into the coated substrate at various locations along its length to thereby form substrates 1152a-e, as shown in FIG. 46. When cutting gaps 1174a-e, coating material 1156 extending along at least one of the surfaces of substrate 1152 may remain intact, thereby forming bridging member 1170, as shown in FIGS. 45 and 46.

Structural system 1150 can be shiftable between a flat configuration, as illustrated in FIG. 45, and a folded configuration, as illustrated in FIG. 46. In one embodiment, when in a folded configuration, at least one surface 1162a of a substrate 1152a may be contacted with at least one surface 1162f of another substrate 1152f to thereby form a closed configuration as generally shown in FIG. 46. When in said closed configuration, structural system 1150 may have a circular or polygonal shape, depending, in part, on the size, shape, and number of individual substrates. In the embodiment shown in FIG. 46, structural system 1150 may be configured so that bridging member 1170 forms a continuous external surface 1173 amongst substrates 1152a-f. In one embodiment, a securing device, including, for example, a hardware member or adhesive material (not shown) may be used, if desired, to secure surfaces 1162a and 1162f to each other.

Referring now to FIGS. 47-49, another extrusion-coated structural system 1200 is illustrated as comprising a plurality of substrates 1212a-h and a coating material 1216 extrusion coated onto at least a portion of substrates 1212a-h. Substrates 1212a-h may be coupled to one another by at least one bridging member 1240 extending along at least a portion of one or more of the substrates 1212a-h. Extrusion-coated structural system 1200 is similar to the extrusion-coated structural system 1150 described previously with respect to FIGS. 45 and 46, with at least the following differences.

As shown in FIGS. 47-49, structural system 1200 includes a plurality of substrates 1212a-h spaced apart from one another to form a plurality of gaps 1230a-g. Each of gaps 1230a-g is at least partially defined by opposing surfaces of adjacent substrates 1212a-h which are aligned substantially parallel to one another. Further, as shown in FIG. 48, the width of each of gaps 1230a-g can be substantially constant over the depth of the gaps 1230a-g and, as shown in one embodiment depicted in FIG. 47, the direction of extension one or more gaps 1230a-g may or may not be substantially parallel with the direction of extension of one or more other gaps 1230a-g and/or with one or more edges 1213a,b of structural system 1200. As a result, when structural system 1200 is shifted into a folded configuration, as shown in FIG. 49, bridging member 1240 may form a continuous surface 1236 located inside the closed portion of structural system 1200. Additionally, rather than contract when the structural system is shifted into a folded configuration at least a portion of gaps 1230a-g of structural system 1200 expand when structural system 1200 is shifted from a flat configuration to a folded configuration, as particularly shown in FIGS. 48 and 49.

Figures 50, 51:
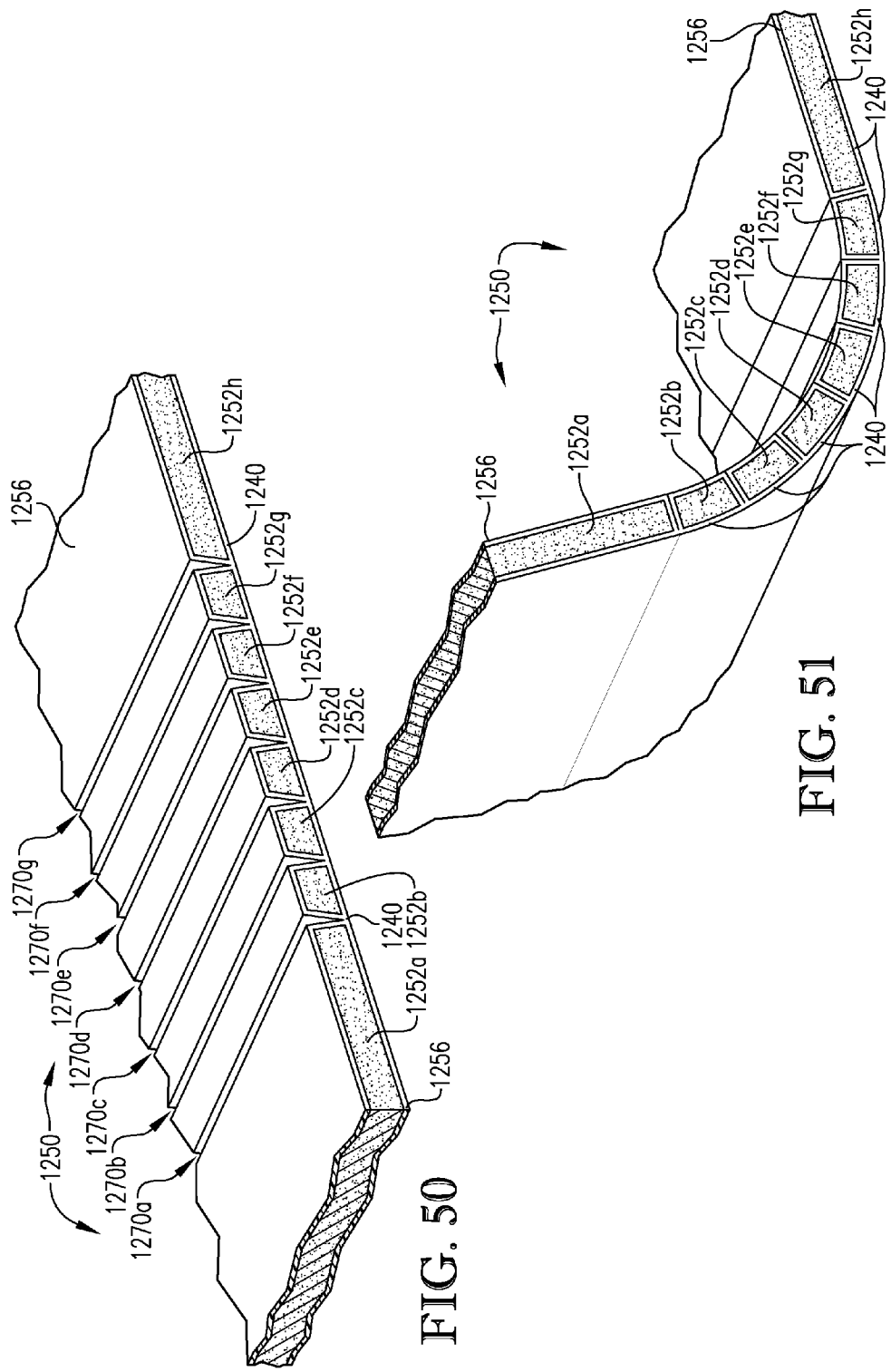
FIG. 50 is a side perspective view of yet another embodiment of an extrusion-coated structural system, arranged in a flat configuration.
FIG. 51 is a side perspective view of the extrusion-coated structural system shown in FIG. 50, arranged in a folded configuration.

Referring now to FIGS. 50 and 51, yet another embodiment of an extrusion-coated structural system 1250 is illustrated as comprising a plurality of substrates 1252*a-h* and a coating material 1256 extrusion coated onto at least a portion of substrates 1252*a-h*. As shown in FIGS. 50 and 51, at least a portion of coating material 1256 may be formed into a bridging member 1240 extending from at least a portion of one or more substrates 1252*a-h* to at least a portion of one or more other substrates 1252*a-h*. In one embodiment shown in FIGS. 50 and 51, bridging member 1240 may extend continuously between each of substrates 1252*a-h*, while, in another embodiment (not shown), at least a portion of bridging member 1240 may not be continuous along the length of substrates 1252*a-h*. As shown in FIGS. 50 and 51, at least a portion of substrates 1252*a-h* may not contact one another, but, instead, may only be connected by bridging member 1240.

Similar to previously-discussed structural system, structural system 1250 can be shiftable between a flat configuration, as shown in FIG. 50, and a folded configuration, as generally depicted in FIG. 51. When in the flat configuration, structural system 1250 includes a plurality of gaps 1270*a-g* defined between opposing surfaces of adjacent substrates 1252*a-h*. In the embodiment shown in FIG. 50, the opposing surfaces of adjacent substrates 1252*a-h* may be angularly oriented with respect to one another and may also be at least partially coated with coating material 1256. When shifted to the folded configuration, at least one dimension of at least a portion of gaps 1270*a-g* may change and, as shown in the embodiment depicted in FIG. 51, gaps 1270*a-g* may contract when structural system 1250 is shifted to the folded configuration. Once in the folded configuration, structural system 1250 may have a generally rounded or arcuate shape, making it particularly suitable for use in construction applications, particularly those for curved walls or surfaces.

Referring now to FIGS. 52 and 53, still another embodiment of an extrusion-coated structural system 1300 is illustrated as comprising a pair of substrates 1312, 1314 and a coating material 1316 extrusion coated onto at least a portion of substrates 1312 and 1314. Additionally, structural system 1300 comprises a pair of bridging members 1340, 1342 extending from at least a portion of one substrate 1312 to at least a portion of the other substrate 1314. Bridging members 1340, 1342 are formed of coating material 1316, which may, in one embodiment, be continuous with at least a portion of the coating material 1316 coated onto substrates 1312 and 1314. As illustrated in the embodiment depicted in FIGS. 52 and 53, bridging member 1340 may be the only connection member between substrates 1312 and 1314.

As shown in the embodiment depicted in FIGS. 52 and 53, substrates 1312 and 1314 may be spaced apart from one another to form a gap 1344 across which bridging member 1340 and 1342 may at least partially extend. In one embodiment, structural system 1300 may be shiftable between an extended configuration, as shown in FIG. 53, and a contracted configuration, as generally shown in FIG. 52. When arranged in an extended configuration, gap 1344 between substrates 1312 and 1314 is greater than when structural system 1300 is arranged in a contracted configuration. At least a portion of the transition between an extended and a contracted configuration may folding or bending at least one of bridging member 1340 and 1342 to reduce at least one dimension of gap 1344, as shown in FIG. 52.

In one embodiment, at least one functional element (not shown), such as, for example, piping, electrical conduit, wires, cables, lighting elements or fixtures, and combinations thereof, may be inserted into gap 1344 when structural system 1300 is in an extended configuration shown in FIG. 53, and thereafter, system 1300 may be shifted to a retracted configuration, as depicted in FIG. 52, to hold, support, or just hide the functional element within gap 1344. In one embodiment, structural system 1300 may be particularly useful in as a furniture component or a construction material. In addition to enhancing the aesthetics of the ultimate article or material, structural system 1300 may also provide additional functionality as a holding device for a variety of functional elements.

Figure 54:
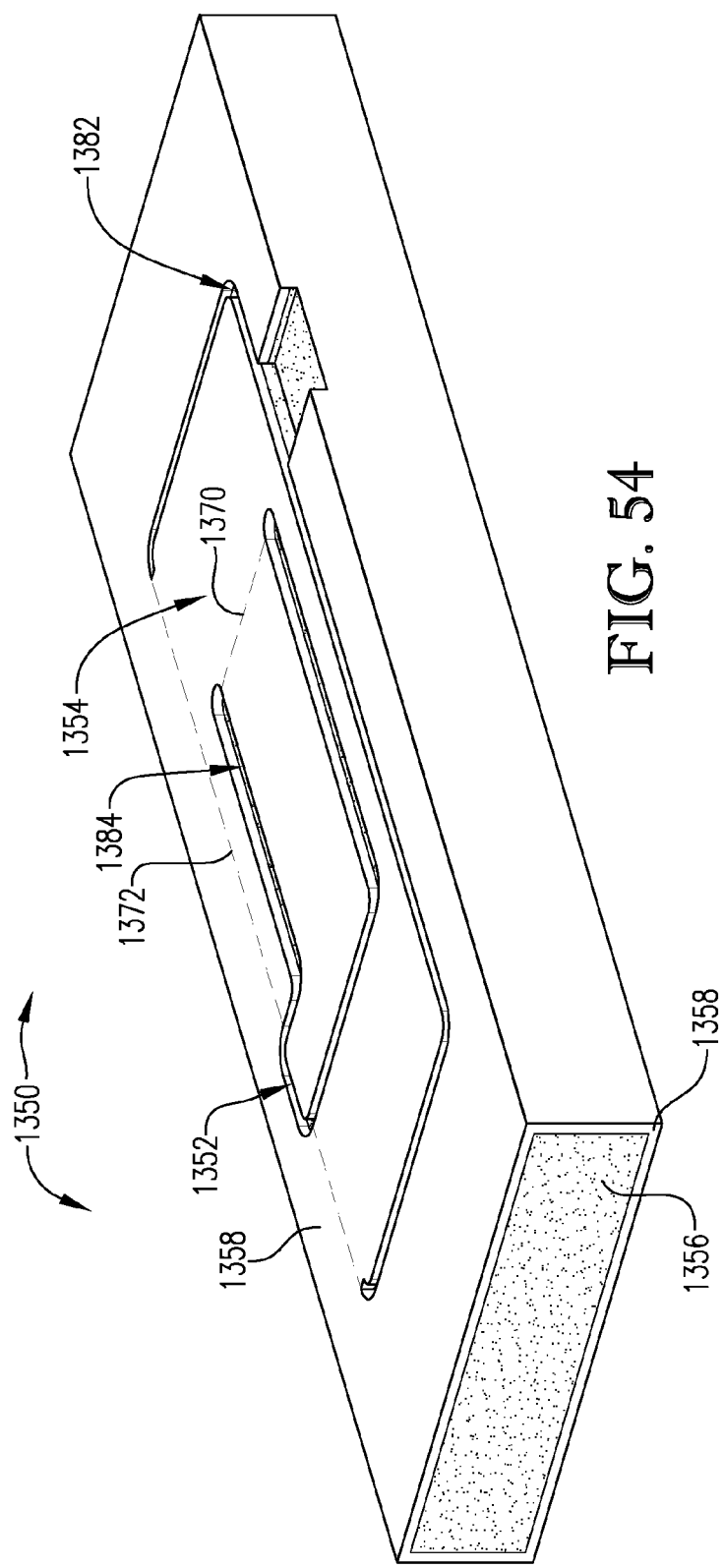
FIG. 54 is a side perspective view of a further embodiment of an extrusion-coated structural system, arranged in a flat configuration.
Figure 55:
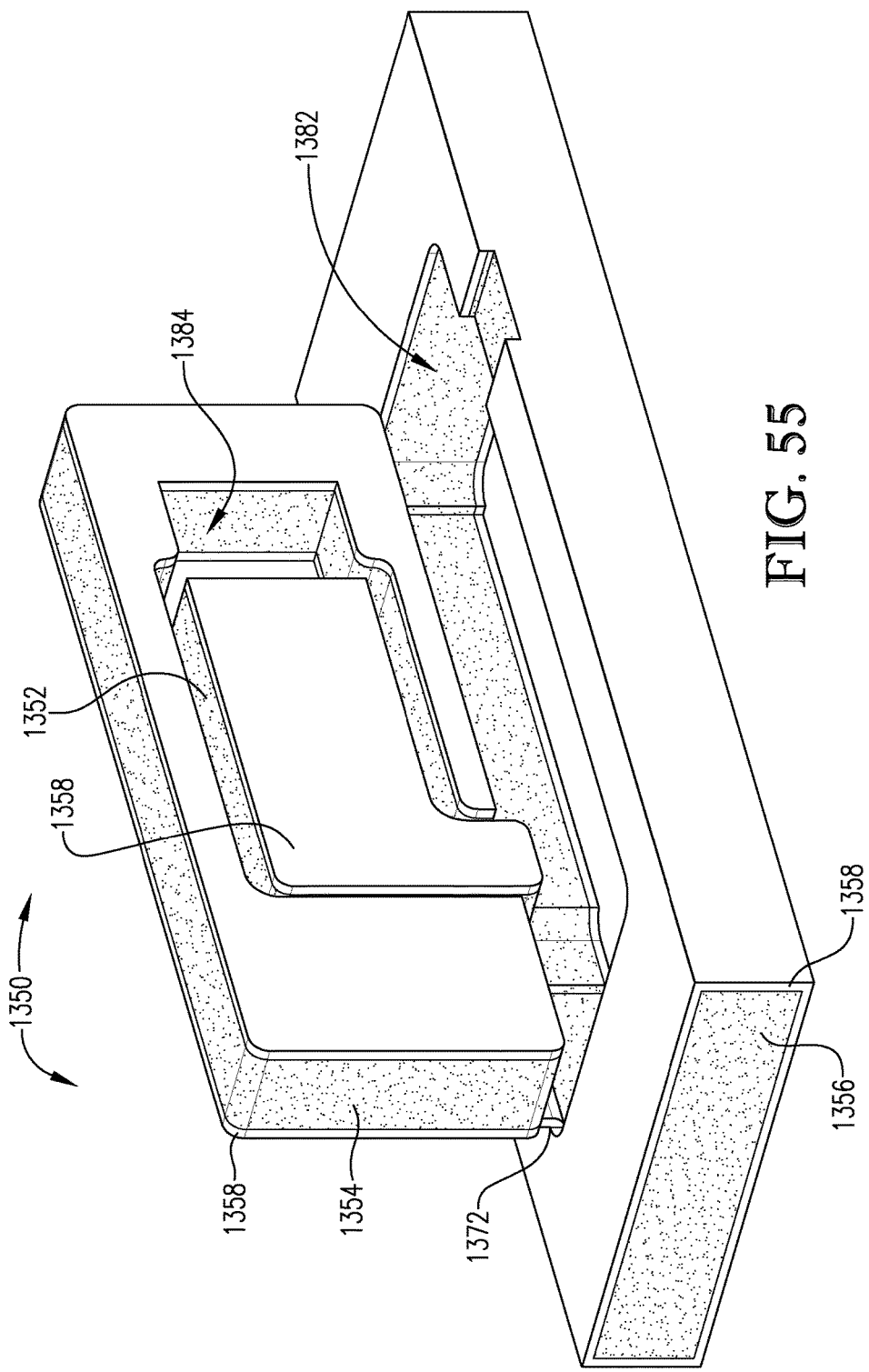
FIG. 55 is a side perspective view of the extrusion-coated structural system shown in FIG. 54, arranged in an a folded configuration.
Figure 56:
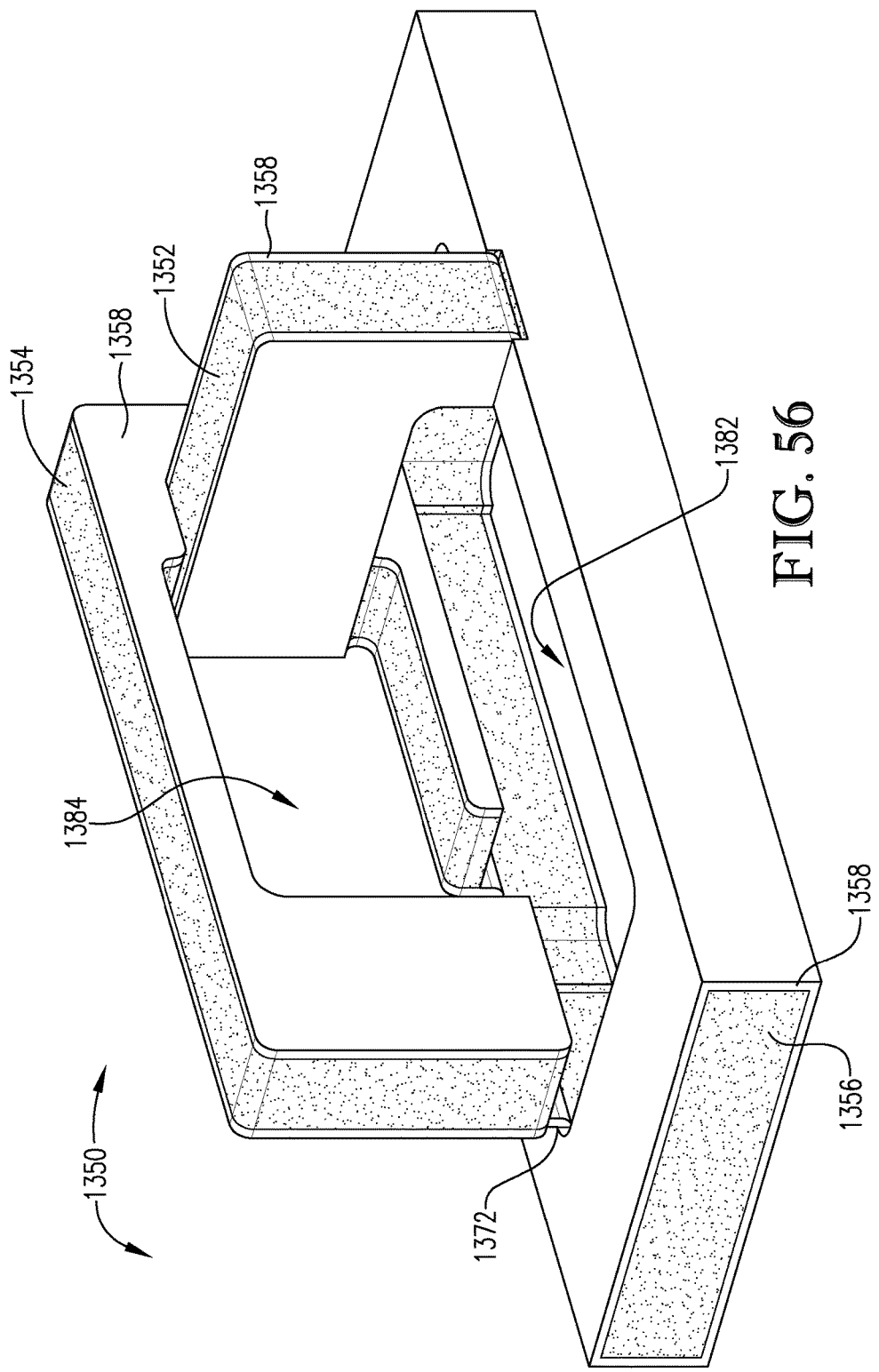
FIG. 56 is a side perspective view of the extrusion-coated structural system shown in FIGS. 54 and 55, arranged in an another folded configuration.

Turning now to FIGS. 54-56, one embodiment of an extrusion-coated structural system 1350 is shown as comprising a plurality of substrates 1352, 1354, and 1356 and a coating material 1358 extrusion coated onto at least a portion of substrates 1352, 1354, 1356. Structural system 1350 further includes a bridging member 1370 extending between at least a portion of substrate 1352 and 1354 and a bridging member 1372 extending between at least a portion of substrate 1354 and 1356. As shown in FIGS. 54-56, substrates 1352, 1354, and 1356 of structural system 1350 are arranged in a nested configuration, with at least a portion of substrates 1352 and 1354 being at least partially disposed within a cavity 1382 at least partially defined by substrate 1356 and/or substrate 1352 being at least partially disposed within a cavity 1384 defined by substrate 1354. In one embodiment, substrates 1352, 1354, 1356 may be formed by simultaneously extrusion coating separate substrates to form structural system 1350, while, in another embodiment, each of substrates 1352, 1354, 1356 may be cut from a single substrate which has been extrusion coated.

Structural system 1350 can be configured to be shifted between a flat configuration, shown in FIG. 53, to at least one extended configuration, shown in FIGS. 54 and 55 using bridging members 1370 and/or 1372. To shift structural system 1350 from a flat configuration, as shown in FIG. 53, to an assembled configuration, as shown in FIGS. 54 and 55, bridging members 1370 and/or 1372 may be bent, rotated, or otherwise flexed so that the position of one of substrates 1352, 1354, and/or 1356 may be changed relative to at least one other of substrates 1352, 1354, 1356, without decoupling the substrates 1352, 1354, 1356 from one another. In one embodiment shown in FIGS. 53-55, one of bridging member 1370 may be configured to rotate, move, bend, or flex in a different direction than the other bridging member 1372, such that one or more of substrates 1352, 1354, and 1356 may move in a direction other than the direction in which one or more of the other substrates 1352, 1354, and 1356 are configured to move. In one embodiment, structural systems configured in a similar manner to structural system 1350 may be particularly useful for furniture or cabinetry applications, including, for example, in modular furniture applications. In addition to being simpler to assemble, such structural system may also be simpler and/or less expensive to manufacture and ship than similar conventional items.

Figure 59:
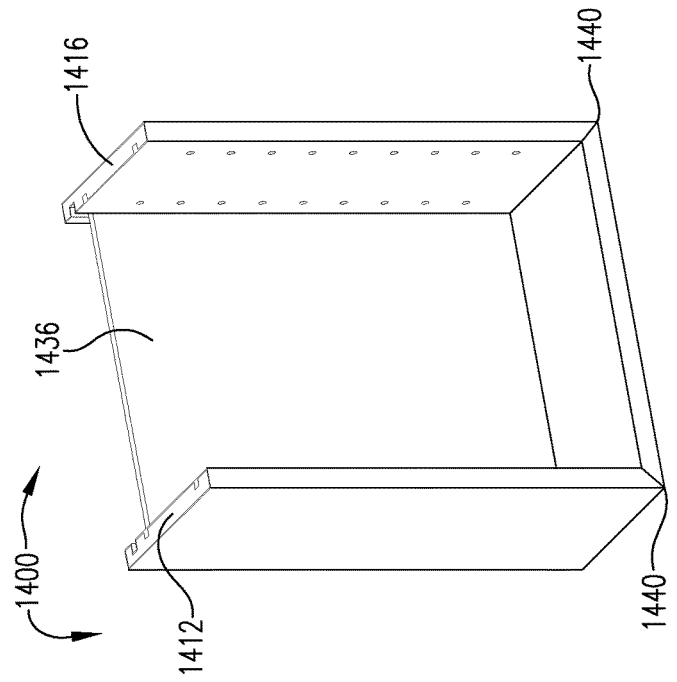
FIG. 59 is a side perspective view of the extrusion-coated structural system shown in FIGS. 57 and 58, arranged in an another folded configuration.
Figure 58:
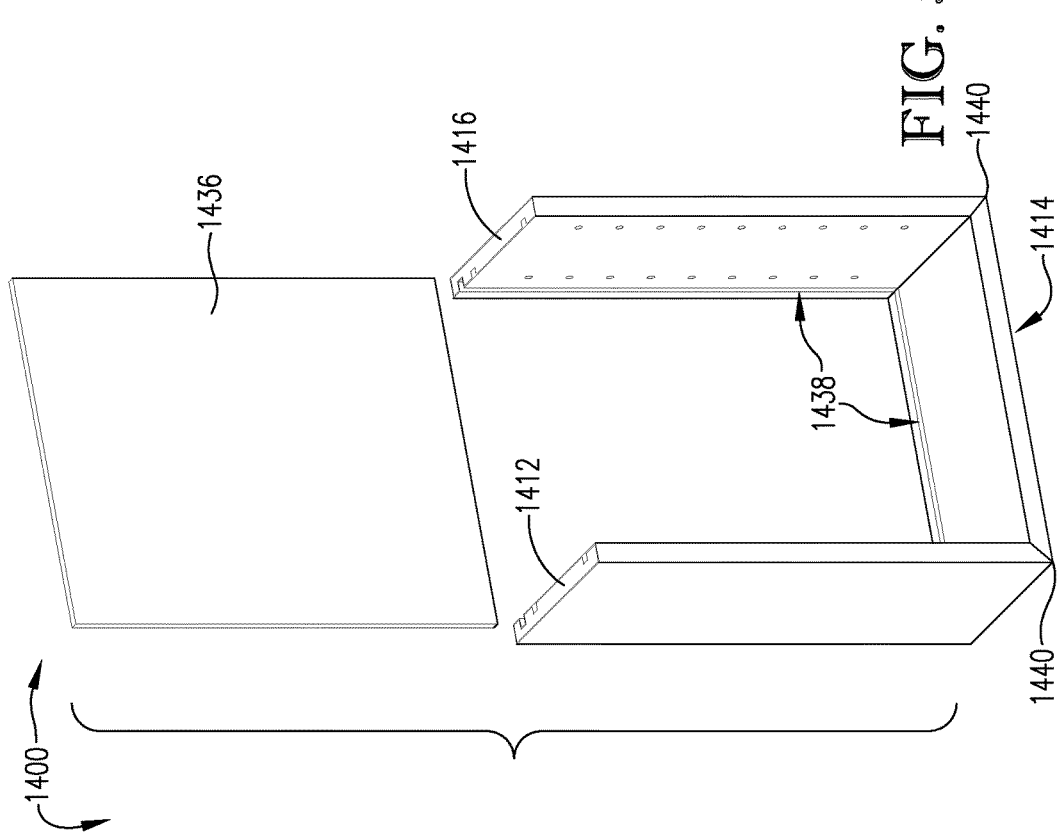
FIG. 58 is a side perspective view of the extrusion-coated structural system shown in FIG. 57, arranged in an a folded configuration.

Turning now to FIGS. 57-59, a further embodiment of an extrusion-coated structural system 1400 is illustrated as comprising a plurality of substrates 1412, 1414, 1416 and a coating material extrusion coated onto at least a portion of substrates 1412, 1416, and 1418. As shown in FIGS. 57-59, structural system 1400 also includes at least one bridging member 1440 extending between at least a portion of two or more of substrates 1412, 1414, 1416. In one embodiment, substrates 1412, 1414, 1416 may have been formed by cutting a pair of gaps 1420, 1422 at spaced-apart locations along the length of a single extrusion coated substrate. As shown in FIG. 57, each of gaps 1420 and 1422 may include uncoated opposing surfaces 1434*a,b* and 1436*a,b* angularly oriented with respect to each other. Optionally, one or both of opposing surfaces 1434*a,b* and/or 1436*a,b* may include an adhesive material (not shown) to further secure structural system 1400 in a desired end configuration.

According to one embodiment shown in FIG. 57, the position of one or more of substrates 1412, 1414, 1416 may be adjusted relative to the position of one or more other substrates 1412, 1414, 1416 by rotating, bending, flexing, or otherwise moving bridging member 1440. For example, structural system 1400 may be shifted between a flat position, as shown by the solid lines in FIG. 57, to a folded configuration, shown by the dashed lines in FIG. 57 and the solid lines in FIG. 58, by moving substrates 1412 and 1416 along a path of motion represented by arrows 1447 and 1449. Once substrates 1412, 1414, 1416 are assembled into a folded configuration shown in FIG. 58, a hardware member, shown as panel 1436, may be inserted into a structural recess 1438 collectively defined by substrates 1412, 1414, 1416. The resulting configuration of structural system 1450, shown in FIG. 59, may be used in a variety of furniture or cabinetry applications. Additionally, one or more additional hardware members (not shown), such a shelves and shelf supports, hinges, slides, and the like may also be included in structural system 1450, depending on its specific end use. In one embodiment, structural system 1450 can be used as a cabinet box, a drawer, a shelf, a dresser, or any other suitable item.

Several extrusion-coated structural systems configured according to embodiments of the present invention have been discussed in detail above. Although one or more features of these systems may have only been described with reference to one or a few of the embodiments illustrated in the Figures, it should be understood that the particular embodiments described above are exemplary and one or more features described with respect to one embodiment above could be used in a structural system configured according to another embodiment and still fall within the scope of the present invention. Similarly, one or more features of structural system described above could be combined to form another structural system not particularly illustrated without departing from the spirit of the present invention.

In another aspect, the present invention relates to methods of assembling one or more of the extrusion-coated structural systems described in detail above. For example, in one embodiment, one or more structural systems of the present invention may be assembled by contacting at least a portion of one structural member with another structural member to form at least a portion of the structural system. In one embodiment, the contacting can include joining one structural member to another by, for example, inserting a hardware protrusion into a structural recess so that the hardware protrusion is at least partially supported by at least a portion of a recess attachment surface and/or inserting a structural protrusion into a hardware recess so that the protrusion attachment surface is at least partially supported by at least a portion of the hardware recess. In one embodiment, at least one of the structural members is a reinforced structural member including a reinforced region proximate the location where the structural members are joined. The action of inserting the protrusion into the recess may include, for example, sliding, rotating, or snapping a protrusion into its corresponding recess, and the protrusion, once inserted, may be configured for movement within the recess as discussed in detail previously.

In another embodiment, the contacting can include contacting at least a portion of a structural member with one or more extruded profile members of a second substrate, as discussed in detail previously. In one embodiment wherein the extruded profile member includes a profile recess, the contacting can include inserting a hardware, structural, or profile protrusion into the profile recess, while, in another embodiment, the contacting can include inserting a profile protrusion defined by the extruded profile member into a structural, profile, or hardware recess. Subsequent to the contacting, at least one hardware member, or an adhesive material, may be used to secure the structural member in a desired configuration.

Assembly of an extrusion-coated structural system can also include adjustment of the position of one or more structural member relative to one or more other structural members and, may, for example, be done using a bridging member. When the structural system comprises a bridging member, the adjustment of the relative position of one or more substrates can be accomplished without decoupling the substrates and may be accomplished within the an angular range of motion as described previously.

Once assembled, the structural system of the present invention may remain assembled or, in one embodiment, at least a portion, or all, of the structural system may be disassembled. Disassembly can generally be carried out by repeating the steps of assembly in reverse and may include, for example, re-adjustment of the positions of one or more substrates, removal of a hardware or profile protrusion from a structural recess, removal of a structural protrusion from a hardware or profile recess, and/or breaking of contact between two or more substrates. When disassembled, structural systems of the present invention exhibit little or no damage to the component parts, and in some cases, such as structural systems including at least one bridging member, the substrates may not be uncoupled during disassembly.

Once disassembled, the components can be shipped or stored in a disassembled state and/or may be reassembled at a different time, sometimes in a slightly different configuration. For example, in one embodiment, the structural system of the present invention can include at least one adjustable component, configured to be arranged within the structural system in more than one position. In one embodiment, this may include a structural member having multiple hardware insertion points or a structural member having an extruded profile member configured to contact more than one additional structural member. The flexibility of design, along with the ability for repeated use may be unique and beneficial features of the extrusion-coated structural systems of the present invention.

In another aspect, the present invention relates to methods of making extrusion-coated structural systems, including the extrusion-coated structural systems described above. In one embodiment, the method of making one or more of the extrusion-coated structural systems or extrusion-coated structural members of the present invention can include extrusion coating at least one coating material onto at least a portion of one or more substrates. As discussed previously, the term "extrusion coating" refers to a process for applying a fluid coating material onto at least a portion of a substrate, optionally under pressure and/or at an elevated temperature. As used herein, the term "extrusion coating" can include applying different thickness of coating to different regions of the substrate and also encompasses the formation of one or more extruded profile members extending outwardly from the substrate, whether or not the profile member includes underlying substrate. Further details regarding the methods for making extrusion-coated structural members according to embodiments of the present invention will be discussed in detail below, with reference to FIG. 60.

Figure 60:
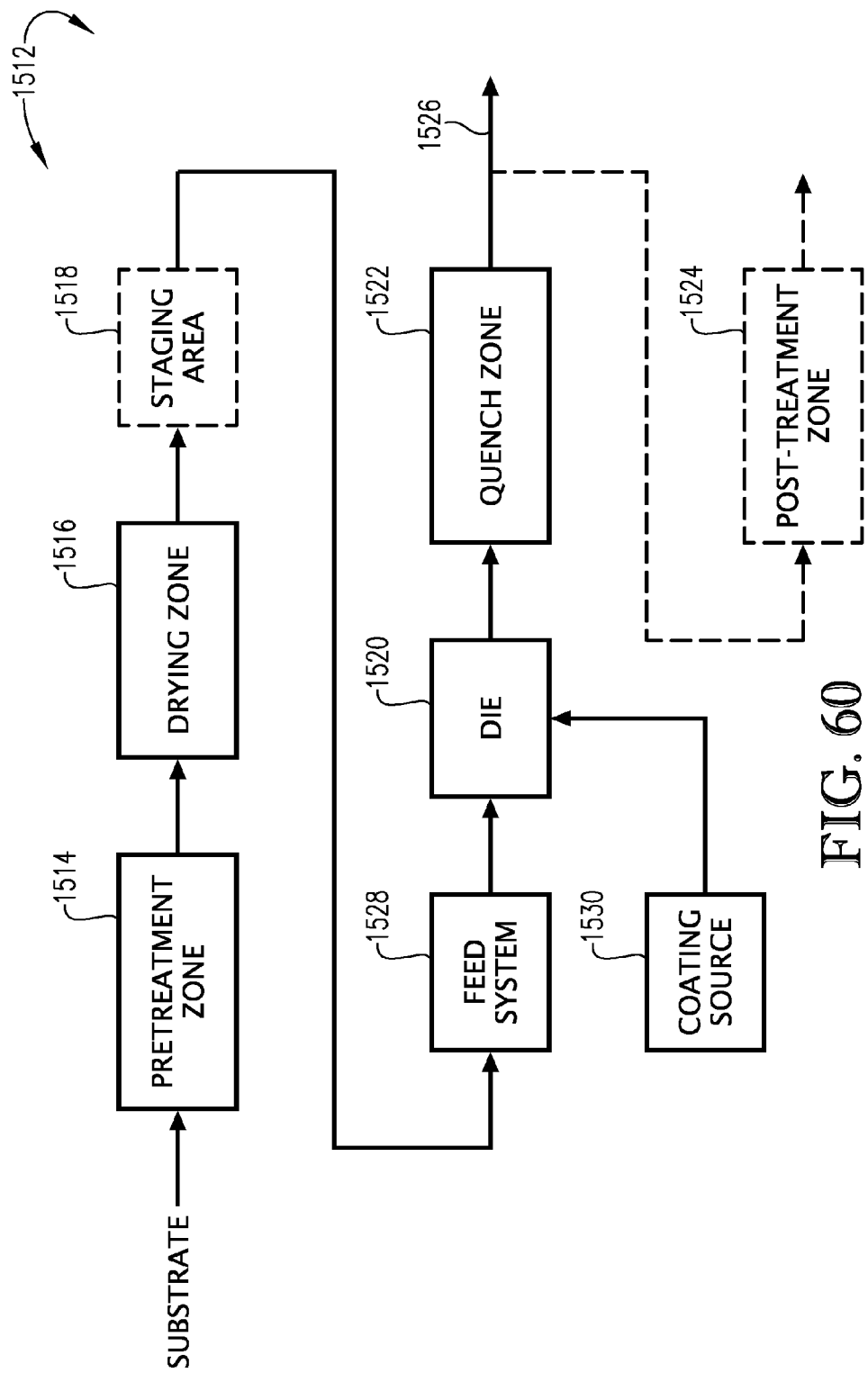
FIG. 60 is a schematic diagram of the major steps in a process for making an extrusion-coated structural member according to one embodiment of the present invention.

Referring now to FIG. 60, a schematic flow diagram of an extrusion coating system 1512 configured according to one embodiment of the present invention is provided. Coating system 1512 is illustrated as comprising a pretreatment zone 1514, a drying zone 1516, an optional staging area 1518, an extrusion coating die 1520, a quench zone 1522, and an optional post treatment zone 1524. As shown in FIG. 60, one or more substrates can be sequentially passed through pretreatment zone 1514, drying zone 1516, and optional staging area 1518 before being introduced into extrusion coating die 1520, which is configured to facilitate contact between at least a portion of the surface of the substrate or substrates and at least one coating material introduced into die 1520 from a coating source 1530. The resulting coated article can be cooled in quench zone 1522 before being optionally treated in a post treatment zone 1524. If not further processed in post-treatment in zone 1524, the cooled, coated substrate may simply be removed from coating system 1512, as indicated by line 1526.

Coating system 1512 can be configured to process any substrate capable of being extrusion coated and suitable for use in extrusion-coated structural systems according to embodiments of the present invention. The substrates used may be rigid or substantially rigid substrates and can have any suitable dimensions. According to one embodiment, the substrate being coated for use in one or more extrusion-coated structural systems described above may have a length, or largest dimension, of at least about 5 feet, at least about 6 feet, at least about 8 feet, at least about 10 feet, at least about 12 feet and/or not more than about 25 feet, not more than about 20 feet, or not more than about 15 feet. In the same or another embodiment, the substrate can have a length in the range of from about 5 feet to about 25 feet, about 8 feet to about 20 feet, or about 10 feet to about 15 feet. The substrate can also have a width, or second largest dimension, of at least about 1 inch, at least about 2 inches, or at least about 4 inches and/or not more than about 10 inches, not more than about 8 inches, or not more than about 6 inches, or in the range of from about 1 to about 10 inches, about 2 to about 8 inches, or about 4 to about 6 inches. The thickness, or shortest dimension, of the substrate being coated in coating system 1512 can be at least about 0.10 inches, at least about 0.25 inches, at least about 0.5 inches and/or not more than about 4 inches, not more than about 2 inches, or not more than about 1 inch, or in the range of from about 0.10 to about 4 inches, about 0.25 to about 2 inches, or about 0.5 to about 1 inch.

Substrates being extrusion coated in coating system 1512 and suitable for use in the extrusion-coated structural system described herein made of a variety of substrate materials. In one embodiment, the substrates coated in coating system 1512 can comprise a single material, while, in another embodiment, the substrate can be a composite of two or more different materials. Examples of suitable materials can be one or more of natural wood, wood composites, plastics including cellularized PVC and other foams, metal, fiber-glass-reinforced thermoset or thermoplastic polymers, ceramics, cement, and combinations thereof. In the same or another embodiment, the substrate material comprises medium-density fiber board (MDF), particle board, oriented strand board (OSB), high-density fiberboard (HDF), wood-filled plastic, wood-plastic composites, ultra-light density fiber board (LDF), plywood, and combinations thereof.

The coating material applied to the substrate in coating system 1512 can be any coating material exhibiting sufficient processability and adhesion to the selected substrate. In one embodiment, the coating material may have an elongation at break, as measured by ASTM D882, of at least about 1 percent, at least about 5 percent, at least about 10 percent, at least about 25 percent, at least about 40 percent, at least about 55 percent, at least about 70 percent and/or not more than about 250 percent, not more than about 200 percent, not more than about 150 percent, or not more than about 100 percent.

The elongation at break of the coating material used in one or more embodiments described herein may be in the range of from about 1 to about 250 percent, about 1 to about 200 percent, about 1 to about 150 percent, about 1 to about 100 percent, about 5 to about 250 percent, about 5 to about 200 percent, about 5 to about 150 percent, about 5 to about 100 percent, about 10 to about 250 percent, about 10 to about 200 percent, about 10 to about 150 percent, about 10 to about 100 percent, about 25 to about 250 percent, about 25 to about 200 percent, about 25 to about 150 percent, about 25 to about 100 percent, about 40 to about 250 percent, about 40 to about 200 percent, about 40 to about 150 percent, about 40 to about 100 percent, about 55 to about 250 percent, about 55 to about 200 percent, about 55 to about 150 percent, about 55 to about 100 percent, about 70 to about 250 percent, about 70 to about 200 percent, about 70 to about 150 percent, about 70 to about 100 percent.

The coating material can have a yield stress of at least about 5 MPa, at least about 10 MPa, at least about 15 MPa, at least about 20 MPa, at least about 25 MPa and/or not more than about 50 MPa, not more than about 45 MPa, not more than about 40 MPa, or not more than about 35 MPa, measured according to the procedure provided in ASTM D882. The yield stress of the coating material used in one or more embodiments described herein can be in the range of from about 5 to about 50 MPa, about 5 to about 45 MPa, about 5 to about 40 MPa, about 5 to about 35 MPa, about 10 to about 50 MPa, about 10 to about 45 MPa, about 10 to about 40 MPa, about 10 to about 35 MPa, about 15 to about 50 MPa, about 15 to about 45 MPa, about 15 to about 40 MPa, about 15 to about 35 MPa, about 20 to about 50 MPa, about 20 to about 45 MPa, about 20 to about 40 MPa, about 20 to about 35 MPa, about 25 to about 50 MPa, about 25 to about 45 MPa, about 25 to about 40 MPa, about 25 to about 35 MPa. This may be in contrast, for example, to conventional coatings like paints, which have a yield stress of less than 1 MPa.

The coating material can also have a percent yield strain of at least about 1 percent, at least about 2 percent, at least about 5 percent and/or not more than about 8 percent, not more than about 6 percent, as calculated by ASTM D882. This may be, in some cases, lower than conventional coatings, such a paint, which may exhibit a percent yield strain greater than 9 percent. The coating material used herein may also have a modulus of at least about 10 MPa, at least about 50 MPa, at least about 100 MPa, at least about 500 MPa, at least about 1000 MPa, at least about 1200 MPa and/or not more than about 2500 MPa, not more than about 2000 MPa, not more than about 1500 MPa, measured according to ASTM D882. The modulus of the coating material can be in the range of from about 10 to about 2500 MPa, about 10 to about 2000 MPa, about 10 to about 1500 MPa, about 50 to about 2500 MPa, about 50 to about 2000 MPa, about 50 to about 1500 MPa, about 100 to about 2500 MPa, about 100 to about 2000 MPa, about 100 to about 1500 MPa, about 500 to about 2500 MPa, about 500 to about 2000 MPa, about 500 to about 1500 MPa, about 1000 to about 2500 MPa, about 1000 to about 2000 MPa, about 1000 to about 1500 MPa, about 1200 to about 2500 MPa, about 1200 to about 2000 MPa, about 1200 to about 1500 MPa.

The coating material may comprise one or more polymers or resins, such as thermoplastic polymers or resins capable of being applied to the substrate in a molten or melted form. The coating material may be a resin coating comprising at least one thermoplastic and/or at least one thermosetting resin. In one embodiment, the resin can be present in the coating material in an amount of at least about 30 weight percent, at least about 40 weight percent, at least about 50 weight percent, at least about 60 weight percent and/or not more than about 99 weight percent, not more than about 90 weight percent, not more than about 85 weight percent, based on the total weight of the composition.

Suitable thermoplastic resins can be those having one or more properties within certain ranges. For example, in one embodiment, the thermoplastic resin employed in the coating material extrusion coated onto the substrate may have a glass transition temperature of at least about 60° C., at least about 70° C., at least about 80° C. and/or not more than about 150° C., not more than about 140° C., or not more than about 130° C. The glass transition temperature can be in the range of from about 60 to about 150° C., about 60 to about 140° C., about 60 to about 130° C., about 70 to about 150° C., about 70 to about 140° C., about 70 to about 130° C., about 80 to about 150° C., about 80 to about 140° C., about 80 to about 130° C.

In the same or another embodiment, the thermoplastic resin can have an inherent viscosity (I.V.), measured at 25° C. in 60/40 wt/wt phenol/tetrachloroethane, of at least about 0.50, at least about 0.65, at least about 0.69 dL/g and/or not more than about 1.4, not more than about 1.2, not more than about 1.0, not more than about 0.9, not more than about 0.85 dL/g, or in the range of from about 0.50 to about 1.4 dL/g, about 0.50 to about 1.2 dL/g, about 0.50 to about 1.0 dL/g, about 0.50 to about 0.9 dL/g, about 0.50 to about 0.85 dL/g, about 0.65 to about 1.4 dL/g, about 0.65 to about 1.2 dL/g, about 0.65 to about 1.0 dL/g, about 0.65 to about 0.9 dL/g, about 0.65 to about 0.85 dL/g, about 0.69 to about 1.4 dL/g, about 0.69 to about 1.2 dL/g, about 0.69 to about 1.0 dL/g, about 0.69 to about 0.9 dL/g, about 0.69 to about 0.85 dL/g.

In addition, the thermoplastic resin may be amorphous, crystalline, or semi-crystalline and can have a crystallization half-time of at least about 5, at least about 50, at least about 100, at least about 1000, at least about 10,000 minutes measured at 170° C. The crystallization half time of the polyester, as used herein, may be measured using methods well-known to persons of skill in the art. The crystallization half time of the polyester, $t_{1/2}$, was determined by measuring the light transmission of a sample via a laser and photo detector as a function of time on a temperature controlled hot stage. This measurement was done by exposing the polymers to a temperature, $T_{max}$, and then cooling it to the desired temperature. The sample was then held at the desired temperature by a hot stage while transmission measurements were made as a function of time. Initially, the sample was visually clear with high light transmission and became opaque as the sample crystallizes. The crystallization half-time is the time at which the light transmission was halfway between the initial transmission and the final transmission. $T_{max}$ is defined as the temperature required to melt the crystalline domains of the sample (if crystalline domains are present). The sample is heated to Tmax to condition the sample prior to crystallization half time measurement. The absolute Tmax temperature is different for each composition.

The thermoplastic resin utilized in the coating material may be chosen from linear thermoplastic resins, branched thermoplastic resins, hyperbranched thermoplastic resins, and star-shaped thermoplastic resins. Non-limiting examples of suitable thermoplastic resins include polyesters, copolyesters, acrylics, polycarbonates and mixtures thereof. Additional non-limiting examples include poly(ethylene terephthalate) (PET), PETG copolyester, poly(methyl methacrylate) (PMMA), poly(acrylonitrile-styrene-acrylate) (ASA), poly(acrylonitrile-butadiene-styrene) (ABS), poly (styrene-acrylonitrile) (SAN) and mixtures thereof. Examples of thermoplastic resins include, but are not limited to, EASTAR copolyester 6763, a PETG available from Eastman Chemical Company; LURAN HD, a SAN available from BASF; TERLURAN GP-22, an ABS available from BASF; Modified Acrylate, a PMMA available from Degussa; and CENTREX 833, an ASA available from Lanxess. In one embodiment, the thermoplastic resin used in the coating material can be selected from the group consisting of polyesters, copolyesters, polycarbonates, polymethyl methacrylate (PMMA), including impact-modified PMMA, poly(acrylonitrile-styrene-acrylate) (ASA), poly(acrylonitrile-butadiene-styrene) (ABS), poly(styrene-acrylonitrile) (SAN), cellulose esters and mixtures thereof. According to one embodiment, the resin coating can include a copolyester comprising at least 80 mole percent of acid residues from terephthalic acid, derivatives of terephthalic acid and mixtures thereof, at least 80 mole percent of glycol residues from ethylene glycol and 1,4-cyclohexanedimethanol, wherein the acid residues are based on 100 mole percent of acid residues and the glycol residues are based on 100 mole percent of glycol residues.

According to another embodiment, the coating material can comprise at least one polyester that includes 70 to 100 mole percent acid residues from terephthalic acid, 0 to 30 mole percent aromatic dicarboxylic acid residues having up to 20 carbon atoms, and 0 to 10 mole percent of aliphatic dicarboxylic acid residues having up to 16 carbon atoms wherein the acid residues are based on 100 mole percent acid residue. The resin coating could also comprise a polyester comprising 80 to 100 mole percent acid residues from terephthalic acid, 0 to 20 mole percent aromatic dicarboxylic acid residues having up to 20 carbon atoms, and 0 to 10 mole percent of aliphatic dicarboxylic acid residues having up to 16 carbon atoms wherein the acid residues are based on 100 mole percent acid residues. In another embodiment, the resin coating can comprise a polyester comprising 90 to 100 mole percent acid residues from terephthalic acid, 0 to 10 mole percent aromatic dicarboxylic acid residues having up to 20 carbon atoms, and 0 to 10 mole percent of aliphatic dicarboxylic acid residues having up to 16 carbon atoms wherein the acid residues are based on 100 mole percent acid residues.

In addition to the resin component, the coating material may also include one or more additional components, including, for example, at least one opacity modifier, at least one gloss modifier, at least one impact modifier, and combinations thereof. When included, the opacity modifier can be present in the coating material in an amount of at least about 0.5 percent, at least about 1 percent, at least about 2 percent and/or not more than about 20 percent, not more than about 15 percent, not more than about 10 percent, based on the total weight of the coating material. The opacity modifier can be present in the coating material in an amount in the range of from about 0.05 to about 20 percent, about 0.05 to about 15 percent, about 0.05 to about 10 percent, about 1 to about 20 percent, about 1 to about 15 percent, about 1 to about 10 percent, about 2 to about 20 percent, about 2 to about 15 percent, about 2 to about 20 percent, based on the total weight of the coating material. Non-limiting examples of suitable opacity modifiers include metal oxides and metal salts, such as, for example, zinc oxide (ZnO), mica, white lead, barium sulfate ($BaSO_4$), zinc sulfide (ZnS), antimony oxide and titanium dioxide ($TiO_2$).

In the same or another embodiment, the coating material can include at least about 1, at least about 5, at least about 10 and/or not more than about 50, not more than about 40, not more than about 30 weight percent, based on the total weight of the coating material, of one or more gloss modifiers. The coating material can include gloss modifiers in an amount in the range of from about 1 to about 50 percent, about 1 to about 40 percent, about 1 to about 30 percent, 5 to about 50 percent, about 5 to about 40 percent, about 5 to about 30 percent, 10 to about 50 percent, about 10 to about 40 percent, about 10 to about 30 percent, based on the total weight of the coating material.

Non-limiting examples of suitable inorganic fillers include talc (magnesium silicate), silica, kaolin clay, alumina and calcium carbonate ($CaCO_3$). Examples of polymeric fillers include, but are not limited to, BLENDEX BMAT (a cross-linked styrene acrylonitrile in a polystyrene matrix) available from Chemtura and Galata Chemicals, ECDEL elastomers available from Eastman Chemical Company and PARALOID KM-377 (an acrylate polymer) available from Rohm and Haas and The Dow Chemical Company.

Additionally, in one embodiment, the coating material can further include at least one impact modifier present in the coating material in an amount of at least about 0.5 percent, at least about 1 percent, at least about 2 percent and/or not more than about 20 percent, not more than about 15 percent, not more than about 10 percent, based on the total weight of the coating material. The impact modifier may be present in the coating composition in an amount in the range of from about 0.5 to about 20 percent, about 0.5 to about 15 percent, about 0.5 to about 10 percent, about 1 to about 20 percent, about 1 to about 15 percent, about 1 to about 10 percent, about 2 to about 20 percent, about 2 to about 15 percent, about 2 to about 10 percent, based on the total weight of the coating composition. Non-limiting examples of the at least one impact modifier include polymers based on a polyolefin rubbery segment, sometimes also referred to as a rubbery phase, polymers based on a polyether rubbery phase, polymers based on an acrylic rubbery phase and polymers based on a butadiene and/or isoprene rubbery phase. In an embodiment, the at least one impact modifier is chosen from poly(acrylonitrile butadiene styrene) (ABS) polymers.

In addition, in one embodiment, one or more other application-specific additives could also be used. Such additional additives may include, but are not limited to, gloss modifiers, opacity modifiers, impact modifiers, adhesion modifiers, pigments, flame retardants, UV absorbers, antioxidants, colorants, and optical brighteners. Generally, for polymeric formulations that are to be used as primers, an opaque white coloring is desired. Titanium dioxide a widely used white pigment, but a variety of other metal oxides and salts may be used. The amount of the additive or additives employed in the coating material can vary, and, in one embodiment, can be at least about 0.01 weight percent, at least about 0.5 weight percent, at least about 0.75 weight percent and/or not more than about 5 weigh percent, not more than about 2.5 weight percent, or not more than about 1 weight percent, based on the total weight of the coating composition. The total amount of additives present in said coating composition can be in the range of from about 0.01 to about 5 weight percent, about 0.01 to about 2.5 weight percent, about 0.01 to about 1 weight percent, about 0.5 to about 5 weight percent, about 0.5 to about 2.5 weight percent, about 0.5 to about 1 weight percent, about 0.75 to about 5 weight percent, about 0.75 to about 2.5 weight percent, about 0.75 to about 1 weight percent, based on the total weight of the coating material.

Referring back to FIG. 60, the substrate can initially be introduced into a pretreatment zone 1514, which can comprise one or more stages configured to prepare the substrate for coating. For example, pretreatment zone 1514 can include one or more milling stages for forming an initial blank stock, or precursor, substrate into a substrate having a desired shape by milling and/or cutting the substrate to a desired profile and/or length. In another embodiment, one or more recesses or cavities may also be cut into the precursor substrate to thereby provide a substrate ready for extrusion coating.

Optionally, pretreatment zone 1514 may also comprise at least one cleaning stage for removing particles of dirt, dust, or other debris from the surface of the substrate before coating. The cleaning stage may comprise a high pressure steam cleaning, a high pressure air cleaning, a solvent cleaning, a water bath cleaning, and/or any other cleaning process appropriate for the particular type of substrate employed in coating system 1512. In one embodiment, pretreatment zone 1514 may include a stain bath for staining at least a portion of the substrate prior to coating.

Following pretreatment, the substrate can then be introduced into drying zone 1516, wherein at least a portion of the surface of the substrate may be heated to thereby facilitate removal of at least some of the volatile materials within the substrate, if present. Once removed from drying zone 1516, the substrate can pass through optional staging area 1518 before being introduced into die 1520 via a feed system 1528, which may be configured to properly align the one or more substrates being coated with at least one inlet of die 1520 (not shown).

In one embodiment, feed system 1528 can comprise a plurality of rollers, positioned above and below the substrate (not shown), which are configured to engage and push the substrate or substrates into die 1520. Feed system 1528 may be configured to supply one or more substrates into die 1520 in a substantially continuous manner, such that, for example, the individual substrate members are fed to the die 1520 in a butt-to-butt manner, where contact is maintained between the back end of a first substrate member and the front end of a second substrate member fed behind the first substrate member. According to another embodiment, two substrates may be fed into die 1520 spaced apart from one another and the space between the substrates may be maintained during the coating process.

As the substrate is introduced into die 1520, at least a portion of the surface of the substrate can be contacted with a coating material introduced into die 1520 from coating source 1530. Coating source 1530 can be any suitable system or apparatus for providing a coating, and, in one embodiment, may be an extruder. The temperature in the die 1520 during the coating process can be any temperature sufficient to maintain the incoming coating material in a liquid or substantially liquid state. In one embodiment, the temperature in die 1520 during coating can be at least about 50° C., at least about 100° C., at least about 200° C. and/or not more than about 500° C., not more than about 400° C., not more than about 300° C., or in the range of from about 50 to about 500° C., about 50 to about 400° C., about 50 to about 300° C., about 100 to about 500° C., about 100 to about 400° C., about 100 to about 300° C., about 200 to about 500° C., about 200 to about 400° C., about 200 to about 300° C. The pressure in die 1520 during the coating step can be at least about 25 pounds per square inch (psi), at least about 50 psi, at least about 100 psi and/or not more than about 5,000 psi, not more than about 3,500 psi, not more than about 2,000 psi, not more than about 1,500 psi, not more than 1,000 psi, or in the range of from about 25 to about 5,000 psi, about 25 to about 3,500 psi, about 25 to about 2,000 psi, about 25 to about 1,500 psi, or about 25 to about 1,000 psi, about 50 to about 5,000 psi, about 50 to about 3,500 psi, about 50 to about 2,000 psi, about 50 to about 1,500 psi, or about 50 to about 1,000 psi, about 100 to about 5,000 psi, about 100 to about 3,500 psi, about 100 to about 2,000 psi, about 100 to about 1,500 psi, or about 100 to about 1,000 psi.

The coating may be applied to at least a portion, or substantially all, of the surface of the substrate such that at least about 50 percent, at least about 65 percent, at least about 75 percent, at least about 85 percent, or at least about 95 percent of the total surface area of substrate is covered with a coating material. Thus, in one embodiment, one or more sides of an n sided substrate (wherein n is an integer between 3 and 10, inclusive) may be left partially or totally uncoated, such that n−1 sides are completely coated by the material. In another embodiment, the entirety of the outer surface of the substrate may be coated such that all sides of the substrate are completely encapsulated by the coating material. The average thickness of the coating material may be in the ranges discussed previously.

When the substrate includes a structural recess and/or a structural protrusion as discussed previously, the extrusion coating step carried out in die 1520 may include applying at least one coating material to one or more surfaces presented by the structural recess and/or the structural protrusion, thereby forming the recess attachment or protrusion attachment surfaces described above. In one embodiment, when the substrate includes a structural recess, the coating material extruded onto the recess surface may be sufficient to at least partially fill the structural recess with coating material. For example, in one embodiment, the maximum thickness of the coating material within the structural recess may be at least 2 times greater than the thickness of the coating material forming the near recess external surface of the extrusion-coated structural member.

In one embodiment, a second coating material may be applied to at least a portion of the substrate, including at least one recess and/or protrusion surface, either by extrusion coating or any other suitable method. In one embodiment, the first and second coating materials can be applied in an alternating or "striped" pattern, while, in another embodiment, at least a portion of one of the coating materials may overlap or be layered with the other. According to one embodiment, the second coating material may also be applied to the substrate by extrusion coating, simultaneous with, or subsequent to, application of the first coating material.

Referring back to FIG. 60, the extrusion coated structural member exiting die 1520 may be routed to a cooling or quench zone 1522, wherein the extrusion-coated structural member can be cooled via contact with a cooling fluid. In one embodiment, the cooling performed in cooling or quench zone 1522 may be sufficient to reduce the surface temperature of the coated substrate by at least about 5° C., at least about 10° C., at least about 15° C., at least about 20° C., at least about 25° C., or at least about 30° C. Examples of suitable cooling fluids can include air, an inert gas, and/or water and quench zone 1522 may or may not have a pressure greater than atmospheric. Subsequent to quench zone 1522, the cooled extrusion-coated structural member can be optionally sent to a post-treatment zone 1524, wherein one or more additional processing and/or treatment steps may be carried out. In one embodiment, post-treatment zone 1524 can employ one or more processes to alter at least one property of the extrusion-coated structural member and may also include other post-coating treatments such as milling, cutting, or even assembling and/or packaging.

According to one embodiment of the present invention, structural members as described herein may exhibit enhanced properties or characteristics as compared to similarly-configured, but uncoated or conventionally-coated (e.g., painted), substrates. For example, in some cases, application of one or more coating materials as described herein to a substrate that comprises at least one protrusion may result in a structural member having increased strength and/or durability, and which may be less likely to crack or fail during use.

Figure 63:
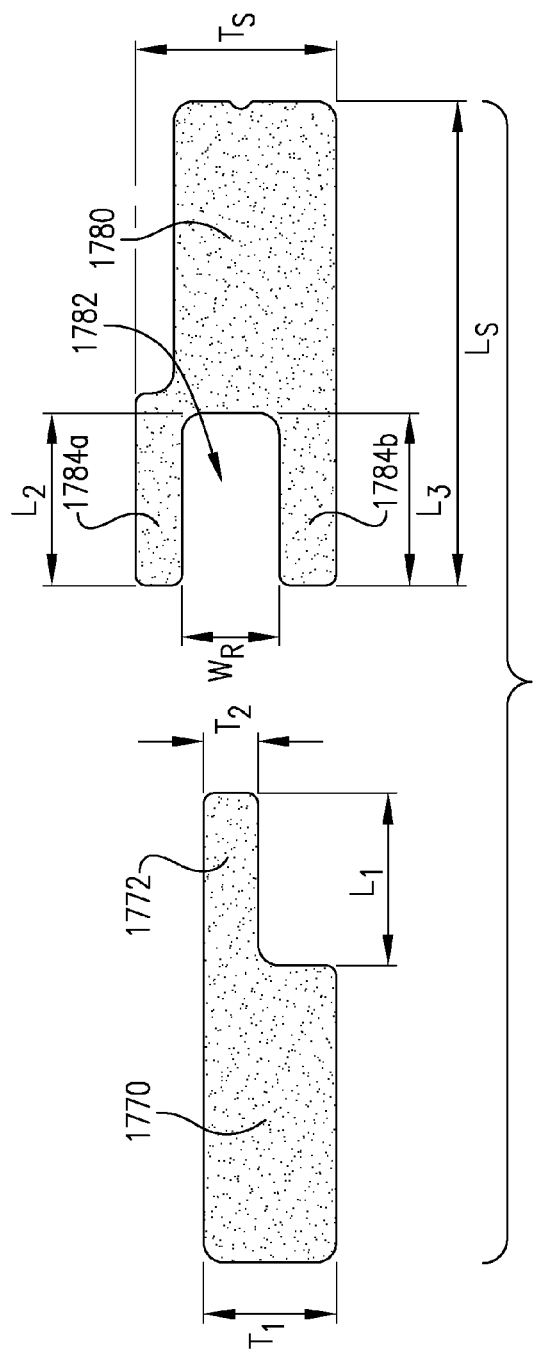
FIG. 63 is a schematic cross-sectional view of the substrate components of the extrusion-coated structural members depicted in FIGS. 61 and 62, depicted without coating material.

Turning now to FIGS. 61-63, one example of a structural system 1750 that includes a pair of structural members 1752 and 1762 configured according to an embodiment of the present invention is provided. Although illustrated in FIGS. 61-63 as including only a first structural member 1752 and a second structural member 1762, it should be understood that structural system 1750 can include any suitable number of structural members, including, for example, at least about 2 structural members, at least about 5 structural members, at least about 10 structural members, and/or not more than about 100 structural members, not more than about 75 structural members, not more than about 50 structural members, or not more than about 30 structural members. When more than two structural members are employed in structural system 1750, one or both of structural members 1752 and 1762 may have additional protrusions and/or recesses configured to be inserted into one or more other recesses and/or configured to receive one or more other protrusions of the other structural members, not shown in FIGS. 61-63.

Additionally, although represented being configured similarly to structural system 1650 depicted in FIGS. 22 and 23, it should also be understood that enhanced properties as described in further detail below may also be present in a variety of other structural systems configured according to aspects of the present invention, including one or more of the structural systems described in detail previously.

Turning again to FIGS. 61 and 62, each of structural members 1752 and 1762 comprise a substrate 1754 and 1764 and a coating material 1756 and 1766 coated onto at least a portion of respective substrates 1754 and 1764. Although shown as being applied to all or nearly all of the surface area of substrates 1754 and 1764, coating materials 1756 and/or 1766 may, in some embodiments, coat only a portion of the surface area of respective substrates 1754 and 1764.

In one embodiment, coating materials 1756 and/or 1766 may be applied to (coated onto) at least about 50 percent, at least about 60 percent, at least about 70 percent, at least about 80 percent, at least about 90 percent, at least about 95 percent, or at least about 99 percent of the total surface area of substrates 1754 and/or 1764. Coating materials 1756 and/or 1766 may extend continuously around at least three, at least four, or all sides of at least one cross-section of substrates 1754 and/or 1764. In some cases, all or nearly all of the surface area of substrates 1754 and/or 1764 may be coated so that, for example, less than about 10 percent, less than about 5 percent, less than about 2 percent, less than about 1 percent of the total surface area of substrates 1754 and/or 1764 is not coated with the coating material.

Coating materials 1756 and 1766 can be applied to respective first and second substrates 1754 and 1764 according to any suitable method. In one embodiment, at least one of structural members 1752 and 1762 can be extrusion-coated structural members and at least a portion of coating materials 1756 and 1766 can be extrusion coated onto one or more surfaces of substrates 1754 and 1764. According to another embodiment, coating materials 1756 and 1766 may be applied to substrates 1754 and 1764 in another manner, such as, for example, by injection molding, curtain coating, or other suitable method. The average thickness of coating material 1756 and/or 1766 applied to respective substrates 1754 and/or 1764 may lie within the ranges described in detail previously.

Coating materials 1756 and 1766 can comprise any of the coating materials described in detail previously. Coating material 1756 applied to substrates 1754 may be the same as, or different than, coating material 1766 applied to substrate 1764. In one embodiment, coating materials 1756 and/or 1766 can comprise at least one resin, which may be a thermoplastic or thermosetting resin. Exemplary resins include, but are not limited to, those selected from the group consisting of polyesters, acrylics, cellulose esters, nylons, polyolefins, polyvinyl chloride, acrylonitrile-butadiene-styrene (ABS) copolymers, styrene-acrylonitrile copolymers (SAN), other styrene-based polymers and copolymers, polycarbonates, and combinations thereof. In addition to one or more of the resins listed above, coating material 1756 and/or 1766 can further include at least one other additive of the type and/or in the amount described in detail previously.

Substrates 1754 and 1764 can comprise any suitable material, including one or more of the materials described in detail previously. Substrates 1754 and/or 1764 can be formed of the same material or may be formed of different materials, and any additional structural members (not shown in FIGS. 61 and 62) may also comprise the same or a different material than substrates 1754 and/or 1764. Additionally, one or both of substrates 1754 and/or 1764 may be formed of two or more different materials. In one embodiment, the average density of substrates 1754 and/or 1764 can be at least about 30 lb/ft³, at least about 35 lb/ft³, at least about 40 lb/ft³, at least about 45 lb/ft³ and/or not more than about 65 lb/ft³, not more than about 60 lb/ft³, not more than about 55 lb/ft³, not more than about 50 lb/ft³.

In one embodiment, substrates 1754 and/or 1764 can comprise a non-natural wood material. As used herein, the term "non-natural wood material" refers to any material that includes at least one component other than natural wood. Examples of components other than natural wood can include, but are not limited to, binders, adhesives, plastics, and other materials. Some non-natural wood substrates may include a wood composite (or engineered wood) material that comprises smaller bodies of wood bound together by adhesive, plastic, or other binder material. Specific examples of wood composite materials include, but are not limited to, medium density fiber board (MDF), high density fiberboard (HDF), particle board, oriented strand board (OSB), wood-filled plastic, wood-plastic composites, ultra-light density fiber board (LFB), plywood, and combinations thereof. Other types of non-natural wood materials may not include wood fibers and may, for example, be selected from the group consisting of plastics, glass, metals, foams, fiberglass-reinforced thermoset or thermoplastic polymers, and combinations thereof.

Substrates 1754 and 1764 may comprise a material selected from the group consisting of wood composites, plastics, foams, glass, fiberglass-reinforced thermoset or thermoplastic polymers, metal, and combinations thereof or substrates 1754 and/or 1764 may comprise a material selected from the group consisting of wood composites, plastics, foams, fiberglass-reinforced thermoset or thermoplastic polymers, and combinations thereof. Substrates 1754 and/or 1764 may also comprise a material selected from the group consisting of medium density fiber board (MDF), high density fiberboard (HDF), particle board, oriented strand board (OSB), wood-filled plastic, wood-plastic composites, ultra-light density fiber board (LFB), plywood, plastic, fiberglass-reinforced thermoset or thermoplastic polymers, foam, cellularized PVC, and combinations thereof.

As shown in one embodiment depicted in FIGS. 61-63, substrate 1754 includes a main body portion 1770 and at least one protrusion 1772 extending outwardly from main body portion 1770. Although shown as including only one protrusion, it should be understood that substrate 1754 may include any suitable number of protrusions, depending on the specific configuration and end use of structural member 1752 and/or structural system 1750. When substrate 1754 includes more than one protrusion, additional protrusions may be located on the same side, or one a different side, of main body portion 1770 than protrusion 1772 shown in FIG. 61-63.

In one embodiment, the ratio of the maximum thickness of main body portion 1770, shown as dimension $T_1$ in FIG. 63, to the maximum thickness of protrusion 1772, shown as dimension $T_2$ in FIG. 63, can be at least about 1.25:1, at least about 1.5:1, at least about 1.75:1 and/or not more than about 5:1, not more than about 3:1, not more than about 2.5:1, not more than about 2:1. The ratio of the maximum thickness of main body portion 1770 to the maximum thickness of protrusion 1772 ($T_1$:$T_2$) can be in the range of from about 1.25:1 to about 5:1, about 1.25:1 to about 3:1, about 1.25:1 to about 2.5:1, about 1.25:1 to about 2:1, about 1.5:1 to about 5:1, about 1.5:1 to about 3:1, about 1.5:1 to about 2.5:1, about 1.5:1 to about 2:1, about 1.75:1 to about 5:1, about 1.75:1 to about 3:1, about 1.75:1 to about 2.5:1, about 1.75:1 to about 2:1.

The maximum thickness of main body portion 1770 can at least about 0.10 inches, at least about 0.50 inches, at least about 0.75 inches, at least about 1 inch and/or not more than about 3 inches, not more than about 2.5 inches, not more than about 2 inches, not more than about 1.5 inches and/or the maximum thickness of protrusion 1772 can be at least about 0.10 inches, at least about 0.50 inches, at least about 0.75 inches, and/or not more than about 2.5 inches, not more than about 2 inches, not more than about 1.5 inches. Main body portion 1770 can have a maximum thickness in the range of from about 0.10 to about 3 inches, about 0.10 to about 2.5 inches, about 0.10 to about 2 inches, about 0.10 to about 1.5 inches, about 0.50 to about 3 inches, about 0.50 to about 2.5 inches, about 0.50 to about 2 inches, about 0.50 to about 1.5 inches, about 0.75 to about 3 inches, about 0.75 to about 2.5 inches, about 0.75 to about 2 inches, about 0.75 to about 1.5 inches, about 1 to about 3 inches, about 1 to about 2.5 inches, about 1 to about 2 inches, about 1 to about 1.5 inches and/or protrusion 1772 can have a maximum thickness in the range of from about 0.10 to about 2.5 inches, about 0.10 to about 2 inches, about 0.10 to about 1.5 inches, about 0.50 to about 2.5 inches, about 0.50 to about 2 inches, about 0.50 to about 1.5 inches, about 0.75 to about 2.5 inches, about 0.75 to about 2 inches, about 0.75 to about 1.5 inches.

In one embodiment, protrusion 1772 can extend outwardly from main body portion 1770 for a maximum distance, shown as $L_1$ in FIG. 63, for a distance of at least about 0.10 inches, at least about 0.25 inches, at least about 0.50 inches, at least about 1 inch, at least about 1.5 inches and/or not more than about 5 inches, not more than about 3 inches, not more than about 2.5 inches, not more than about 2 inches, or in the range of from about 0.10 to about 5 inches, about 0.10 to about 3 inches, about 0.10 to about 2.5 inches, about 0.10 to about 2 inches, about 0.25 to about 5 inches, about 0.25 to about 3 inches, about 0.25 to about 2.5 inches, about 0.25 to about 2 inches, about 0.50 to about 5 inches, about 0.50 to about 3 inches, about 0.50 to about 2.5 inches, about 0.50 to about 2 inches, about 1 to about 5 inches, about 1 to about 3 inches, about 1 to about 2.5 inches, about 1 to about 2 inches, about 1.5 to about 5 inches, about 1.5 to about 3 inches, about 1.5 to about 2.5 inches, about 1.5 to about 2 inches.

The ratio of the maximum distance that protrusion 1772 extends outwardly from main body portion 1770 ($L_1$) to the maximum thickness of protrusion 1772 ($T_2$) can be at least about 0.10:1, at least about 0.50:1, at least about 1:1, at least about 1.1:1, at least about 1.25:1, at least about 1.5:1 and/or not more than about 5:1, not more than about 3:1, not more than about 2.5:1, not more than about 2:1. The ratio of the maximum distance that protrusion 1772 extends outwardly from main body portion 1770 to the maximum thickness of protrusion 1772 ($L_1:T_2$) can be in the range of from about 0.10:1 to about 5:1, about 0.10:1 to about 3:1, about 0.10:1 to about 2.5:1, about 0.10:1 to about 2:1, about 0.50:1 to about 5:1, about 0.50:1 to about 3:1, about 0.50:1 to about 2.5:1, about 0.50:1 to about 2:1, about 1:1 to about 5:1, about 1:1 to about 3:1, about 1:1 to about 2.5:1, about 1:1 to about 2:1, about 1.1:1 to about 5:1, about 1.1:1 to about 3:1, about 1.1:1 to about 2.5:1, about 1.1:1 to about 2:1, about 1.25:1 to about 5:1, about 1.25:1 to about 3:1, about 1.25:1 to about 2.5:1, about 1.25:1 to about 2:1.

The ratio of the maximum distance that protrusion 1772 extends outwardly from main body portion 1770 ($L_1$) to the maximum thickness of main body portion ($T_1$) can be at least about 0.05:1, at least about 0.10:1, at least about 0.25:1, at least about 0.50:1, at least about 0.75:1 and/or not more than 3:1, not more than about 2.5:1, not more than about 2:1, not more than about 1.5:1, or in the range of from about 0.05:1 to about 3:1, about 0.05:1 to about 2.5:1, about 0.05:1 to about 2:1, about 0.05:1 to about 1.5:1, about 0.10:1 to about 3:1, about 0.10:1 to about 2.5:1, about 0.10:1 to about 2:1, about 0.10:1 to about 1.5:1, about 0.25:1 to about 3:1, about 0.25:1 to about 2.5:1, about 0.25:1 to about 2:1, about 0.25:1 to about 1.5:1, about 0.50:1 to about 3:1, about 0.50:1 to about 2.5:1, about 0.50:1 to about 2:1, about 0.50:1 to about 1.5:1, about 0.75:1 to about 3:1, about 0.75:1 to about 2.5:1, about 0.75:1 to about 2:1, about 0.75:1 to about 1.5:1.

As shown in FIGS. 61-63, second structural member 1762 may also include a main body portion 1780 and at least one protrusion 1784a extending outwardly from main body portion 1780. According to one embodiment shown in FIGS. 61-63, second structural member 1762 may also comprise a second protrusion 1784b also extending outwardly from main body portion 1780. Each of the dimensions and ratios discussed previously with respect to main body portion 1770 and protrusion 1772 of first structural member 1752 may also be applicable to main body portion 1780 and at least one of protrusions 1784a and/or 1784b of substrate 1764.

Although shown as extending from main body portion 1780 for similar maximum distances, shown as $L_2$ for protrusion 1784a and $L_3$ for protrusion 1784b in FIG. 63, one of the pair of protrusions 1784a,b may extend outwardly from main body portion 1780 for a different distance than the other. In one embodiment, the ratio of the maximum distance that protrusion 1784a extends outwardly from main body portion 1780 ($L_2$) to the maximum distance that protrusion 1784b extends outwardly from main body portion 1780 ($L_3$) can be at least about 0.5:1, at least about 0.60:1, at least about 0.75:1, at least about 0.85:1, at least about 0.95:1 and/or not more than about 0.99:1, not more than about 0.95:1, not more than about 0.85:1, not more than about 0.75:1. Alternatively, the ratio of $L_2$ to $L_3$ can be 1:1, as generally shown in FIG. 63.

In one embodiment, the pair of protrusions 1784a and 1784b extending outwardly from main body portion 1780 of substrate 1764 may at least partially define at least one recess 1782. Recess 1782 can have any suitable dimensions and, in one embodiment, can be configured to receive a protrusion (such as protrusion 1772 of substrate 1754) to couple structural members 1752 and 1762 to one another. Thus, in one embodiment, the width of recess 1782, shown as dimension $W_R$ in FIG. 63, can be sufficient to permit protrusion 1772, having a maximum thickness $T_2$ to be inserted, or at least partially inserted, therein. In one embodiment, the ratio of the maximum thickness of protrusion 1772 to the width of recess 1782 can be at least about 0.75:1, at least about 0.85:1, at least about 0.95:1 and/or not more than 0.99:1, not more than about 0.95:1, not more than about 0.90:1, or in the range of from about 0.75:1 to about 0.99:1, about 0.75:1 to about 0.95:1, about 0.75:1 to about 0.90:1, about 0.85:1 to about 0.99:1, about 0.85:1 to about 0.95:1, about 0.85:1 to about 0.90:1, about 0.90:1 to about 0.99:1, about 0.90:1 to about 0.95:1.

The width of recess 1782 can be at least about 0.10 inches, at least about 0.50 inches, at least about 0.75 inches, and/or not more than about 2.5 inches, not more than about 2 inches, not more than about 1.5 inches, or can be in the range of from about 0.10 to about 2.5 inches, about 0.10 to about 2 inches, about 0.10 to about 1.5 inches, about 0.50 to about 2.5 inches, about 0.50 to about 2 inches, about 0.50 to about 1.5 inches, about 0.75 to about 2.5 inches, about 0.75 to about 2 inches, about 0.75 to about 1.5 inches. The ratio of the width of recess 1782 to the maximum distance of the longer of protrusions 1784a and 1784b (i.e., the greater of $L_2$ and $L_3$) can be at least about 0.25:1, at least about 0.5:1, at least about 1:1, and/or not more than about 3:1, not more than about 2.5:1, not more than about 2:1, or about 0.25:1 to about 3:1, about 0.25:1 to about 2.5:1, about 0.25:1 to about 2;1, or about 0.5:1 to about 3:1, about 0.5:1 to about 2.5:1, about 0.5:1 to about 2;1, or about 1:1 to about 3:1, about 1:1 to about 2.5:1, about 1:1 to about 2;1.

Although shown as including a pair of protrusions 1784a, b, it should be understood that substrate 1764 may include any suitable number of additional protrusions, depending on the specific configuration and end use of structural member 1762 and/or structural system 1750. When substrate 1764 includes additional protrusions, one or more additional recesses may also be defined. For example, substrate 1764 (and/or substrate 1754) may include N protrusions extending outwardly from main body portion 1780 (or main body portion 1770), wherein N is an integer between 1 and 10, between 2 and 8, or between 2 and 5. In another embodiment, N can be 1. When substrate 1764 and/or 1754 includes N protrusions, it may also comprise or define N−1 recesses between the N protrusions. In some cases, one or more of the protrusions may be disposed on opposite sides of main body portion 1780 and/or 1770, thereby resulting in (N−2) or (N−3) recesses, depending on the specific configuration of structural member 1762 or 1752.

As particularly shown in FIG. 62, main body portion 1770 of substrate 1754 can present at least one body surface 1773 and protrusion 1772 of substrate 1754 can present at least one protrusion surface 1775, which intersect to form a junction 1774 disposed between main body portion 1770 and protrusion 1772. Similarly, main body portion 1780 of substrate 1764 can present at least one body surface 1789 and each of protrusions 1784a and 1784b can respectively present at least one protrusion surface 1787a and 1787b, which each intersect with body surface 1789 to form a pair of junctions 1788a and 1788b. Additionally, main body portion 1780 can present another body surface 1783 and at least one of protrusions 1784a and 1784 b (shown in FIG. 62 as being protrusion 1784a) can present another protrusion surface 1785 with can intersect with body surface 1783 to form another junction 1786. Alternatively, body surface 1783 and protrusion surface 1785 may lie in substantially the same plane, thereby making junction 1786 substantially planar.

In one embodiment, it may be advantageous for at least a portion of coating material 1756 applied to substrate 1754 and/or at least a portion of coating material 1766 applied to substrate 1764 to at least partially cover at least one of junctions 1774 of substrate 1754, and/or one or more of junctions 1788a, 1788b, or 1786 of substrate 1764. Two or more, three or more, or all of junctions 1774, 1786, 1788a, and 1788b may be at least partially coated with coating material 1756 and/or coating material 1766 such that at least a portion of the coating material 1756 and/or 1766 extends continuously between at least a portion of adjacent protrusion and body surfaces. For example, when junction 1744 is at least partially coated with coating material 1756, at least a portion of coating material 1756 can extend continuously between protrusion surface 1775 and body surface 1773. Similarly, when junction 1786 is at least partially coated with coating material 1766, at least a portion of coating material 1766 may extend continuously between protrusion surface 1785 and body surface 1783. Alternatively, at least one of junctions 1774, 1788a, 1788b, and 1786 may not be coated with a coating material (embodiment not shown in FIGS. 61 and 62.)

According to one embodiment of the present invention, application of coating material to all or part of one or more junctions 1774, 1788a, 1788b, and 1786 may increase the peak stress achievable by structural member 1752 and/or 1762, even when the structural member is made from a non-wood substrate as described above. In one embodiment, structural member 1752 and/or 1762 may exhibit enhanced peak stress tolerances, measured by, for example, the peak stress increase as compared to an identically-configured, but uncoated substrate. For example, in one embodiment, structural member 1752 and/or 1762 may exhibit a peak stress increase, measured at the outer edge of protrusion 1772 and/or 1784a or b, of at least about 50 percent, at least about 75 percent, at least about 90 percent, at least about 100 percent, at least about 125 percent, at least about 150 percent, measured along the outer edge of the protrusion (i.e., measured in the outer configuration as shown in FIG. 65c), as compared to an identically-configured but uncoated substrate. The method for determining the peak stress increase of a coated substrate is described in Example 3, below.

As discussed previously, extrusion-coated structural systems of the present invention have a wide variety of applications including, for example, as furniture or cabinetry items and/or in several indoor and outdoor construction and building end uses. In one embodiment, one or more extrusion-coated structural systems described herein may be used in cabinetry applications as doors, side walls, drawers, cabinet boxes, and other similar components, and may be used in furniture applications as shelves, tables, desks, drawers, cabinets, chairs, and the like. Specific construction uses can include, but are not limited to, wall board, floor board, trim, door jambs or casing, window jambs or casing, crown molding, chair railing, frames, mantels, accent boxes, and the like.

The various aspects of the present invention can be further illustrated and described by the following Examples. It should be understood, however, that these Examples is included merely for purposes of illustration and is not intended to limit the scope of the invention, unless otherwise specifically indicated.

EXAMPLES

Example 1

Measurement of Screw Withdrawal Force from Reinforced Recess

Three samples each of five different substrates, including four types of particle board with ANSI grades M-0, M-1, M-S, and M-2, and medium density fiberboard were assembled. One sample of each of the five types of substrates was coated with EASTMAN™ CS10-1201IF white resin commercially available from Eastman Chemical Company (Tennessee, USA) to an average coating thickness of approximately 0.012 inches.

The screw withdrawal force required to remove a one-inch, #10 type AB screw from the each of the uncoated and coated samples for each type of substrate was measured according to ASTM D1037, Section 16. The lead hole diameter was 0.125 inches and the screw penetration depth was 0.667 inches. The results are summarized in Table 2, below.

TABLE 1

Results of Screw Withdrawal Force Testing

| Sample | Coated, $lb_f$ | Uncoated, $lb_f$ |
| --- | --- | --- |
| ANSI M-0 | 258 | 273 |
| ANSI M-1 | 239 | 214 |
| ANSI M-S | 261 | 266 |
| ANSI M-2 | 328 | 362 |

Another sample of MDF was obtained and a channel measuring approximately 0.75 by 0.375 inches was cut into center portion of the substrate. The channeled substrate was then coated with the coating material described in Table 1, and the average screw withdrawal force for a screw inserted into the central portion of the coated channel was measured as described above. Table 2, below, summarizes the results for the screw withdrawal force test for the coated MDF samples with and without a channel over several runs.

TABLE 2

Screw Withdrawal Force for MDF With and Without Channel

| Run | MDF Without Channel Withdrawal Force, $lb_f$ | MDF With Channel Withdrawal Force, $lb_f$ |
|---|---|---|
| 1 | 263 | 478 |
| 2 | 286 | 532 |
| Average | 275 | 505 |

Example 2

Preparation of Substrates for Strength Testing

Several substrates each having cross-sectional shapes similar to the split jamb substrate 1764 illustrated in FIGS. 61-63 were formed using medium density fiberboard (MDF) with an average a density between 42 and 51 lb/ft³. The fiber board, which is commercially available from Langboard, Inc. (Georgia, USA), was formed into 18 individual substrates, each having a nominal length, designated as $L_s$ in FIG. 63, of about 3 inches and a nominal thickness, shown as dimension $T_s$ in FIG. 63, of about 0.35 to about 0.37 inches. Additionally, six other substrates having a similar cross-sectional shape were also formed using finger-jointed pine (FJP) with the same nominal dimensions. The exact dimensions of each of these substrate are provided in Table 3, below.

Three of the MDF substrates and three FJP substrates, respectively labeled CO-1 through CO-3 and CO-4 through CO-6 in Table 4 below, were retained as controls and were not coated. The remaining MDF and FJP substrates were divided first by material and then into groups of three and were coated, in triplicate, with several different coatings. A latex paint, commercially available as BEHR Ultra Pure White 3050 Interior Semi-Gloss Enamel from Behr Process Corporation, was used to as a comparative coating material and was used to coat three of the MDF substrates to an average thickness of 9 mils (e.g., Substrates C-1 through C-3) and three others to an average thickness of 12 mils (e.g., Substrates C-4 through C-6).

The remaining MDF substrates, labeled I-1 through I-9 in Table 4, and the three FJP substrates, labeled I-10 through I-12 in Table 4, were coated with one of two resin-containing coating materials using an extrusion coating process as described below. The first resin-containing coating material (Coating A) was EASTMAN™ CS10-1201IF white resin commercially available from Eastman Chemical Company, and the second resin-containing coating material (Coating B) was an impact-modified acrylic polymer, OPTIX CA 1000E-2, commercially available from Plaskolite, Inc. Coating A was applied to six of the MDF substrates (e.g., Substrates I-1 through I-6) and three of the FJP substrates (e.g., Substrates I-10 through I-12), and Coating B was applied to the remaining three MDF substrates (e.g., Substrates I-7 through I-9). Average thicknesses of the coatings applied to each of Substrates I-1 through I-12 are summarized in Table 4 below.

After being preheated in an oven and held in a staging area, Substrates I-1 through I-12 were individually passed through a die assembly that included a die outlet conforming to the cross-sectional shape of each of Substrates I-1 through I-12. Coating A was fed through a 2½ inch extruder during the coating of Substrates I-1 through I-6 and I-9 thorough I-12, and Coating B was similarly applied to Substrates I-7 through I-9. During application of Coating A to Substrates I-1 through I-6 and I-9 through I-12, the melt temperature was held at 500° F., while the melt temperature of Coating B applied to Substrates I-7 through I-9 was maintained at 550° F. In both cases, the die temperature was the same as the melt temperature, and the melt pressure was between 400 and 900 psi. Upon removal from the die assembly, each of the substrates was allowed to cool. Substrates I-1 through I-3 had an average coating thickness of 16 mils, while the average coating thickness of Substrates I-4 through I-6 was 23 mils. Substrates I-7 through I-9 had an average coating thickness of 25 mils, and Substrates I-10 through I-12 had an average coating thickness of about 11 mils.

Figure 64:
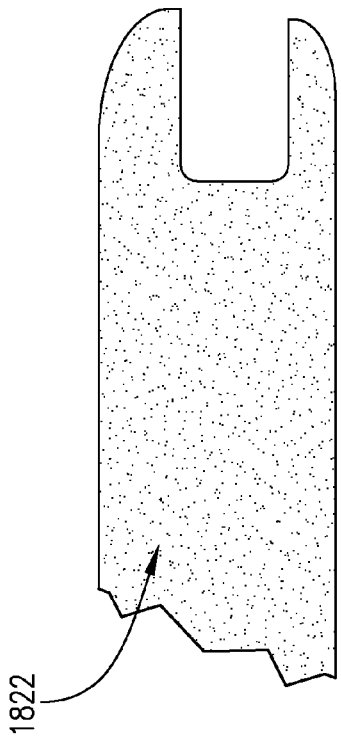
FIG. 64 is a schematic cross-sectional view of one embodiment of a substrate subjected to strength testing as described in Example 3.

Four additional samples were prepared, each having a substrate shaped similarly to substrate 1822 shown in FIG. 64. Each of these samples, which was formed from high density fiberboard having an average density between 51 and 62 lb/ft³. Each of substrate had a nominal length of 3 inches and a nominal thickness of 0.1 inches. The exact dimensions of each sample are provided in Table 4, below.

One of the substrates, labeled CO-7 in Table 4, was retained as a control and was left uncoated. Substrate C-7 was painted with the BEHR Ultra White latex paint as described previously and, upon drying, had an average paint thickness of 5 mils. The remaining two substrates, I-13 and I-14, were extrusion coated with respective Coatings A and B, as described previously. Both substrates had an average coating thickness of 11 mils.

Each of the Substrates CO-1 through CO-7, C-1 through C-7, and I-1 through I-14 were then subjected to strength testing as described in Example 3, below.

Example 3

Strength Testing of Coated and Uncoated Substrates

Each of the substrates prepared in Example 2 above were separately subjected to a strength test to determine the peak (maximum) load (in pounds-force) and peak (maximum) stress (in pounds per square inch) achievable by each substrate, according to the following method.

Figure 65A:
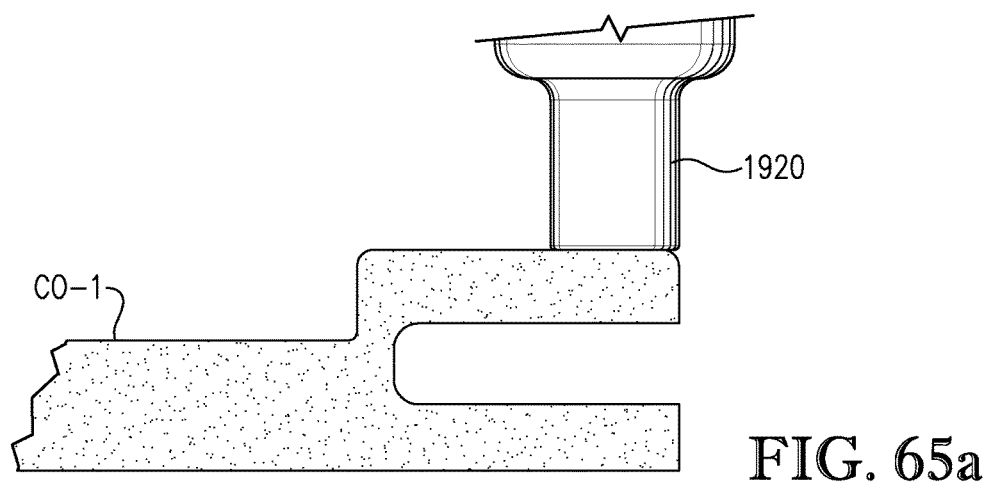
FIG. 65*a* is a side view of the flush configuration used to strength test a substrate as described in Example 3.
Figure 65B:
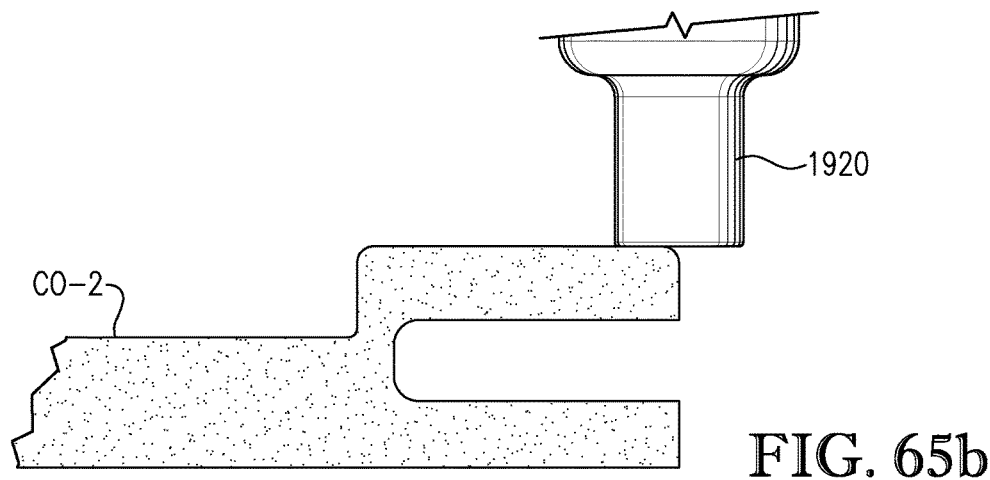
FIG. 65*b* is a side view of the half configuration used to strength test a substrate as described in Example 3.
Figure 65C:
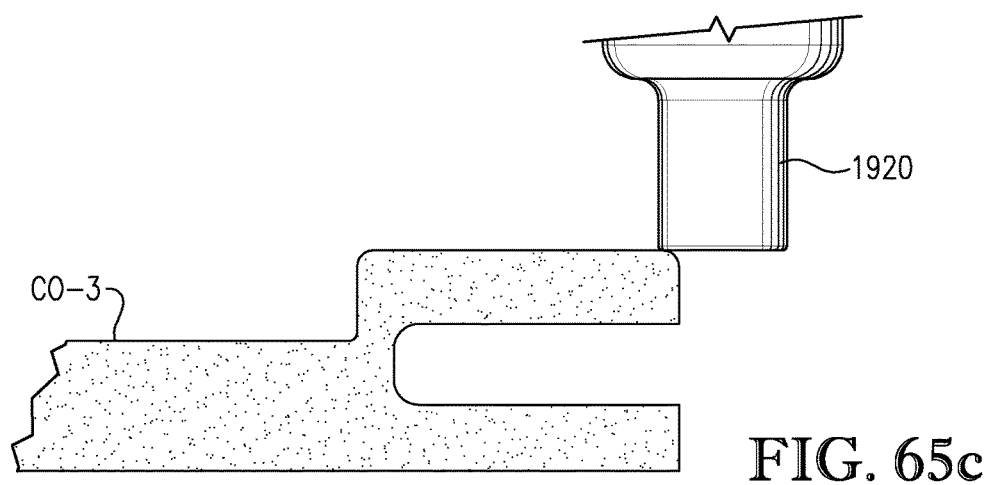
FIG. 65*c* is a side view of the outer configuration used to strength test a substrate as described in Example 3.

Control Substrate CO-1 was placed in a 50 kN MTS Insight material testing frame having a 0.629-inch diameter compression probe, shown as probe 1920 in FIGS. 65*a-c*. The first control Substrate CO-1 was arranged in a "flush" position such that the outer edge of the compression probe 1920 was parallel with the outer edge of the substrate CO-1, as shown in FIG. 65*a* and compression of the substrate was then initiated at a speed of 0.20 inches per minute. During compression, the load (force) and pressure applied to the substrate via compression probe 1920 was measured and recorded using the MTS Simplified Compression Method run using the TestWorks software package (commercially available from MTS Systems Corporation, Eden Prairie, Minn.).

Compression of the substrate was continued until the substrate broke or cracked and the maximum load and pressure achieved just prior to breakage were recorded as the peak load and pressure. Tests were conducted in a similar manner with the two other uncoated substrates, CO-2 and CO-3, except the position of compression probe 1920 was varied. As shown in FIG. 65*b*, Substrate CO-2 was tested with the probe 1920 in a "half" position, such that the mid-line of the probe was resting on the outer edge of Substrate CO-2, while Substrate CO-3 was tested in an "outer" position, such that the other edge of probe 1920 is parallel to Substrate CO-3, as shown in FIG. 65c. Results for the peak load and peak stress for each of Substrates CO-1 through CO-3 are summarized in Table 4, below.

Similar strength tests were carried out on Substrates CO-4 through CO-6 (uncoated FJP), Substrates C-1 through C-3 (9 mil thick paint on MDF), Substrates C-4 through C-6 (12 mil thick paint on MDF), Substrates I-1 through I-3 (16 mil thick Coating A on MDF), Substrates I-4 through I-6 (23 mil thick Coating B on MDF), Substrates I-7 through I-9 (25 mil thick Coating B on MDF), and Substrates I-10 through I-12 (11 mil thick Coating A on FJP).

One substrate from each group (Substrates C-1, C-4, I-1, I-4, I-7, and I-10) was tested in a flush position, one substrate from each group (e.g., Substrates C-2, C-5, I-2, I-5, I-8, and I-11) was tested in a half position, and one substrate from each group (e.g., Substrates C-3, C-6, I-3, I-6, I-9, and I-12) was tested in an outer position. In addition to measuring the peak load and peak stress for each painted or coated substrate, increase in peak stress, as compared to the uncoated substrate tested in the same position (i.e., flush, half, or outer), was also calculated according to the following formula: (Peak Stress Coated Substrate—Peak Stress of Uncoated Substrate)/(Peak Stress (psi) of Uncoated Substrate), expressed as a percentage. Values for peak load, peak stress, and peak stress increase, measured in the flush, half, and outer positions, for each of the coated substrates C-1 through C-6 and I-1 through I-12 are provided in Table 4, below.

TABLE 4

Strength Test Results for Several Substrates

| Substrate | Coating Material | Coating Type | Coating Thickness (mils) | Test Configuration | Substrate Dimension Overall Length (inches) | Substrate Dimension Protrusion Thickness (inches) | Peak Load (lb$_f$) | Peak Stress (psi) | Peak Stress Increase (%) | Functional Part? |
|---|---|---|---|---|---|---|---|---|---|---|
| CO-1 | MDF | None | — | Flush | 2.966 | 0.351 | 10.51 | 10.06 | — | N |
| CO-4 | FJP | None | — | Flush | 2.958 | 0.340 | 33.892 | 33.620 | — | — |
| C-1 | MDF | Paint | 9 | Flush | 2.989 | 0.361 | 12.70 | 11.78 | 17 | N |
| C-4 | MDF | Paint | 12 | Flush | 2.998 | 0.363 | 14.83 | 13.62 | 35 | N |
| I-7 | MDF | Coating B | 25 | Flush | 2.960 | 0.373 | 28.12 | 25.48 | 153 | Y |
| I-1 | MDF | Coating A | 16 | Flush | 3.030 | 0.374 | 33.99 | 29.98 | 198 | Y |
| I-4 | MDF | Coating A | 23 | Flush | 2.978 | 0.374 | 29.42 | 26.48 | 163 | Y |
| I-10 | FJP | Coating A | 11 | Flush | 2.986 | 0.379 | 57.994 | 51.260 | 57 | — |
| CO-2 | MDF | None | — | Half | 2.918 | 0.351 | 6.588 | 6.48 | — | N |
| CO-5 | FJP | None | — | Half | 2.918 | 0.341 | 17.776 | 17.840 | — | — |
| C-2 | MDF | Paint | 9 | Half | 2.994 | 0.360 | 7.280 | 6.78 | 5 | N |
| C-5 | MDF | Paint | 12 | Half | 3.012 | 0.360 | 7.990 | 7.360 | 14 | Y |
| I-8 | MDF | Coating B | 25 | Half | 2.950 | 0.373 | 17.18 | 15.58 | 140 | Y |
| I-2 | MDF | Coating A | 16 | Half | 3.028 | 0.375 | 19.52 | 17.23 | 166 | Y |
| I-5 | MDF | Coating A | 23 | Half | 2.962 | 0.373 | 17.93 | 16.24 | 151 | Y |
| I-11 | FJP | Coating A | 11 | Half | 3.004 | 0.378 | 31.914 | 28.100 | 80 | — |
| CO-3 | MDF | None | — | Outer | 2.971 | 0.347 | 5.642 | 5.46 | — | N |
| CO-6 | FJP | None | — | Outer | 2.948 | 0.341 | 15.682 | 15.600 | — | — |
| C-3 | MDF | Paint | 9 | Outer | 2.995 | 0.362 | 5.621 | 5.20 | −5 | N |
| C-6 | MDF | Paint | 12 | Outer | 3.003 | 0.363 | 5.836 | 5.36 | −2 | N |
| I-9 | MDF | Coating B | 25 | Outer | 2.951 | 0.372 | 13.31 | 12.10 | 122 | Y |
| I-3 | MDF | Coating A | 16 | Outer | 3.028 | 0.375 | 15.34 | 13.53 | 148 | Y |
| I-6 | MDF | Coating A | 23 | Outer | 2.959 | 0.373 | 14.25 | 12.90 | 136 | Y |
| I-12 | FJP | Coating A | 11 | Outer | 2.986 | 0.377 | 25.354 | 22.520 | 62 | — |

In addition, each of Substrates CO-7, C-7, I-13, and I-14 was also strength tested in a similar manner, except each was only tested in an outer position. The results for peak load, peak stress, and peak stress increase for Substrates CO-7, C-7, I-13, and I-14 are summarized in Table 5, below.

TABLE 5

Strength Test Results for Additional Substrates

| Substrate | Coating Type | Coating Thickness (mils) | Substrate Dimension Overall Length (inches) | Substrate Dimension Protrusion Thickness (inches) | Peak Load (lb$_f$) | Peak Stress (psi) | Peak Stress Increase (%) | Functional Part? |
|---|---|---|---|---|---|---|---|---|
| CO-7 | None | — | 2.965 | 0.088 | 29.23 | 111.8 | — | N |
| C-7 | Paint | 5 | 2.979 | 0.099 | 25.42 | 86.10 | −23 | N |
| I-13 | Coating A | 11 | 2.984 | 0.099 | 53.66 | 180.7 | 62 | Y |
| I-14 | Coating B | 11 | 2.956 | 0.103 | 62.95 | 207.2 | 85 | Y |

Additionally, after testing, each substrate was visually examined to determine whether or not, once cracked, it could be used. The results of these visual observations for each of the substrates tested are summarized in the last columns of Tables 4 and 5. As shown particularly in Table 4, increasing the paint thickness by 33 percent (from 9 mils to 12 mils) has no observable impact on the strength of the painted substrate. It is not expected that further increases to the paint thickness would show different results, in particular because of the discontinuous microstructure of paint.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

We claim:

1. An extrusion-coated structural system comprising:
    an extrusion-coated structural member comprising at least one substrate and a coating material extrusion coated onto at least a portion of said substrate,
    wherein said extrusion-coated structural member further comprises an extruded profile member formed of said coating material,
    wherein said extruded profile member extends outwardly from said substrate for a maximum distance that is at least two times greater than the average thickness of said coating material coated onto said substrate adjacent said extruded profile member,
    wherein at least 75 percent of the total volume of said extruded profile member is formed of said coating material,
    wherein said extrusion-coated structural member further comprises a profile recess at least partially defined by said extruded profile member,
    wherein said substrate comprises natural wood, medium-density fiberboard, particle board, oriented strand board, plastic, metal, fiberglass-reinforced thermoset or thermoplastic polymers, or combinations thereof, and
    wherein said coating material comprises at least one resin selected from the group consisting of polyesters, copolyesters, polycarbonates, poly(acrylonitrile-styrene-acrylate) (ASA), poly(acrylonitrile-butadiene-styrene) (ABS), poly(styrene-acrylonitrile) (SAN), cellulose esters and mixtures thereof,
    wherein said coating material has an average thickness in the range of from about 0.001 inches to about 0.25 inches and wherein said coating material extends continuously around at least three sides of at least one cross-section of said substrate,
    wherein said extruded profile member extends along at least 60 percent of the length of said extrusion-coated structural member, and further comprising at least one functional member disposed within said profile recess, wherein said functional member is selected from the group consisting of piping, electrical or plumbing conduit, wire, cables, lighting fixtures, LED elements, and combinations thereof.

2. The structural system of claim 1, wherein said extruded profile member extends outwardly from said substrate for a maximum distance that is at least five times greater than the average thickness of said coating material coated onto said substrate adjacent said extruded profile member.

3. The structural system of claim 1, wherein said extruded profile member is formed at the same time said coating material is extrusion coated onto said substrate.

4. The structural system of claim 1, wherein said extruded profile member comprises at least 5 percent of the total weight of said coating material used to form said first extrusion-coated structural member.

5. The structural system of claim 1, wherein said profile recess presents a profile recess attachment surface formed of said coating material; further comprising a second structural member comprising a structural protrusion, wherein said structural protrusion is configured for insertion into said profile recess so that said structural protrusion is at least partially supported by at least a portion of said profile recess attachment surface.

6. The structural system of claim 5, wherein said profile recess attachment surface defines at least one coating cavity and/or at least one coating projection, and wherein said structural protrusion comprises at least one structural projection and/or at least one structural cavity, wherein (i) said structural protrusion is configured for insertion into said coating cavity of said profile recess attachment surface and/or (ii) said coating projection is configured for insertion into said structural cavity of said structural protrusion when said structural protrusion is inserted into said profile recess.

7. The structural system of claim 1, wherein said coating material is a resin coating comprising at least 30 percent of a resin material, based on the total weight of said coating material.

8. An extrusion-coated structural system comprising:
    an extrusion-coated structural member comprising at least one substrate and a coating material extrusion coated onto at least a portion of said substrate,
    wherein said extrusion-coated structural member further comprises an extruded profile member formed of said coating material,
    wherein said extruded profile member extends outwardly from said substrate for a maximum distance that is at least two times greater than the average thickness of said coating material coated onto said substrate adjacent said extruded profile member,
    wherein at least 75 percent of the total volume of said extruded profile member is formed of said coating material, and
    wherein said extrusion-coated structural member further comprises a profile recess at least partially defined by said extruded profile member; and
    further comprising at least one functional member disposed within said profile recess, wherein said functional member is selected from the group consisting of piping, electrical or plumbing conduit, wire, cables, lighting fixtures, LED elements, and combinations thereof.

9. An extrusion-coated structural system comprising:
    an extrusion-coated structural member comprising at least one substrate and a coating material extrusion coated onto at least a portion of said substrate,
    wherein said extrusion-coated structural member further comprises an extruded profile member formed of said coating material,
    wherein said extruded profile member extends outwardly from said substrate for a maximum distance that is at least two times greater than the average thickness of said coating material coated onto said substrate adjacent said extruded profile member, wherein at least 75 percent of the total volume of said extruded profile member is formed of said coating material, wherein said extrusion-coated structural member further comprises a profile recess at least partially defined by said extruded profile member, wherein said profile recess presents a profile recess attachment surface formed of said coating material; further comprising a second structural member comprising a structural protrusion, wherein said structural protrusion is configured for insertion into said profile recess so that said structural protrusion is at least partially supported by at least a portion of said profile recess attachment surface, wherein said profile recess attachment surface defines at least one coating cavity and/or at least one coating projection, and wherein said structural protrusion comprises at least one structural projection and/or at least one structural cavity, wherein (i) said structural protrusion is configured for insertion into said coating cavity of said profile recess attachment surface and/or (ii) said coating projection is configured for insertion into said structural cavity of said structural protrusion when said structural protrusion is inserted into said profile recess, and wherein at least a portion of said structural protrusion is coated with a second coating material, wherein said structural projection and/or said structural cavity are formed of said second coating material.

10. The structural system of claim 8 or 9, wherein said extruded profile member extends along at least 60 percent of the length of said extrusion-coated structural member.

11. The structural system of claim 8 or 9, wherein said coating material has an average thickness in the range of from about 0.001 inches to about 0.25 inches and wherein said coating material extends continuously around at least three sides of at least one cross-section of said substrate.

12. The structural system of claim 8 or 9, wherein said substrate comprises natural wood, medium-density fiberboard, particle board, oriented strand board, plastic, cellularized PVC, foam, metal, fiberglass-reinforced thermoset or thermoplastic polymers, or combinations thereof.

13. The structural system of claim 8 or 9, wherein said coating material comprises at least one resin selected from the group consisting of polyesters, copolyesters, polycarbonates, polymethyl methacrylate (PMMA), impact-modified PMMA, poly(acrylonitrile-styrene-acrylate) (ASA), poly(acrylonitrile-butadiene-styrene) (ABS), poly(styrene-acrylonitrile) (SAN), cellulose esters and mixtures thereof.

* * * * *